United States Patent
Nishioka

(10) Patent No.: US 8,214,662 B2
(45) Date of Patent: Jul. 3, 2012

(54) MULTIPROCESSOR CONTROL UNIT, CONTROL METHOD PERFORMED BY THE SAME, AND INTEGRATED CIRCUIT

(75) Inventor: Shinichiro Nishioka, Osaka (JP)

(73) Assignee: Panasonic Corporation, Osaka (JP)

( * ) Notice: Subject to any disclaimer, the term of this patent is extended or adjusted under 35 U.S.C. 154(b) by 735 days.

(21) Appl. No.: 12/377,938

(22) PCT Filed: Mar. 13, 2008

(86) PCT No.: PCT/JP2008/000579
§ 371 (c)(1),
(2), (4) Date: Feb. 18, 2009

(87) PCT Pub. No.: WO2008/129786
PCT Pub. Date: Oct. 30, 2008

(65) Prior Publication Data
US 2010/0153761 A1    Jun. 17, 2010

(30) Foreign Application Priority Data
Apr. 9, 2007    (JP) .................................. 2007-101507

(51) Int. Cl.
*G06F 1/00*    (2006.01)
*G06F 9/46*    (2006.01)

(52) U.S. Cl. .................. 713/300; 713/320; 718/100

(58) Field of Classification Search .................. 713/300, 713/320, 323, 324; 712/28; 718/100, 102
See application file for complete search history.

(56) References Cited

U.S. PATENT DOCUMENTS

| | | | |
|---|---|---|---|
| 7,318,164 B2 * | 1/2008 | Rawson, III | 713/320 |
| 7,437,519 B2 * | 10/2008 | Kiyota et al. | 711/141 |
| 7,930,574 B2 * | 4/2011 | Cai et al. | 713/322 |
| 7,971,029 B2 * | 6/2011 | Unno et al. | 712/28 |
| 2004/0107369 A1 * | 6/2004 | Cooper et al. | 713/300 |

(Continued)

FOREIGN PATENT DOCUMENTS

JP    08-190535    7/1996

(Continued)

OTHER PUBLICATIONS

International Search Report issued Jun. 3, 2008 in the International (PCT) Application of which the present application is the U.S. National Stage.

(Continued)

*Primary Examiner* — Khanh Dang
(74) *Attorney, Agent, or Firm* — Wenderoth Lind & Ponack, L.L.P.

(57) ABSTRACT

A multiprocessor control unit acquires first non processing time information on a first non processing time represented for each processor, wherein the first non processing time represents a time in which a first block is not executed in a first barrier establishment time from barrier synchronization start until barrier synchronization establishment of the first program block, and acquires second non processing time information on a second non processing time represented for each processor, wherein the second non processing time represents a time in which a second block is not processed in a second barrier establishment time from barrier synchronization start until barrier synchronization establishment of the second program block. The multiprocessor control unit controls a power supply for the processors while the first and second program blocks are consecutively executed in parallel, using the first and second non processing time information acquired.

18 Claims, 37 Drawing Sheets

U.S. PATENT DOCUMENTS

| | | | | |
|---|---|---|---|---|
| 2004/0243868 A1* | 12/2004 | Toll et al. | | 713/323 |
| 2006/0005056 A1 | 1/2006 | Nishioka | | |
| 2006/0236136 A1* | 10/2006 | Jones | | 713/300 |
| 2008/0034236 A1* | 2/2008 | Takayama et al. | | 713/322 |
| 2009/0013323 A1* | 1/2009 | May et al. | | 718/104 |
| 2011/0087909 A1* | 4/2011 | Kanakogi | | 713/322 |

FOREIGN PATENT DOCUMENTS

| | | |
|---|---|---|
| JP | 2006-48652 | 2/2006 |

OTHER PUBLICATIONS

J. Li, et al., "The Thrifty Barrier: Energy-Aware Synchronization in Shared-Memory Multiprocessors", High-Performance Computer Architecture (HPCA), '04, IEEE Computer Society Washington, D.C., 2004, pp. 14-23.

* cited by examiner

FIG. 7

| POWER MODE | | PROCESSOR CORE | CACHE MEMORY | POWER CONSUMPTION | RECOVERY TO THE Run MODE | SLEEP TRANSFER DETERMINATION THRESHOLD VALUE |
|---|---|---|---|---|---|---|
| NORMAL OPERATION | Run | CLOCK ON VOLTAGE ON | CLOCK ON VOLTAGE ON | DEPENDING ON APPLICATION | — | — |
| NON-OPERATIVE (SLEEP) | Standby | CLOCK OFF VOLTAGE ON | CLOCK OFF VOLTAGE ON | LEAK POWER | REQUEST FOR INTERRUPT DEBUG | Tsb |
| | Dormant | CLOCK OFF VOLTAGE OFF | CLOCK OFF VOLTAGE ON | LEAK POWER FROM MEMORY | SOFT RESET | Tdm (>Tsb) |
| | Shutdown | CLOCK OFF VOLTAGE OFF | CLOCK OFF VOLTAGE OFF | ALMOST ZERO | RESET | Tsd (>Tdm) |

DEEPER SLEEP →

F I G. 9
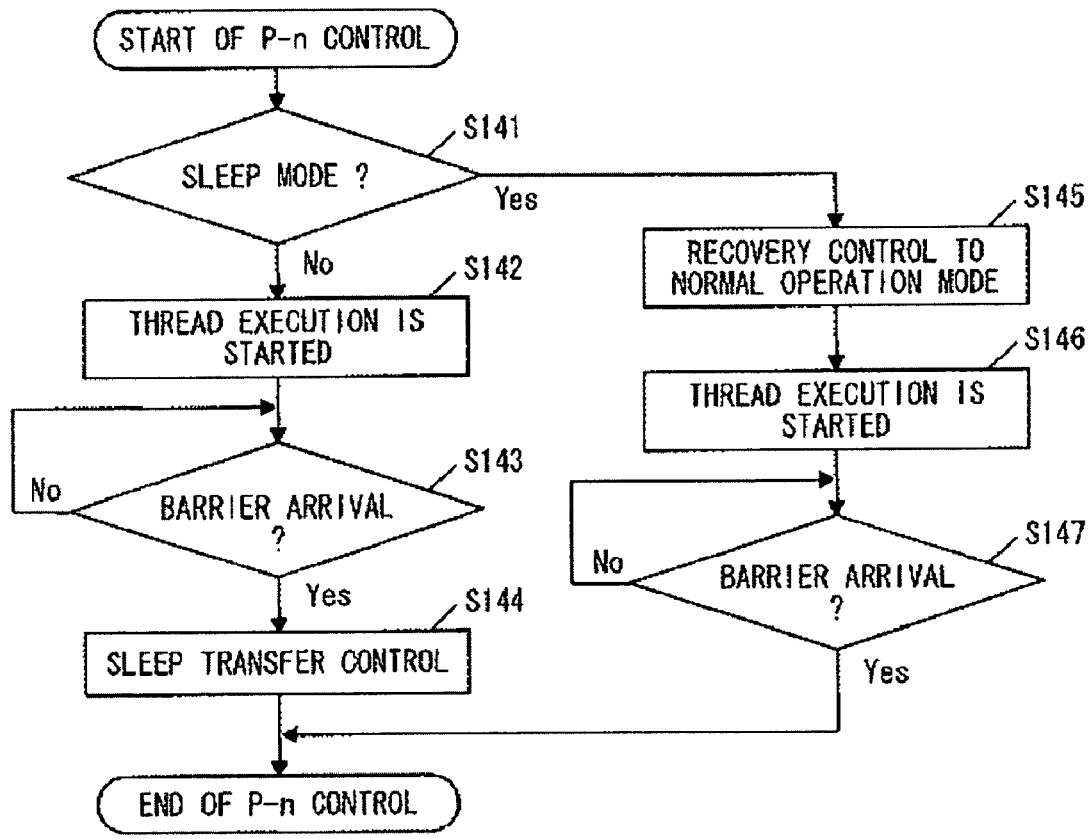

F I G. 1 4
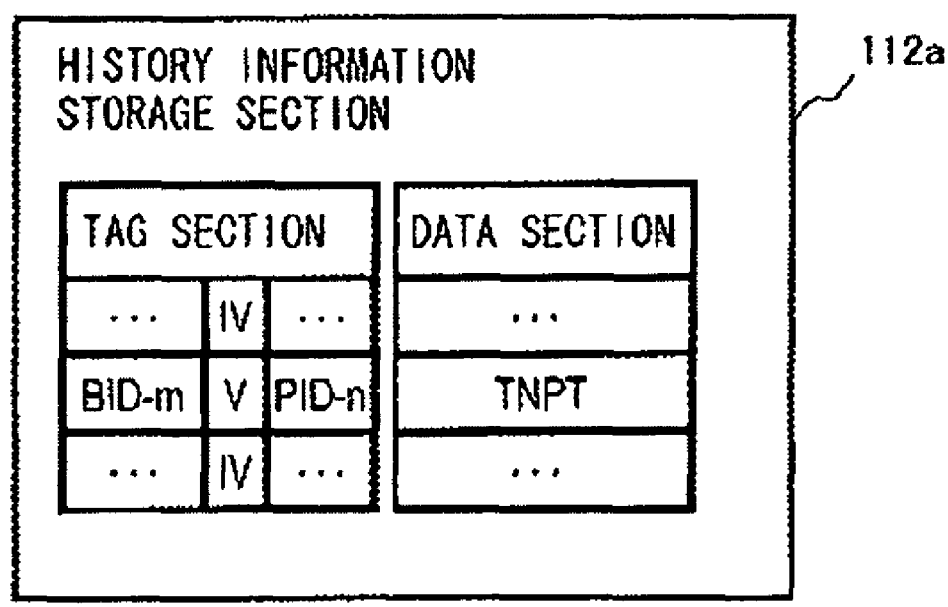

F I G. 20
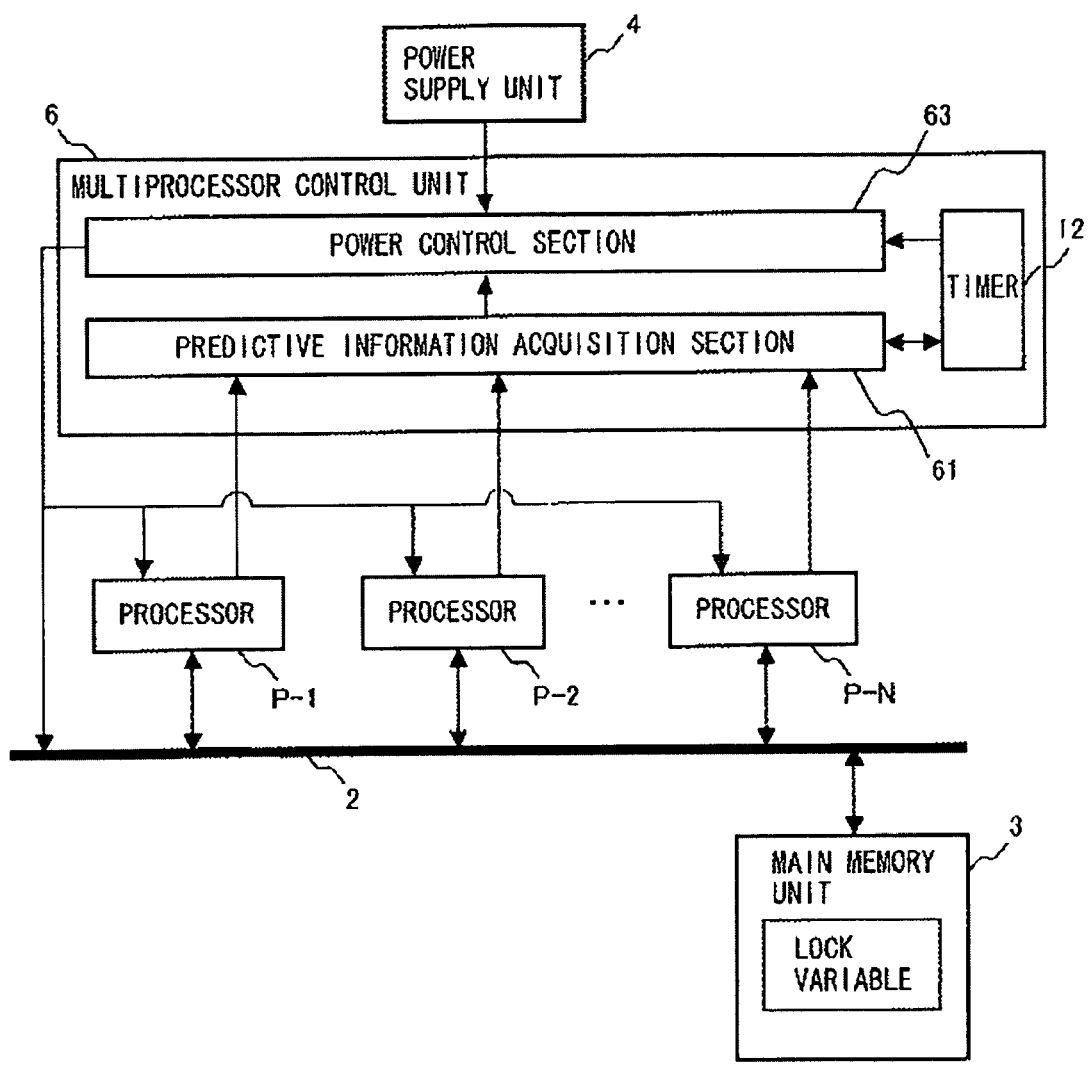

F I G. 2 1
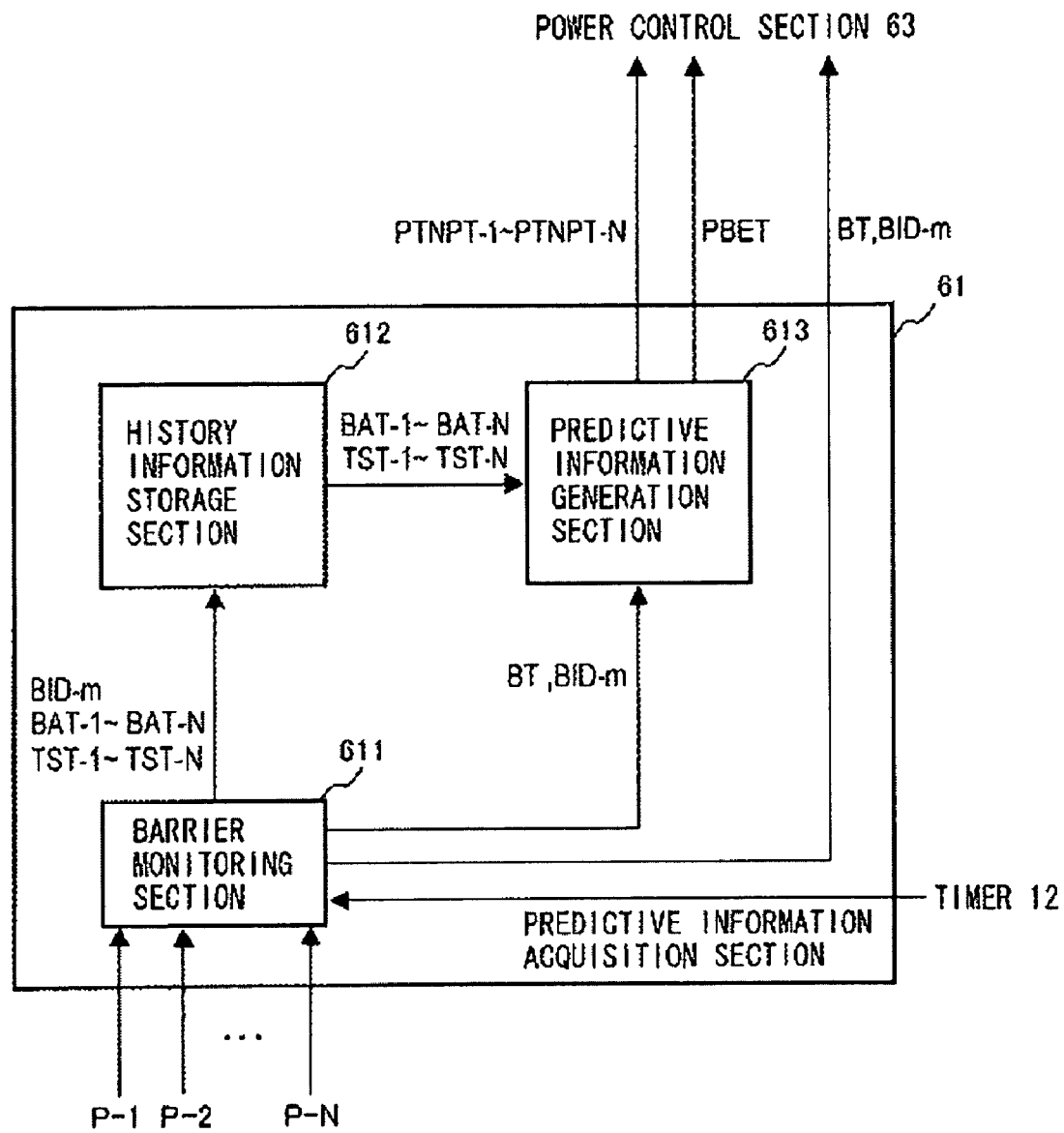

FIG. 24

| | POWER MODE | PROCESSOR CORE | MEMORY | POWER CONSUMPTION | RECOVERY TO THE Run MODE | SLEEP TRANSFER DETERMINATION THRESHOLD VALUE |
|---|---|---|---|---|---|---|
| NORMAL OPERATION | Run | CLOCK ON VOLTAGE ON | CLOCK ON VOLTAGE ON | DEPENDING ON APPLICATION | — | — |
| LOW RATE OPERATION (DVFS) | SlowRun | LOW RATE CLOCK LOW VOLTAGE | LOW RATE CLOCK LOW VOLTAGE | DEPENDING ON APPLICATION | VOLTAGE/CLOCK RECOVERY | — |
| NON-OPERATIVE (SLEEP) | Standby | CLOCK OFF VOLTAGE ON | CLOCK OFF VOLTAGE ON | LEAK POWER | REQUEST FOR INTERRUPT DEBUG | Tsb |
| | Dormant | CLOCK OFF VOLTAGE OFF | CLOCK OFF VOLTAGE ON | LEAK POWER FROM MEMORY | SOFT RESET | Tdm (>Tsb) |
| | Shutdown | CLOCK OFF VOLTAGE OFF | CLOCK OFF VOLTAGE OFF | ALMOST ZERO | RESET | Tsd (>Tdm) |

DEEPER SLEEP →

PRIOR ART

F I G. 3 7

| POWER MODE | | PROCESSOR CORE | MEMORY | POWER CONSUMPTION | RECOVERY TO THE Run MODE |
|---|---|---|---|---|---|
| NORMAL OPERATION | Run | CLOCK ON VOLTAGE ON | CLOCK ON VOLTAGE ON | DEPENDING ON APPLICATION | — |
| NON-OPERATIVE (SLEEP) | Standby | CLOCK OFF VOLTAGE ON | CLOCK OFF VOLTAGE ON | LEAK POWER | REQUEST FOR INTERRUPT DEBUG |
| | Dormant | CLOCK OFF VOLTAGE OFF | CLOCK OFF VOLTAGE ON | LEAK POWER FROM MEMORY | SOFT RESET |
| | Shutdown | CLOCK OFF VOLTAGE OFF | CLOCK OFF VOLTAGE OFF | ALMOST ZERO | RESET |

DEEPER SLEEP →

MULTIPROCESSOR CONTROL UNIT, CONTROL METHOD PERFORMED BY THE SAME, AND INTEGRATED CIRCUIT

BACKGROUND OF THE INVENTION

1. Technical Field

The present invention relates to a multiprocessor control unit, a control method performed by the same, and an integrated circuit, and specifically to a multiprocessor control unit for reducing the power consumption of a plurality of processors, a control method performed by the same, and an integrated circuit.

2. Background Art

A multiprocessor system for assigning a thread (or process) in a program to each of a plurality of processors and executing the threads in parallel performs barrier synchronization. The barrier synchronization blocks thread execution until all the threads arrive at a barrier point preset for each thread, and is preformed in order to prevent inconsistency in the order of reading or writing a variable which is commonly referred to by the threads. Hereinafter, "barrier start" means start of the barrier synchronization, "barrier arrival" means that a thread arrives at a barrier point, "barrier establishment" means that the barrier synchronization is established by the last thread arriving at the barrier point, and "barrier wait" means that a thread which has realized the barrier arrival is in a wait state until the barrier establishment.

A multiprocessor system for realizing barrier synchronization generally has a shared memory type structure, by which a plurality of processors share a single address space. A shared memory type multiprocessor system uses a lock variable provided in a main memory unit on a shared memory bus accessible from each processor to realize the barrier establishment. Specifically, the lock variable is first set to the number of threads of all the processors which are to perform parallel execution. A processor performs an atomic operation (an operation of exclusively occupying the shared memory bus to perform a series of read-modified-write operations) at the time of the barrier arrival of the thread, and accesses the main memory unit to decrement the lock variable by one. Then, the processor is put into the barrier wait. A processor in the barrier wait keeps on determining whether or not the lock variable has become zero by an atomic operation performed another processor, by loading the lock variable in repetition. Namely, the processor repeats loading the lock variable and making a determination on the lock variable until the barrier establishment, since the lock variable becoming zero means the barrier establishment. Such a state in which the processor repeats loading the lock variable and making a determination on the lock variable during the barrier wait is referred to as "spin waiting state".

A processor in a spin waiting state is in a normal operation state in which the processor constantly accesses the main memory unit although not executing the thread assigned thereto. Therefore, the processor in a spin waiting state consumes power in waste.

A technology for reducing power consumption by transferring a processor in a spin waiting state into a non-operative sleep mode has been proposed. According to this technology, the power mode of a processor in a spin waiting state is transferred into a sleep mode, for example, by performing clock gating of blocking the supply of a clock signal to a logic circuit, by controlling the threshold voltage (Vth) provided against leak power which has recently increased as the semiconductor process is conducted in a progressively microscopic order, or by performing power gating of blocking the supply of a supply voltage (Vdd). For example, in an ARM processor produced by ARM of U.K., as shown in FIG. 37, a plurality of power modes into which the processor can be put are set. The power modes include a Run mode, which is a normal operation state mode (normal operation mode), and a Standby mode, a Dormant mode and a Shutdown mode which are non-operative sleep modes. The Standby mode, the Dormant mode and the Shutdown mode are different from one another in the manner of turning ON/OFF the clock signal and the voltage which are respectively supplied to a processor core and a cache memory.

The Dormant mode, to which power gating is applied, is a sleep mode which provides a larger power saving effect and is deeper than the Standby mode, to which only clock gating is applied. The Shutdown mode, in which the voltage to be supplied to the cache memory is off, is a sleep mode which provides a larger power saving effect and is deeper than the Dormant mode. In the Dormant mode, internal contexts such as a register and the like in the processor core need to be retracted to an external memory or the like from the processor core when the voltage is turned off, and need to be recovered to the processor core from the external memory or the like when the voltage is turned on. In addition, it requires a relatively long time to turn ON the voltage of the processor core. Therefore, the Dormant mode needs a larger time overhead than the Standby mode when transferred from the Run mode and recovered to the Run mode. The Shutdown mode needs a larger time overhead than the Dormant mode because in the case of the Shutdown mode, retraction and recovery of the context in the cache memory and the time for stabilizing the cache memory need to be considered. Therefore, a more power-saving (deeper) sleep mode cannot be applied unless the time duration to which the sleep mode is to be applied is sufficiently longer as compared with the time duration required for transfer from the normal operation mode and recovery to the normal operation mode.

In order to apply such a deeper sleep mode to a processor in the barrier wait as described above, the barrier waiting time needs to be estimated in advance. As a conventional technology for realizing this, a method of predicting the barrier waiting time based on the history and determining which depth of sleep mode is to be applied in accordance with the barrier waiting time which is predicted (predictive barrier waiting time) has been proposed (for example, Non-patent document 1, etc.). Specifically, when a thread has realized the barrier arrival, the power mode of the processor which has executed the thread is transferred from the normal operation mode to a sleep mode in accordance with the predictive barrier waiting time. Then, recovery to the normal operation mode is started at the timing obtained by calculating backwards from the predictive barrier waiting time, such that the power mode is recovered from the sleep mode to the normal operation mode by the time of the barrier establishment. According to the conventional art, a deeper sleep mode is applied to a processor in the barrier wait by predicting the barrier waiting time based on the history as described above.

Non-patent document 1: J. Li, J. Martinez, M. Huang, "The Thrifty Barrier: Energy-Aware Synchronization in Shared-Memory Multiprocessors", In Proceedings of High-Performance Computer Architecture (HPCA), '04, IEEE Computer Society Washington, D.C., USA, United States of America, 2004, pp. 14-23.

SUMMARY OF THE INVENTION

However, as described above, there is a time overhead when the mode is transferred to a sleep mode and revered to the normal operation mode, and the overhead is larger as the sleep mode is deeper. In addition, the above-described conventional art performs transfer to the sleep mode and recovery to the normal operation mode for each barrier synchronization. Therefore, the above-described conventional art has a problem that the ratio of the overhead in the time duration in which the sleep mode is applied is large and the actual power saving effect is small.

The present invention for solving the above-described problem has an object of providing a multiprocessor control unit capable of providing a larger power saving effect than the conventional art, a control method performed by the same, and an integrated circuit.

The present invention is made to solve the above problems. A multiprocessor control unit according to the present invention controls power supply to a plurality of processors, which perform parallel execution of a plurality of first blocks obtained by dividing a first program block included in a program while performing barrier synchronization of the plurality of first blocks, and then perform parallel execution of a plurality of second blocks obtained by dividing a second program block continued from the first program block while performing barrier synchronization of the plurality of second blocks. The multiprocessor control unit comprises acquisition means for acquiring first non processing time information on a first non processing time represented for each processor, wherein the first non processing time represents a time in which a first block is not executed in a first barrier establish time from barrier synchronization start until barrier synchronization establishment of the first program block, and acquiring second non processing time information on a second non processing time represented for each processor, wherein the second non processing time represents a time in which a second block is not processed in a second barrier establish time from barrier synchronization start until barrier synchronization establishment of the second program block; and power control means for controlling power supply to the plurality of processors while the first and second program blocks are consecutively executed in parallel, using the first and second non processing time information acquired by the acquisition means.

The first and second non processing time information, for example, corresponds to predictive thread non processing time in the embodiments described later. The first blocks and the second blocks, for example, correspond to the threads or processes in the embodiments described later.

According to the above structure, the power control means performs power control over two program blocks consecutively executed in parallel using two pieces of non processing time information. Thus, as compared to the conventional art by which the power supply is performed to a plurality of processors while one program block is executed in parallel using one piece of non processing time information, further power saving on each processor can be realized by using the two pieces of non processing time information in a certain manner.

Preferably, the power control means may control execution start timing of the first and second blocks for each processor such that execution states of the first and second blocks are the same before and after the barrier synchronization start of the second program block, using the first and second non processing time information acquired by the acquisition means, and may control power supply to the plurality of processors such that a processor not executing the first block or the second block is in a sleep state and a processor executing the first block or the second block is in an operation state before and after the barrier synchronization start of the second program block. According to this structure, as compared to the conventional art by which the power supply is performed to a plurality of processors while one program block is executed in parallel using one piece of non processing time information, further power saving on each processor can be realized because the number of times of transfer to the sleep state and recovery to the operation state can be reduced.

Further in the above structure, the power control unit may comprise power mode control means, in which a normal operation mode representing power for putting a processor into a normal operation state and a sleep mode representing power for putting the processor into a sleep state are preset, for setting a power mode of each processor to the normal operation mode or the sleep mode; and transfer means for controlling supply of a clock signal and/or a supply voltage to each processor to transfer the power mode of each processor to the power mode set by the power mode control means. Regarding a processor which has completed the execution of the first block before the barrier synchronization establishment of the first program block, the power mode control means may delay the execution start timing of the second block by the time represented by the second non processing time information from the barrier synchronization start of the second program block, and sets the power mode from the execution completion of the first block until the execution start of the second block to the sleep mode. The transfer means, for example, corresponds to the clock signal control section and the supply voltage control section in the embodiments described later. The second non processing time information may be the second non processing time of the processor which has completed the execution of the first block before the barrier synchronization establishment of the first program block.

Further in the above structure, the power mode control means may set the power mode of the processor which has completed the execution of the first block before the barrier synchronization establishment of the first program block to a sleep mode in accordance with the time represented by the first non processing time information from the execution completion of the first block until the execution start of the second block. Alternatively, in the case where the time represented by the second non processing time information is longer than the time represented by the first non processing time information, regarding the processor which has completed the execution of the first block before the barrier synchronization establishment of the first program block, the power mode control means may set the power mode to a sleep mode in accordance with the time represented by the first non processing time information from the execution completion of the first block until the barrier synchronization establishment of the first program block, and sets the power mode to a sleep mode in accordance with the time represented by the second non processing time information from the barrier synchronization start of the second program block until the execution start of the second block. Still alternatively, the first and second program blocks are the same program block; and the power mode control means may set the power mode of the processor which has completed the execution of the first block before the barrier synchronization establishment of the first program block to a sleep mode in accordance with a sum of the time represented by the first non processing time information and the time represented by the second non processing time information.

The first non processing time information may be the first non processing time of the processor which has completed the execution of the first block before the barrier synchronization establishment of the first program block; and the second non processing time information may be the second non processing time of the processor which has completed the execution of the first block before the barrier synchronization establishment of the first program block.

The acquisition means may store the first and second non processing time information; the first non processing time information may be a statistic time of the first non processing times represented respectively for the plurality of processor; and the second non processing time information may be a statistic time of the second non processing times represented respectively for the plurality of processor. Further in this case, the first non processing time information maybe an average time of the first non processing times represented respectively for the plurality of processors; and the second non processing time information may be an average time of the second non processing times represented respectively for the plurality of processors. Alternatively, the first non processing time information may be an average time of the first non processing times represented respectively for the plurality of processors excluding the minimum first non processing time; and the second non processing time information may be an average time of the second non processing times represented respectively for the plurality of processors excluding the minimum second non processing time.

The acquisition means may store the first and second non processing time information; the first non processing time information may be the minimum first non processing time among the first non processing times respectively represented for the plurality of processors; and the second non processing time information may be the minimum second non processing time among the second non processing times respectively represented for the plurality of processors.

Further in the above structure, in the power mode control means, a low rate operation mode representing power for putting a processor to a low rate operation state is preset; regarding a processor which starts executing the first block at the time of the barrier synchronization start of the first program block, the power mode control means may compare power consumed by the processor when the power mode from the execution completion of the first block until the barrier synchronization establishment of the first program block is set to a sleep mode in accordance with the time represented by the first non processing time information and power consumed by the processor when the power mode from the execution completion of the first block until the barrier synchronization establishment of the first program block is set to the low rate operation mode, and may set the power mode in which the processor consumes less power; and regarding a processor which starts executing the second block at the time of the barrier synchronization start of the second program block, the power mode control means may compare power consumed by the processor when the power mode from the execution completion of the second block until the barrier synchronization establishment of the second program block is set to a sleep mode in accordance with the time represented by the second non processing time information and power consumed by the processor when the power mode from the execution completion of the second block until the barrier synchronization establishment of the second program block is set to the a low rate operation mode, and may set the power mode in which the processor consumes less power.

Further in this case, the acquisition means may further acquire the first and second barrier establish times; in the case where the power mode of the processor which starts executing the first block at the time of the barrier synchronization start of the first program block is set to the low rate operation mode, the power mode control means may calculate a first frequency, which is in accordance with the ratio between the time represented by the first non processing time information and the first barrier establish time and is lower than the frequency of the clock signal to be supplied to a processor in the normal operation state, and may set the calculated first frequency for the low rate operation mode; and in the case where the power mode of the processor which starts executing the second block at the time of the barrier synchronization start of the second program block is set to the low rate operation mode, the power mode control means may calculate a second frequency, which is in accordance with the ratio between the time represented by the second non processing time information and the second barrier establish time and is lower than the frequency of the clock signal to be supplied to the processor in the normal operation state, and may set the calculated second frequency for the low rate operation mode; and in the case where the power mode of the processor which starts executing the first block at the time of the barrier synchronization start of the first program block is set to the low rate operation mode, the transfer means may set the frequency of the clock signal to the processor to the first frequency; and in the case where the power mode of the processor which starts executing the second block at the time of the barrier synchronization start of the second program block is set to the low rate operation mode, the transfer means may set the frequency of the clock signal to the processor to the second frequency.

When the power mode of all the processors is set to the low rate operation mode, the power mode control means may reset the power mode of all the processors to the normal operation mode.

In the case where the power mode of the processor which starts executing the first block at the time of the barrier synchronization start of the first program block is set to the low rate operation mode, the acquisition means may convert the time from the processor starts executing the first, block in the low rate operation state until the processor completes the execution into the time from the processor starts executing the first block in the normal operation state until the processor completes the execution, and may acquire the first non processing time by subtracting the converted time from the first barrier establish time; and in the case where the power mode of the processor which starts executing the second block at the time of the barrier synchronization start of the second program block is set to the low rate operation mode, the acquisition means may convert the time from the processor starts executing the second block in the low rate operation state until the processor completes the execution into the time from the processor starts executing the second block in the normal operation state until the processor completes the execution, and may acquire the second non processing time by subtracting the converted time from the second barrier establish time.

The acquisition means may store the first and second non processing time information; the first non processing time information may be a statistic time of the first non processing times respectively represented for the plurality of processor; and the second non processing time information may be a statistic time of the second non processing times respectively represented for the plurality of processor. Further in this case, the first non processing time information may be an average time of the first non processing times respectively represented for the plurality of processors; and the second non processing time information may be an average time of the second non processing times respectively represented for the plurality of processors.

The present invention is also directed to a control method performed by a multiprocessor control unit. A control method according to the present invention is performed by a multiprocessor control unit for controlling power supply to a plurality of processors, which perform parallel execution of a plurality of first blocks obtained by dividing a first program block included in a program while performing barrier synchronization of the plurality of first blocks, and then perform parallel execution of a plurality of second blocks obtained by dividing a second program block continued from the first program block while performing barrier synchronization of the plurality of second blocks. The control method comprises an acquisition step of acquiring first non processing time information on a first non processing time represented for each processor, wherein the first non processing time represents a time in which a first block is not executed in a first barrier establish time from barrier synchronization start until barrier synchronization establishment of the first program block, and acquiring second non processing time information on a second non processing time represented for each processor, wherein the second non processing time represents a time in which a second block is not processed in a second barrier establish time from barrier synchronization start until barrier synchronization establishment of the second program block; and a power control step of controlling power supply to the plurality of processors while the first and second program blocks are consecutively executed in parallel, using the first and second non processing time information acquired by the acquisition means.

The present invention is also directed to an integrated circuit. An integrated circuit according to the present invention controls power supply to a plurality of processors, which perform parallel execution of a plurality of first blocks obtained by dividing a first program block included in a program while performing barrier synchronization of the plurality of first blocks, and then perform parallel execution of a plurality of second blocks obtained by dividing a second program block continued from the first program block while performing barrier synchronization of the plurality of second blocks. The integrated circuit comprises acquisition means for acquiring first non processing time information on a first non processing time represented for each processor, wherein the first non processing time represents a time in which a first block is not executed in a first barrier establish time from barrier synchronization start until barrier synchronization establishment of the first program block, and acquiring second non processing time information on a second non processing time represented for each processor, wherein the second non processing time represents a time in which a second block is not processed in a second barrier establish time from barrier synchronization start until barrier synchronization establishment of the second program block; and power control means for controlling power supply to the plurality of processors while the first and second program blocks are consecutively executed in parallel, using the first and second non processing time information acquired by the acquisition means.

The present invention can provide a multiprocessor control unit capable of providing a larger power-saving effect than the conventional art, a control method performed by the same, and an integrated circuit.

BRIEF DESCRIPTION OF THE DRAWINGS

FIG. 7 shows power modes set by a power mode control section 131.

FIG. 9 is a flowchart showing a flow of individual control on each of processors P-1 through P-N according to the first embodiment.

FIG. 13 shows a specific example of a structure of a predictive information acquisition section 11a.

FIG. 14 shows a history table in a history information storage section 112a.

FIG. 15 shows a specific example of a structure of a power control section 13a.

FIG. 16 is a flowchart showing an overall operation flow of the multiprocessor control unit 1a.

FIG. 20 shows an example of a structure of a shared memory type multiprocessor system using a multiprocessor control unit according to a second embodiment.

FIG. 21 shows a specific example of a structure of a predictive information acquisition section 61.

FIG. 24 shows power modes set by a power mode control section 631.

FIG. 30 shows a specific example of a structure of a predictive information acquisition section 61a.

FIG. 31 shows a history table in a history information storage section 612a.

FIG. 32 shows a specific example of a structure of a power control section 63a.

FIG. 33 is a flowchart showing an overall operation flow of the multiprocessor control unit 6a.

FIG. 37 shows power modes used in an ARM processor produced by ARM of U.K.

Figure 1:
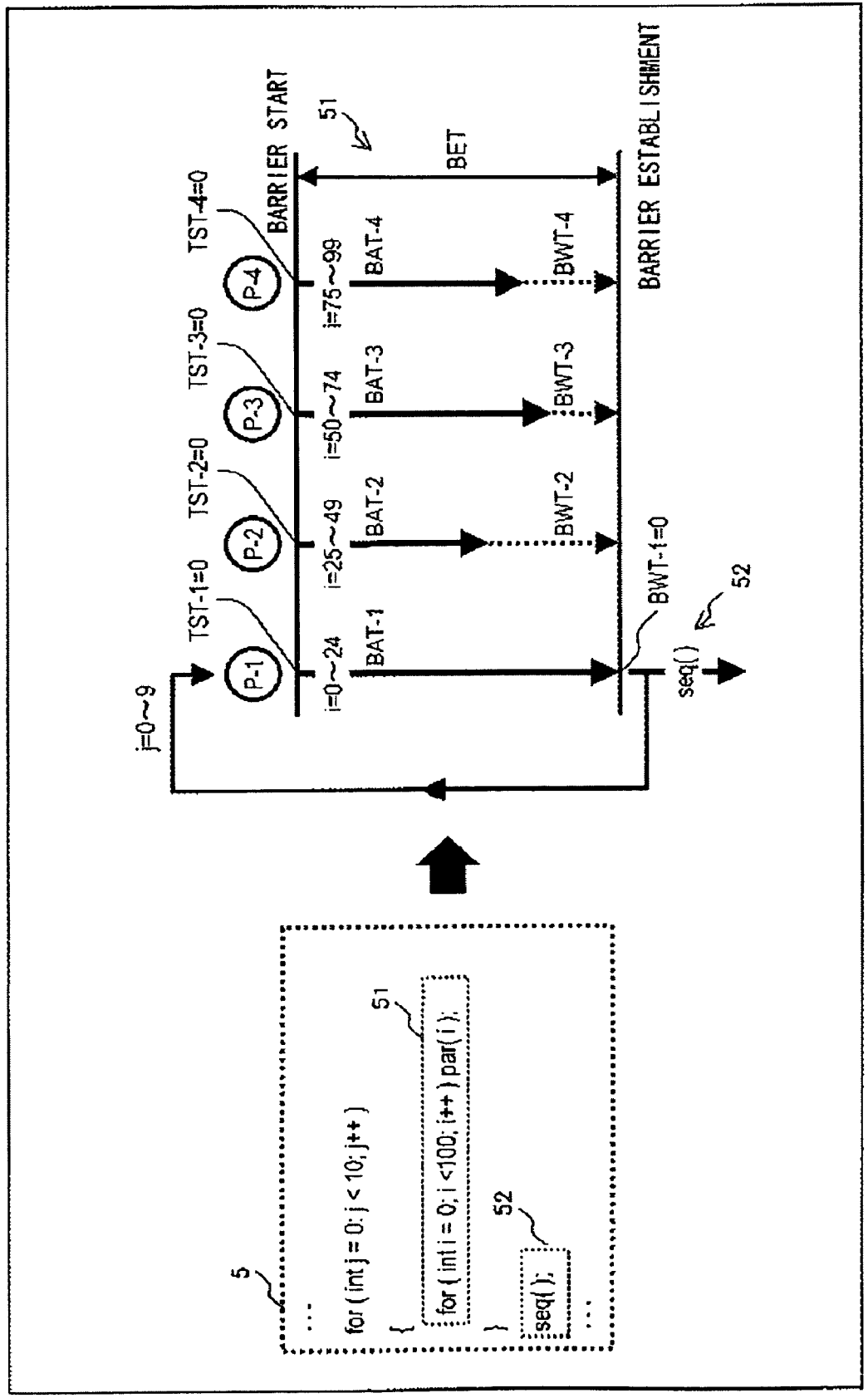
FIG. 1 schematically shows an example of a structure of a program and how the program is executed.

DESCRIPTION OF THE REFERENCE CHARACTERS 1, 1a, 6, 6a Multiprocessor control unit
2 Shared memory bus
3 Main memory unit
4 Power supply unit
5, 5 Program
7 Memory controller
8 I/O interface
11, 11a, 61, 61a Predictive information acquisition section
111, 111a, 611, 611a Barrier monitoring section
112, 112a, 612, 612a History information storage section
113, 113a, 613, 613a Predictive information generation section
12 Timer
13, 13a, 63, 63a Power control section
131, 131a, 631, 631a Power mode control section
132, 632 Clock signal control section
133, 633 Power supply control section
91 Optical disc drive
92 Optical disc
93 Memory card drive
94 Memory card

DETAILED DESCRIPTION OF THE INVENTION

First, a structure of a program to be executed by each processor will be described specifically.

A program is divided into a plurality of program blocks based on whether parallel execution is possible or not. Each program block is classified into either a parallel program block executable in parallel or a serial program block not executable in parallel.

FIG. 1 schematically shows an example of a program structure and how the program is executed. Function par(i) described in a program 5 is a function indicating that the corresponding program block is executable in parallel regarding i, and function seq( ) is a function indicating that the corresponding program block is not executable in parallel. In this example, a program block 51 is a parallel program block and a program block 52 is a sequential program block. j described in the program 5 indicates the number of times the program block is executed in a loop. According to the description in FIG. 1, the parallel program block 51 is executed in a loop 10 times (j=0 through 9), and then the sequential program block 52 is executed. Furthermore in FIG. 1, the parallel program block 51 is divided into four threads regarding i (i=0 through 24, i=25 through 49, i=50 through 74, i=75 through 99). The four divided threads are respectively assigned to processors P-1 through P-4. For example, the processor P-2 starts the execution of the thread indicated by i=25 through 49 simultaneously with the barrier start, performs an atomic operation at the time of the barrier arrival of the thread (the tip of the arrow concerning the thread indicated by i=25 through 49), and accesses the main memory unit to decrement the lock variable by one. Then, the processor P-2 is put into the barrier wait until the barrier establishment as indicated by the doted arrow concerning the thread indicated by i=25 through 49.

Thread starting time TST indicates a time duration from the barrier start until the start of the execution of the thread. In the example of FIG. 1, the thread starting time TST of each thread is indicated by each of the TST-1 through TST-4. In the example of FIG. 1, each thread starts executed simultaneously with the barrier start, and so the thread starting times TST-1 through TST-4 are all "0". Barrier establish time BET indicates a time duration from the barrier start until the barrier establishment. Barrier arrival time BAT indicates a time duration from the barrier start until the barrier arrival of the thread. In the example of FIG. 1, the barrier arrival time BAT of each thread is indicated by each of BAT-1 through BAT-4. Barrier waiting time BWT indicates a time duration from the barrier arrival until the barrier establishment. In the example of FIG. 1, the barrier waiting time BWT of each thread is indicated by each of BWT-1 through BWT-4. In the example of FIG. 1, the barrier arrival of the thread indicated by i=0 through 25 is the last barrier arrival, and so the barrier establishment is realized at the time of the barrier arrival of this thread. Therefore, barrier waiting time BWT-1=0. Thread non processing time TNPT indicates a time duration in which the thread is not executed in a time duration from the barrier start until the barrier establishment.

The barrier establish time BET, the barrier arrival time BAT and the barrier waiting time BWT have the relationship represented by expression (1). In expression (1), n is the number specifying the processor and also the number specifying the thread. The barrier establish time BET matches the time indicated by the maximum barrier arrival time BAT.

(Barrier establish time BET)=(barrier arrival time BAT-n)+(barrier waiting time BWT-n)    (1)

The barrier waiting time BWT, the thread starting time TST and the thread non processing time TNPT have a relationship represented by expression (2). In expression (2), n is the number specifying the processor and also the number specifying the thread.

(Thread non processing time TNPT-n)=(thread starting time TST-n)+(barrier waiting time BWT-n)    (2)

Figure 2:
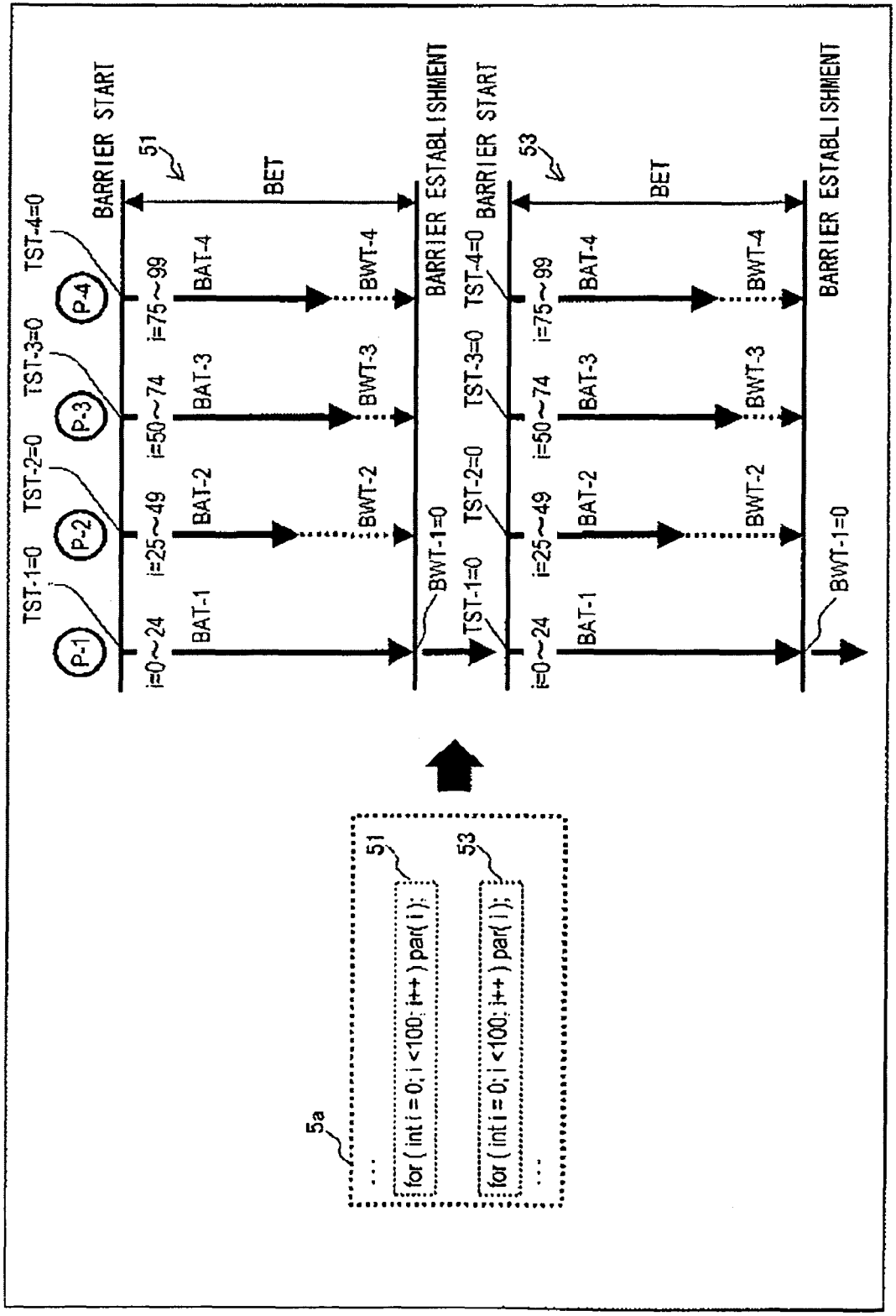
FIG. 2 schematically shows another example of a structure of a program and how the program is executed.

As shown in FIG. 2, there is a case where the parallel program block 51 is not executed in a loop. FIG. 2 schematically shows another example of a structure of the program and how the program is executed. In a program 5a shown in FIG. 2, parallel program blocks 51 and 53 are described. According to this description, as shown in FIG. 2, the parallel program block 51 divided into four threads is first executed in parallel, and immediately thereafter, the parallel program block 53 divided into four threads is executed in parallel.

Now, multiprocessor control units according to embodiments of the present invention will be described.

<First Embodiment>
<Structure>

Figure 3:
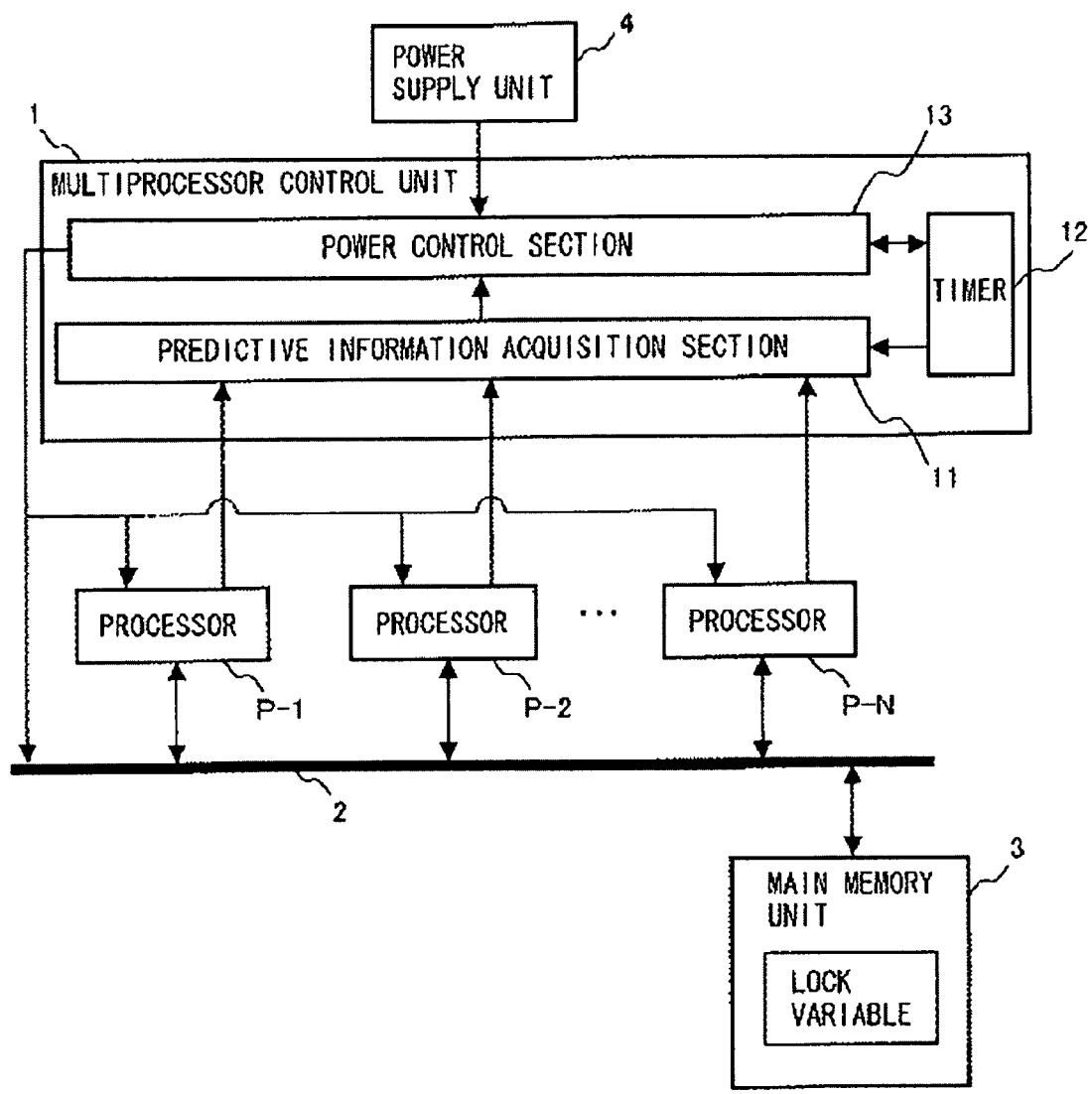
FIG. 3 shows an example of a structure of a shared memory type multiprocessor system using a multiprocessor control unit according to a first embodiment.

With reference to FIG. 3, a shared memory type multiprocessor system using a multiprocessor control unit according to a first embodiment of the present invention will be described. FIG. 3 shows an example of a structure of a shared memory type multiprocessor system using a multiprocessor control unit according to the first embodiment. As shown in FIG. 3, the multiprocessor system includes a multiprocessor control unit 1, processors P-1 through P-N (N is a natural number of 1 or larger), a shared memory bus 2, a main memory unit 3, and a power supply unit 4. Each of processors P-1 through P-N is connected to the main memory unit 3 via the shared memory bus 2, and realizes barrier synchronization while performing exclusive control using a lock variable assigned to a specific shared memory address on the main memory unit 3. The lock variable does not need to be provided on the main memory unit 3. The lock variable may be provided on, for example, a dedicated register mapped to a specific shared memory address on the multiprocessor control unit 1.

The multiprocessor control unit 1 is connected to the power supply unit 4 and each of the processors P-1 through P-N, and controls each of the processors P-1 through P-N regarding transfer to a sleep mode and recovery to the normal operation mode. The multiprocessor control unit 1 includes a predictive information acquisition section 11, a timer 12, and a power control section 13.

Figure 4:
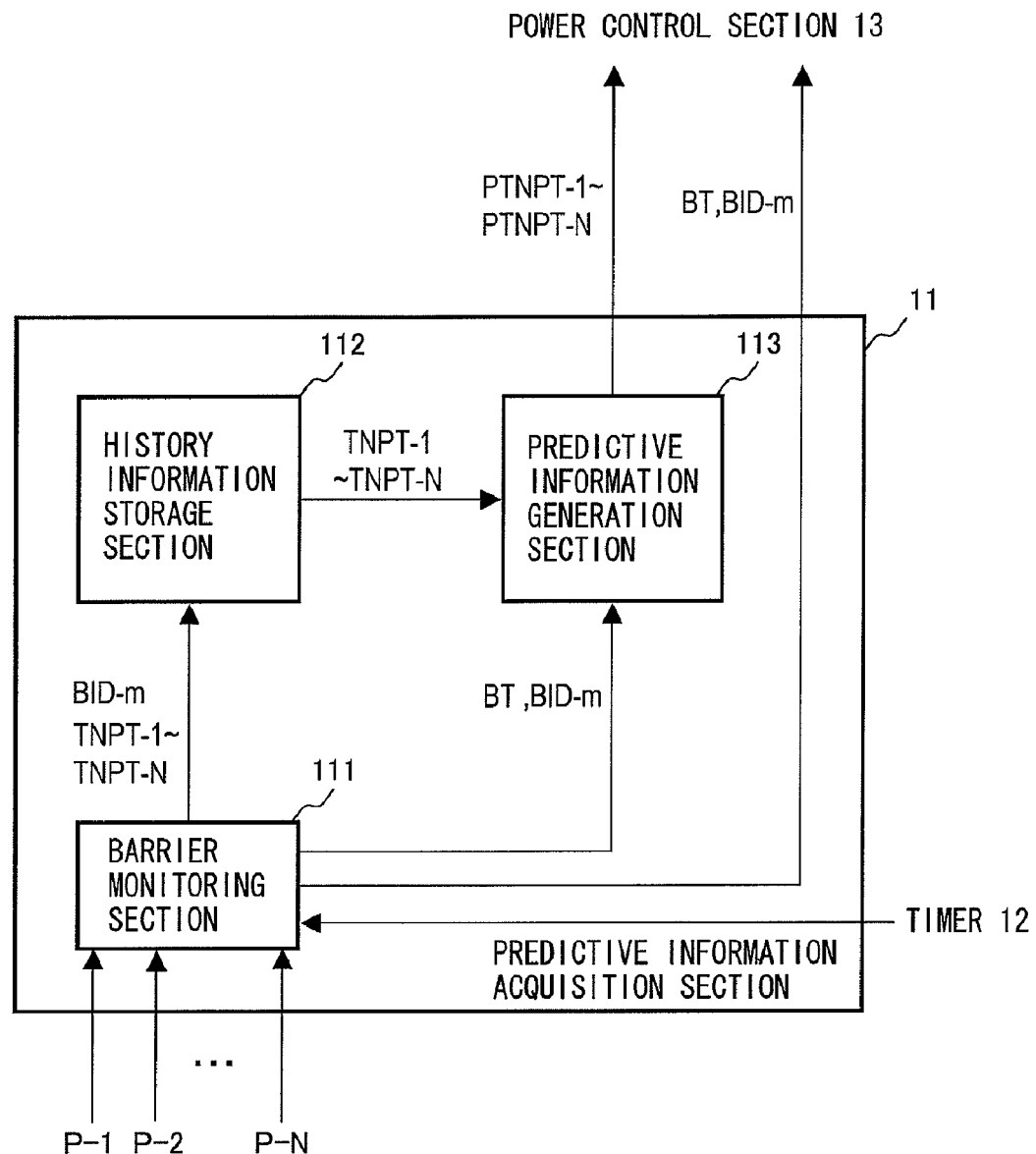
FIG. 4 shows a specific example of a structure of a predictive information acquisition section 11.

The predictive information acquisition section 11 acquires predictive information on each program block for each of the processors P-1 through P-N, and outputs the acquired predictive information to the power control section 13. In this embodiment, predictive thread non processing time PTNPT, which is predicted time of the thread non processing time TNPT, is used as the predictive information. Hereinafter, with reference to FIG. 4, a specific structure of the predictive information acquisition section 11 will be described. FIG. 4 shows a specific example of a structure of the predictive information acquisition section 11. The predictive information acquisition section 11 includes a barrier monitoring section 111, a history information storage section 112, and a predictive information generation section 113.

The barrier monitoring section 111 monitors an execution state of the program block by each of the processors P-1 through P-N and generates a barrier timing signal BT. The barrier monitoring section 111 generates the barrier timing signal BT and also outputs the generated barrier timing signal BT to the predictive information generation section 113 and the power control section 13. The barrier timing signal BT includes a barrier start signal indicating barrier start timing, a barrier arrival signal indicating barrier arrival timing of each thread, a barrier establishment signal indicating barrier establishment timing, and a thread starting signal indicating thread starting timing of each thread. The barrier monitoring section 111 monitors, for example, an execution instruction to each of the processors P-1 through P-N and thus can detect a barrier starting signal and a thread starting signal. The barrier monitoring section 111 detects an atomic operation of decrementing the lock variable among the above-mentioned execution instructions and thus can detect a barrier arrival signal or a barrier establishment signal. The barrier monitoring section 111 may be connected to, for example, the shared memory bus 2 so that a register for generating a barrier timing signal BT is provided in the barrier monitoring section 111. In this case, each of the processors P-1 through P-N accesses the register in the barrier monitoring section 111 at a timing and thus the barrier monitoring section 111 can generate a barrier timing signal BT indicating the timing of access.

The barrier monitoring section 111 holds, in an internal BID register, barrier identification (ID) information BID for specifying a program block to be executed. The barrier identification information BID includes, for example, an instruction address of the barrier starting point or the like. The barrier monitoring section 111 outputs barrier identification information BID-m held in the BID register to the history information storage section 112, the predictive information generation section 113 and the power control section 13. It is assumed here that the program is divided into M number of program blocks (M is a natural number of 1 or larger), and m is the number specifying the program block (m is a natural number of 1 or larger and M or smaller).

The barrier monitoring section 111 also refers to the timer 12 when generating a barrier arrival signal and calculates the barrier arrival time BAT. The timing of generating the barrier arrival signal is different among the processors P-1 through P-N. Therefore, the barrier monitoring section 111 calculates the barrier arrival times BAT-1 through BAT-N for the processors P-1 through P-N respectively. Similarly, the barrier monitoring section 111 refers to the timer 12 when generating a thread starting signal and calculates the threads starting times TST-1 through TST-N for the processors P-1 through P-N respectively. The barrier monitoring section 111 substitutes the calculated barrier arrival times BAT-1 through BAT-N and the calculated thread starting times TST-1 through TST-N into expressions (1) and (2) to calculate the thread non processing times TNPT-1 through TNPT-N. The barrier monitoring section 111 outputs the calculated thread non processing times TNPT-1 through TNPT-N to the history information storage section 112.

Figure 5:
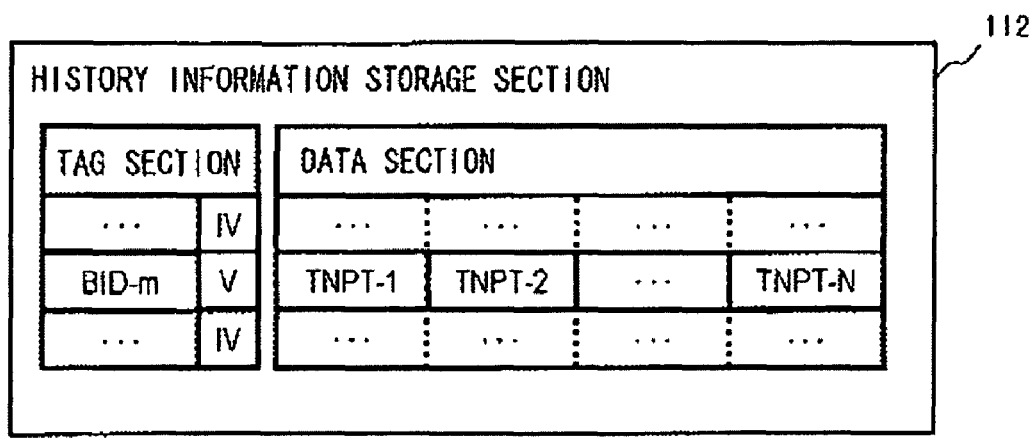
FIG. 5 shows a history table in a history information storage section 112.

The history information storage section 112 stores the input thread non processing times TNPT-1 through TNPT-N in a history table shown in FIG. 5. FIG. 5 shows the history table in the history information storage section 112. As shown in FIG. 5, the history table includes a tag section and a data section. The history information storage section 112 stores the barrier identification information BID-m input from the barrier monitoring section 111 in an arbitrary entry of the tag section. The history information storage section 112 stores the thread non processing times TNPT-1 through TNPT-N input from the barrier monitoring section 111 in respective entries of the data section corresponding to the entry in which the barrier identification information BID-m is stored. In this manner, the history table stores the barrier identification information BID-m and the thread non processing times TNPT-1 through TNPT-N of the program block specified by the barrier identification information BID-m in association with each other.

The history information storage section 112 stores flag information including a V (Valid) flag or an IV (Invalid) flag in an entry of the tag section. When the barrier identification information BID-m and the history information are stored in an entry of the tag section and a corresponding entry (line) of the data section, the history information storage section 112 sets the flag of that line to a V flag, which indicates that there is effective history information on the program block specified by the barrier identification information BID-m. By contrast, when the barrier identification information BID-m and the history information are not present in an entry of the tag section or the corresponding entry of the data section, the history information storage section 112 sets the flag of that line to an IV flag. When storing the input barrier identification information BID-m and history information, the history information storage section 112 determines whether or not there is an effective line including the input barrier identification information BID-m (line set to a V flag) already in the history table. When an effective line is already in the history table, the history information storage section 112 overwrites and updates the effective line with the history information. When there is no effective line, the history information storage section 112 stores the input barrier identification information BID-m and history information in an empty line and sets the flag of the line to a V flag.

There is a limit to the number of lines which can be stored in the history table. Therefore, it is conceivable that the flags of all the lines are set to V flags. In this case, the lines may be updated by overwriting from a line having a lower frequency of use in a manner like the LRU (Least Recently Used) update system used for updating the cache memory of a processor or the like.

The first time a program block is executed, the barrier identification information BID is stored in the history table, but history information is not stored. Therefore, "0" may be set as an initial value of the history information in the history table. Alternatively, the barrier arrival time of each processor may be predicted by performing static analysis in consideration of the number of steps of the program or the execution latency of each step. In this case, the barrier waiting time may be found by subtracting the barrier arrival time from the barrier establish time, which is the maximum among predictive barrier arrival times, and the found barrier waiting time may be set as an initial value of the thread non processing information. In this case, the thread starting time is "0".

In the above, when storing the thread non processing times TNPT-1 through TNPT-N, the history information storage section 112 simply updates the line with the latest value, but the present invention is not limited to this. The history information storage section 112 may calculate a statistic value (for example, an average value, etc.) including past history information and update the line with the calculated statistic value.

The predictive information generation section 113 refers to the barrier timing signal BT to read the thread non processing times TNPT-1 through TNPT-N associated with the barrier identification information BID-m from the history information storage section 112 at the time of the barrier start or barrier arrival, and outputs the read thread non processing times TNPT-1 through TNPT-N to the power control section 13 as predictive thread non processing times PTNPT-1 through PTNPT-N.

Figure 6:
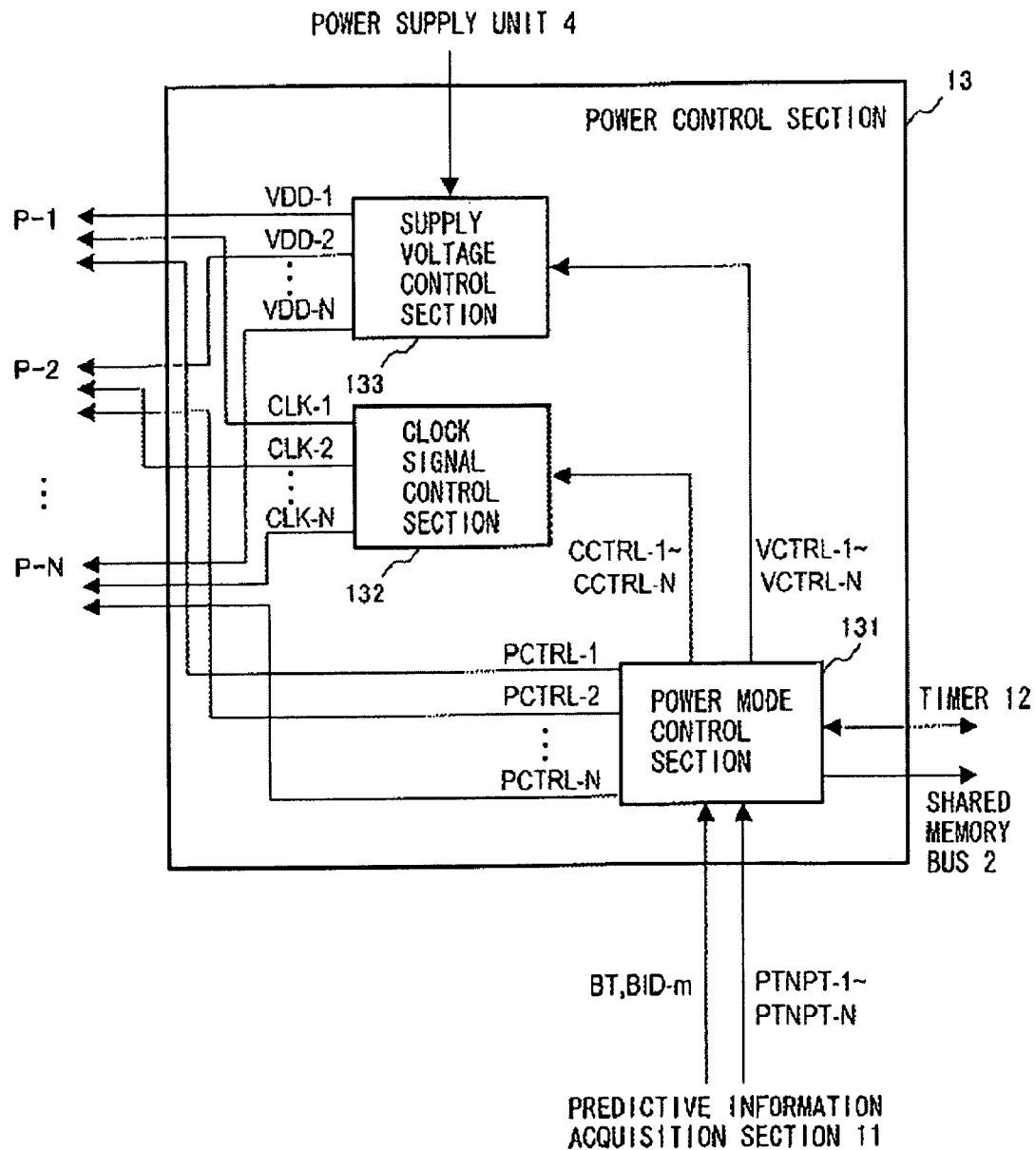
FIG. 6 shows a specific example of a structure of a power control section 13.

The power control section 13 controls the supply voltage and/or the clock signal to be supplied to each of the processors P-1 through P-N based on the predictive information input from the predictive information acquisition section 11 to control the power supply to each of the processors P-1 through P-N. The power control section 13 also performs power control over two consecutive program blocks. Hereinafter, with reference to FIG. 6, a specific structure of the power control section 13 will be described. FIG. 6 shows a specific example of the structure of the power control section 13. The power control section 13 includes a power mode control section 131, a clock signal control section 132, and a supply voltage control section 133.

When a barrier starting signal is input from the barrier monitoring section 111, the power mode control section 131 sets the lock variable in the main memory unit 3 to the number of the processors or the number of threads as an initial value via the shared memory bus 2, and causes the timer 12 to start counting time. When a barrier establishment signal is input from the barrier monitoring section 111, the power mode control section 131 causes the timer 12 to stop counting and reset time. The timer 12 may be provided in the power control section 13. Alternatively, the timer 12 may be provided outside the multiprocessor control unit 1 and connected with the shared memory bus 2. In this case, the power mode control section 131 controls the timer 12 via the shared memory bus 2. Also in this case, the barrier monitoring section 111 is connected to the shared memory bus 2, and the barrier monitoring section 111 refers to the timer 12 via the shared memory bus 2.

The power mode control section 131 sets the power mode of each of the processors P-1 through P-N in accordance with a corresponding one of the input predictive thread non processing times PTNPT-1 through PTNPT-N. In the power mode control section 131, sleep transfer determination threshold values as shown in FIG. 7 are preset. FIG. 7 shows the power modes set by the power mode control section 131. The sleep transfer determination threshold values Tsb, Tdm and Tsd shown in FIG. 7 are each set to a sleep time which is expected to provide a sufficient power saving effect even in consideration of the time required for transfer to a sleep mode and the time required for recovery to the normal operation mode. When, for example, the predictive thread non processing time PTNPT-1 is equal to or larger than 0 and equal to or smaller than Tsb, the power mode control section 131 sets the power mode of the processor P-1 to the Run mode, which is the normal operation mode. When the predictive thread non processing time PTNPT-1 is close to "0", it is expected that a sufficient sleep time may not be guaranteed and the corresponding thread is the last thread to realize the barrier arrival. Therefore, it is not necessary to transfer the processor to the sleep mode. When the predictive thread non processing time PTNPT-1 is larger than Tsb and equal to or smaller than Tdm, the power mode control section 131 sets the power mode of the processor P-1 to the Standby mode, which is a sleep mode. When the predictive thread non processing time PTNPT-1 is larger than Tdm and equal to or smaller than Tsd, the power mode control section 131 sets the power mode of the processor P-1 to the Dormant mode, which is a sleep mode. When the predictive thread non processing time PTNPT-1 is larger than Tsd, the power mode control section 131 sets the power mode of the processor P-1 to the Shutdown mode, which is a sleep mode.

The power modes set in the power mode control section 131 are not limited to those shown in FIG. 7. It is sufficient that at least the Run mode, which is the normal operation mode, and one sleep mode are set in the power mode control section 131. In the power mode control section 131, a power mode different from those shown in FIG. 7 may be set.

The power mode control section 131 outputs control signals PCTRL-1 through PCTRL-N each indicating a power mode set for a corresponding one of the processors P-1 through P-N to the processors P-1 through P-N. The power mode control section 131 also outputs a control signal indicating the power mode set for each of the processors P-1 through P-N to the clock signal control section 132 as a corresponding one of control signals CCTRL-1 through CCTRL-N, and to the supply voltage control section 133 as a corresponding one of control signals VCTRL-1 through VCTRL-N. The control signals PCTRL-1 through PCTRL-N, CCTRL-1 through CCTRL-N and VCTRL-1 through VCTRL-N may be a signal indicating an interrupt debug request, a signal indicating soft reset, or a signal indicating a reset. The control signals PCTRL-1 through PCTRL-N may be a signal indicating start of the execution of the thread. This will be described later in detail.

The clock signal control section 132 uses a PLL (Phase-Locked Loop) circuit or the like to generate clock signals CLK-1 through CLK-N each in accordance with the power mode indicated by a corresponding one of the control signals CCTRL-1 through CCTRL-N. The clock signal control section 132 outputs the generated clock signals CLK-1 through CLK-N to the processors P-1 through P-N.

The supply voltage control section 133, for example, drops the supply voltage input from the power supply unit 4 to generate supply voltages VDD-1 through VDD-N in each accordance with a power mode indicated by a corresponding one of the control signals VCTRL-1 through VCTRL-N. The supply voltage control section 133 supplies the generated supply voltages VDD-1 through VDD-N to the processors P-1 through P-N.

For example, for transferring the power mode of the processor P-1 to the Standby mode, the power mode control section 131 outputs a control signal PCTRL-1 indicating the Standby mode to the processor P-1 to instruct the processor P-1 to transfer to the Standby mode. When detecting that the processor P-1 is ready to be recovered by interrupt, the power mode control section 131 outputs a control signal CCTRL-1 indicating the Standby mode to the clock signal control section 132, and outputs a control signal VCTRL-1 indicating the Standby mode to the supply voltage control section 133. Based on the control signal CCTRL-1, the clock signal control section 132 blocks the output of the clock signal CLK-1 to the processor core and the cache memory excluding an interrupt interface required for recovery. Based on the control signal VCTRL-1, the supply voltage control section 133 reduces the supply voltage of the processor core and the cache memory to the same level as that of the normal operation mode, or as low as possible in the range in which various registers in the processor core and the internal contexts such as data and the like in the cache memory are not vaporized.

For example, for transferring the power mode of the processor P-1 to the Shutdown mode, the power mode control section 131 outputs a control signal PCTRL-1 indicating the Shutdown mode to the processor P-1 to instruct the processor P-1 to transfer to the Shutdown mode. When detecting that all the contexts in the processor cores and the cache memory in the processor P-1 are retracted to an external memory, the power mode control section 131 outputs a control signal CCTRL-1 indicating the Shutdown mode to the clock signal control section 132, and outputs a control signal VCTRL-1 indicating the Shutdown mode to the supply voltage control section 133. Based on the control signal CCTRL-1, the clock signal control section 132 blocks the output of the clock signal CLK-1 to the processor core and the cache memory. Based on the control signal VCTRL-1, the supply voltage control section 133 blocks the supply voltage of the processor core and the cache memory.

<Operation>

Figure 8:
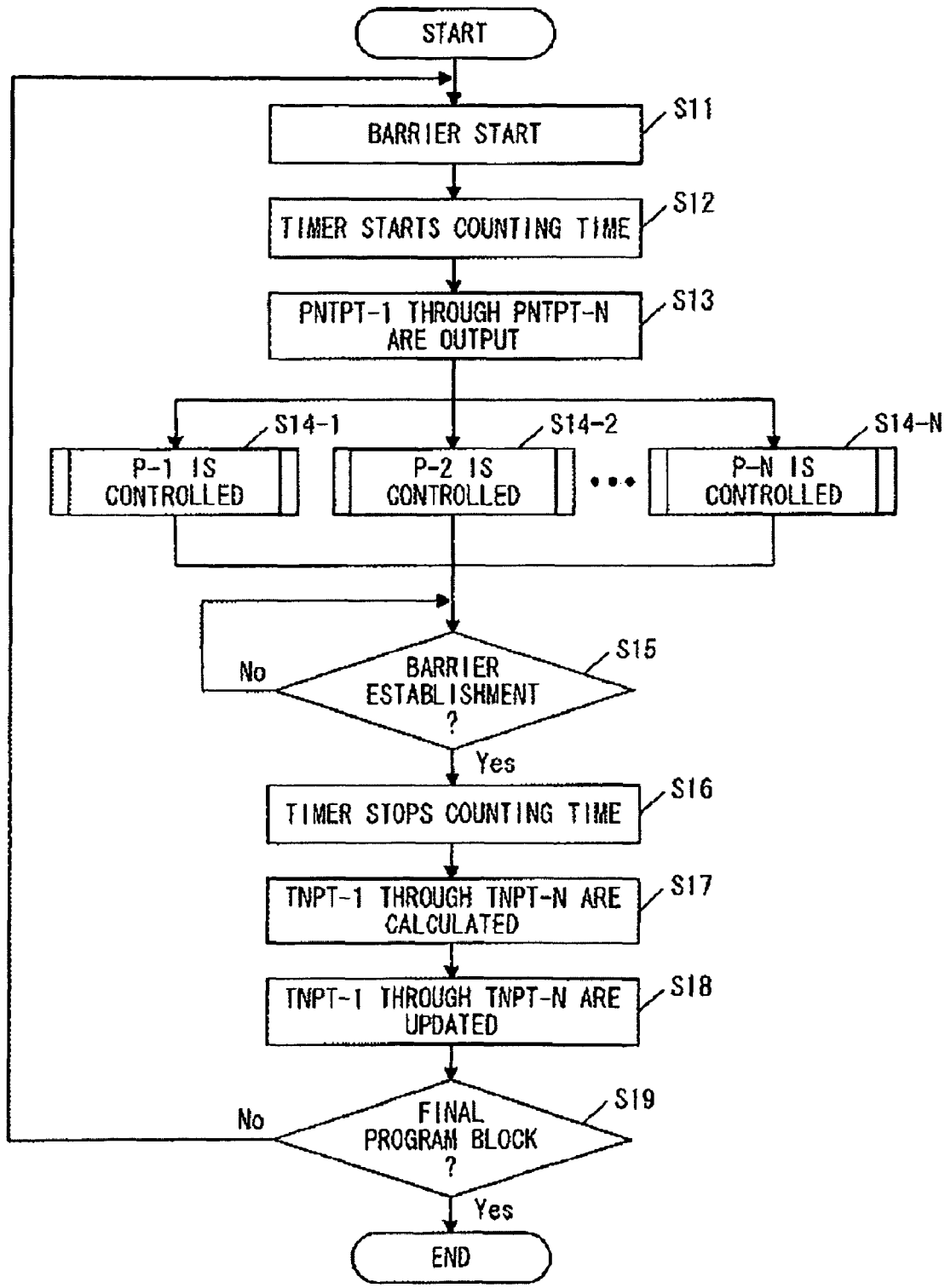
FIG. 8 is a flowchart showing an overall operation flow of the multiprocessor control unit 1.

Now, with reference to FIG. 8, an operation of the multiprocessor control unit 1 according to the first embodiment will be described. FIG. 8 is a flowchart showing an overall operation flow of the multiprocessor control unit 1.

As shown in FIG. 8, the barrier monitoring section 111 generates a barrier starting signal at the time of the barrier start, and outputs the generate barrier starting signal to the predictive information generation section 113 and the power control section 13 (step S11). In step S11, the barrier monitoring section 111 outputs the barrier identification information BID-m to the predictive information generation section 113 and the power control section 13. After step S11, when the barrier starting signal is input from the barrier monitoring section 111, the power mode control section 131 sets the lock variable in the main memory unit 3 to the number of processors or the number of threads as an initial value via the shared memory bus 2, and causes the timer 12 to start counting time (step S12). After step S12, when the barrier starting signal is input from the barrier monitoring section 111, the predictive information generation section 113 reads the thread non processing times TNPT-1 through TNPT-N associated with the barrier identification information BID-m from the history information storage section 112, and outputs the times to the power control section 13 as the predictive thread non processing times PTNPT-1 through PTNPT-N (step S13). After step S13, the processors P-1 through P-N are individually controlled (steps S14-1 through S14-N). Such individual control will be described later.

In step S15, based on the barrier establishment signal from the barrier monitoring section 111, the power mode control section 131 determines whether or not the barrier synchronization has been realized regarding the program block specified by the barrier identification information BID-m. The power mode control section 131 may determine whether or not the barrier synchronization has been realized by referring to the lock variable in the main memory unit 3 via the shared memory bus 2. When the power mode control section 131 determines that the barrier synchronization has been realized by a barrier establishment signal being input from the barrier monitoring section 111, the power mode control section 131 causes the timer 12 to stop counting and reset time (step S16).

After step S16, based on the barrier timing signal and the time counted by the timer 12, the barrier monitoring section 111 calculates the thread non processing times TNPT-1 through TNPT-N (step S17). Also in step S17, the barrier monitoring section 111 outputs the calculated thread non processing times TNPT-1 through TNPT-N to the history information storage section 112 together with the barrier identification information BID-m.

After step S17, the history information storage section 112 updates the thread non processing times TNPT-1 through TNPT-N stored above in the data section corresponding to the input barrier identification information BID-m with the thread non processing times TNPT-1 through TNPT-N output in step S17 (step S18).

After step S18, the barrier monitoring section 111 determines whether or not another barrier starting signal can be generated to determine whether or not the program block currently executed is the final program block (step S19). When the program block currently executed is the final program block (Yes in step S19), the processing is finished. When the program block currently executed is not the final program block (No in step S19), the processing returns to step S11 and the operation is performed for the next program block.

With reference to FIG. 9, the individual control on each of the processors P-1 through P-N (steps S14-1 through S14-N) will be described specifically. Since the control flow is the same among steps S14-1 through S14-N, FIG. 9 shows the control flow on the processor P-n.

As shown in shown in FIG. 9, the power mode control section 131 refers to the control signal PCTRL-n output by itself to determine whether or not the current power mode of the processor P-n is in a sleep mode (step S141).

When determining that the processor P-n is not in a sleep mode (No in step S141), the power mode control section 131 uses the control signal PCTRL-n to cause the processor P-n to start executing the thread immediately (step S142). Based on the barrier arrival signal from the barrier monitoring section 111, the power mode control section 131 determines whether or not the thread of the processor P-n has realized the barrier arrival (step S143). When determining that the thread has realized the barrier arrival (Yes in step S143), the power mode control section 131 performs the sleep transfer control. Specifically, the power mode control section 131 sets the sleep mode to which the processor P-1 is to be transferred, in accordance with the predictive thread non processing time PTNPT-n output in step S13. The power mode control section 131 outputs control signals PCTRL-n, CCTRL-n and VCTRL-n indicating the set sleep mode to the processor P-n, the clock signal control section 132 and the supply voltage control section 133 respectively. Thus, the processor P-n is put into the barrier wait in the sleep mode in accordance with the predictive thread non processing time PTNPT-n.

By contrast, when determining that the processor P-n is in a sleep mode (Yes in step S141), the power mode control section 131 monitors the timer 12 and waits until the predictive thread non processing time PTNPT-n output in step S13 passes. Then, the power mode control section 131 performs recovery control to the normal operation mode (step S145). Specifically, when the time count of the timer 12 has passed the predictive thread non processing time PTNPT-n output in step S13, the power mode control section 131 outputs control signals PCTRL-n, CCTRL-n and VCTRL-n indicating the normal operation mode to the processor P-n, the clock signal control section 132 and the supply voltage control section 133 respectively. Thus, the processor P-n is recovered from the sleep mode to the normal operation mode. As described above, when the processor P-n has transferred to a sleep mode at the time of the immediately previous barrier establishment, the sleep mode continues for the predictive thread non processing time PTNPT-n from the barrier start by the operations in steps S141 and 5145 in the current barrier synchronization.

From, for example, the Standby mode shown in FIG. 7, the processor P-n can be recovered to the normal operation mode by the power mode control section 131 merely outputting a control signal CCTRL-n indicating an interrupt debug request to the clock signal control section 132 to restart the output of the clock signal CLK-n. By contrast, from the Shutdown mode, the processor P-n is recovered as follows. The power mode control section 131 first outputs control signals CCTRL-n and VCTRL-n indicating a reset to the clock signal control section 132 and the supply voltage control section 133 to restart the output of the clock signal CLK-n and the supply voltage VDD-n. In order to recover the processor P-n to the normal operation mode after this, all the contexts which were retracted for the transfer to the Shutdown mode need to be recovered. As can be seen, the time required for recovery varies in accordance with the depth of the sleep mode. Therefore, the power mode control section 131 performs the operation in step S145 while considering such difference in time for recovery, such that the recovery is started before the predictive thread non processing time PTNPT-n passes. Thus, the influence on the performance decline can be suppressed.

After step S145, the power mode control section 131 uses the control signal PCTRL-n to cause the processor P-n to start executing the thread immediately (step S146). Based on the barrier arrival signal from the barrier monitoring section 111, the power mode control section 131 determines whether or not the thread of the processor P-n has realized the barrier arrival (step S147). When it is determined that the thread has realized the barrier arrival (Yes in step S147), the processing advances to step S15 shown in FIG. 8. Since the processor P-n already had a sleep time of the predictive thread non processing time PTNPT-n before executing the thread, the processor P-n is expected not to be able to sleep more. Therefore, by the advancement of the operation from step S147 to step S15, the processor P-n is put into the barrier wait in a state like spin waiting.

Now, with reference to specific examples shown in FIG. 10 and FIG. 11, how the program is executed by the above-described, control of the multiprocessor control unit 1 will be described.

Figure 10:
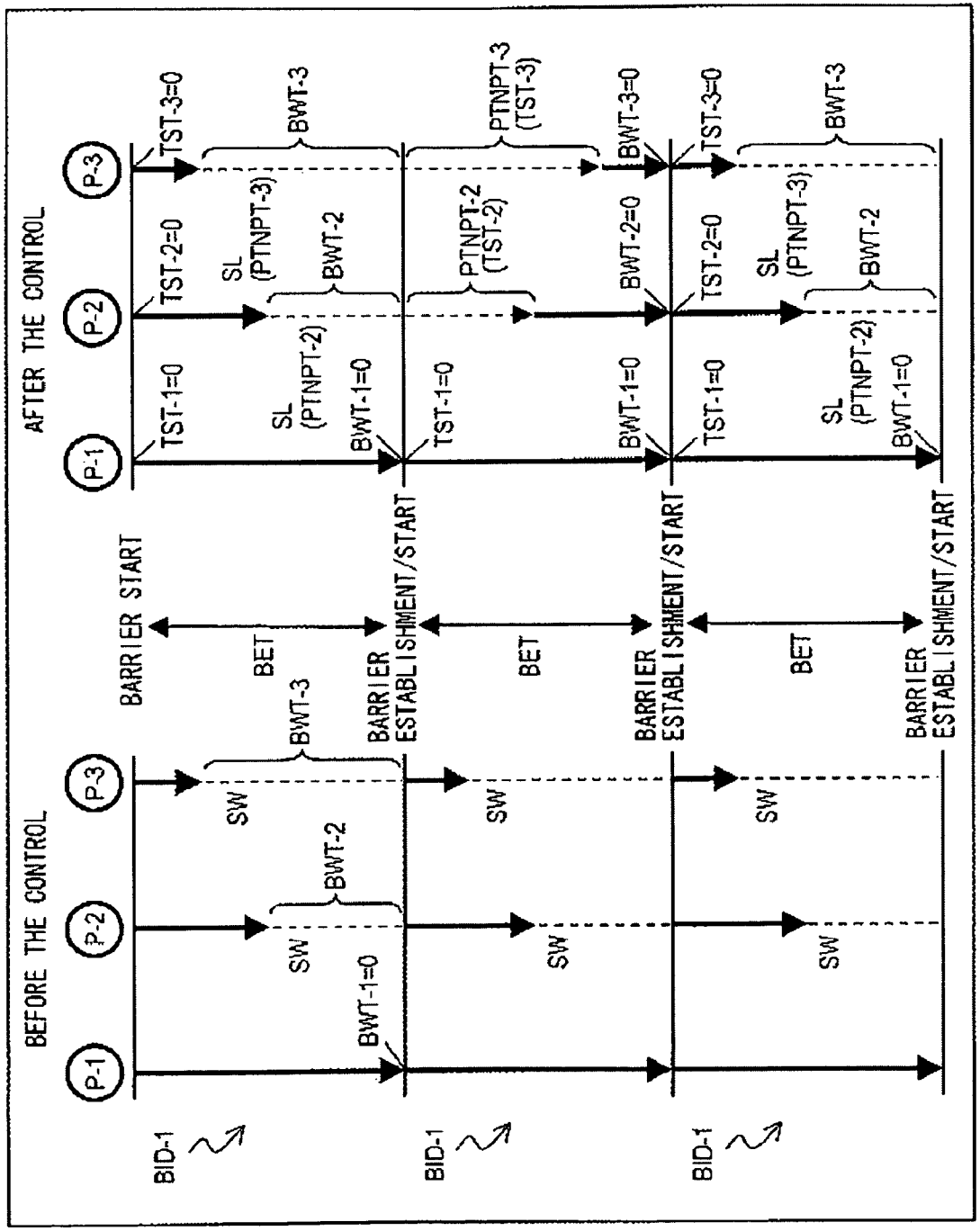
FIG. 10 shows an execution state of each thread before and after the control when the same parallel program block is executed in a loop.

FIG. 10 shows an execution state of each thread before and after the control when the same parallel program block is executed in a loop. In FIG. 10, a parallel program block specified by the barrier identification information BID-1 is executed in a loop. The parallel program block is divided into three threads, and the three divided threads are assigned to the processors P-1 through P-3 respectively. At the time of the first barrier start, the power mode of all the processors P-1 through P-3 is the normal operation mode.

Referring to FIG. 10, the execution state before the control will be described. The processor P-1 starts executing the thread almost simultaneously with the first barrier start. The barrier arrival time of the processor P-1 is longer than that of the processors P-2 and P-3. Therefore, simultaneously with the barrier arrival of the thread of the processor P-1, the first barrier establishment is realized. "BWT-1", which is the barrier waiting time of the processor P-1 at this time is "0". The processor P-2 starts executing the thread almost simultaneously with the first barrier start. The thread of the processor P-2 realizes the barrier arrival before the first barrier establishment. Then, the processor P-2 is in the barrier wait in a spin waiting (SW) state from the barrier arrival until the first barrier establishment. The barrier waiting time at this time is "BWT-2". The processor P-3 starts executing the thread almost simultaneously with the first barrier start. The thread of the processor P-3 realizes the barrier arrival before the first barrier establishment. Then, the processor P-3 is in the barrier wait in a spin waiting (SW) state from the barrier arrival until the first barrier establishment. The barrier waiting time at this time is "BWT-3". After this, the above execution state is repeated to execute the parallel program block.

Referring to FIG. 10, the execution state after the control will be described. In the history information storage section 112, the thread non processing times TNPT-1 (=0), TNPT-2 (=BWT-2), TNPT-1 (=BWT-3) are stored regarding the barrier identification information BID-1.

The processor P-1 starts executing the thread (step S142) almost simultaneously with the first barrier start (step S11). The reason is that it is determined No in step S141 because the power mode of the processor P-1 is the normal operation mode at the time of the first barrier start. When the thread of the processor P-1 realizes the barrier arrival (Yes in step S143), the processor P-1 encounters the first barrier establishment while being kept in the normal operation mode without being transferred to a sleep mode. The reason is that the predictive thread non processing time PTNPT-1 output in step S13 in the first loop is "0" and the processor P-1 is not transferred to a sleep mode by the processing in step S144. The barrier arrival time of the processor P-1 is longer than that of the processors P-2 and P-3. Therefore, simultaneously with the barrier arrival of the thread of the processor P-1, the first barrier establishment is realized.

The processor P-2 starts executing the thread (step S142) almost simultaneously with the first barrier start (step S11). When the thread of the processor P-2 realizes the barrier arrival (Yes in step S143), the processor P-2 is transferred to the sleep mode SL (PTNPT-2) in accordance with the predictive thread non processing time PTNPT-2 output in step S13 in the first loop (step S144). Then, the processor P-2 encounters the first barrier establishment while being kept in the sleep mode SL (PTNPT-2).

The processor P-3 starts executing the thread (step S142) almost simultaneously with the first barrier start (step S11).

When the thread of the processor P-3 realizes the barrier arrival (Yes in step S143), the processor P-3 is transferred to the sleep mode SL (PTNPT-3) in accordance with the predictive thread non processing time PTNPT-3 output in step S13 in the first loop (step S144). Then, the processor P-3 encounters the first barrier establishment while being kept in the sleep mode SL (PTNPT-3).

After the first barrier establishment, the history information in the history information storage section 112 is updated such that the thread non processing time TNPT-1 is the sum (=0) of TST-1 and BWT-1, such that the thread non processing time TNPT-2 is the sum (=BWT-2) of TST-2 and BWT-2, and such that the thread non processing time TNPT-3 is the sum (=BWT-3) of TST-3 and BWT-3 (step S18).

The processor P-1 starts executing the thread (step S142) almost simultaneously with the second barrier start (step S11). The reason is that it is determined No in step S141 because the power mode of the processor P-1 is the normal operation mode at the time of the first barrier establishment. When the thread of the processor P-1 realizes the barrier arrival (Yes in step S143), the processor P-1 encounters the second barrier establishment while being kept in the normal operation mode. The reason is that the predictive thread non processing time PTNPT-1 output in step S13 in the second loop is "0" and the processor P-1 is not transferred to a sleep mode by the processing in step S144. The barrier arrival time of the processor P-1 is longer than that of the processors P-2 and P-3. Therefore, simultaneously with the barrier arrival of the thread of the processor P-1, the second barrier establishment is realized.

The processor P-2 is kept in the sleep mode SL (PTNPT-2) from the second barrier start (step S11) until the predictive thread non processing time PTNPT-2 output in step S13 in the second loop passes. When the predictive thread non processing time PTNPT-2 has passed, the processor P-2 is recovered to the normal operation mode (step S145) and starts executing the thread (step S146). Simultaneously with the barrier arrival of the thread of the processor P-2 (Yes in step S147), the processor P-2 encounters the second barrier establishment. The reason is that the thread of the processor P-2 starts being executed after the barrier start with a delay time equal to the first barrier waiting time BWT-2 and the time duration in which the processor P-2 is in a spin waiting state is almost "0". The thread starting time TST-2 matches the predictive thread non processing time PTNPT-2.

The processor P-3 is kept in the sleep mode SL (PTNPT-3) from the second barrier start (step S11) until the predictive thread non processing time PTNPT-3 output in step S13 in the second loop passes. When the predictive thread non processing time PTNPT-3 has passed, the processor P-3 is recovered to the normal operation mode (step S145) and starts executing the thread (step S146). Simultaneously with the barrier arrival of the thread of the processor P-3 (Yes in step S147), the processor P-3 encounters the second barrier establishment. The reason is that the thread of the processor P-3 starts being executed after the barrier start with a delay time equal to the first barrier waiting time BWT-3 and the time duration in which the processor P-3 is in a spin waiting state is almost "0". The thread starting time TST-3 matches the predictive thread non processing time PTNPT-3.

After the second barrier establishment, the history information in the history information storage section 112 is updated such that the thread non processing time TNPT-1 is the sum (=0) of TST-1 and BWT-1, such that the thread non processing time TNPT-2 is the sum (=BWT-2) of TST-2 and BWT-2, and such that the thread non processing time TNPT-3 is the sum (=BWT-3) of TST-3 and BWT-3 (step S18).

The execution state after the third barrier start is the same as the execution state after the first barrier start and the description will be omitted.

Figure 11:
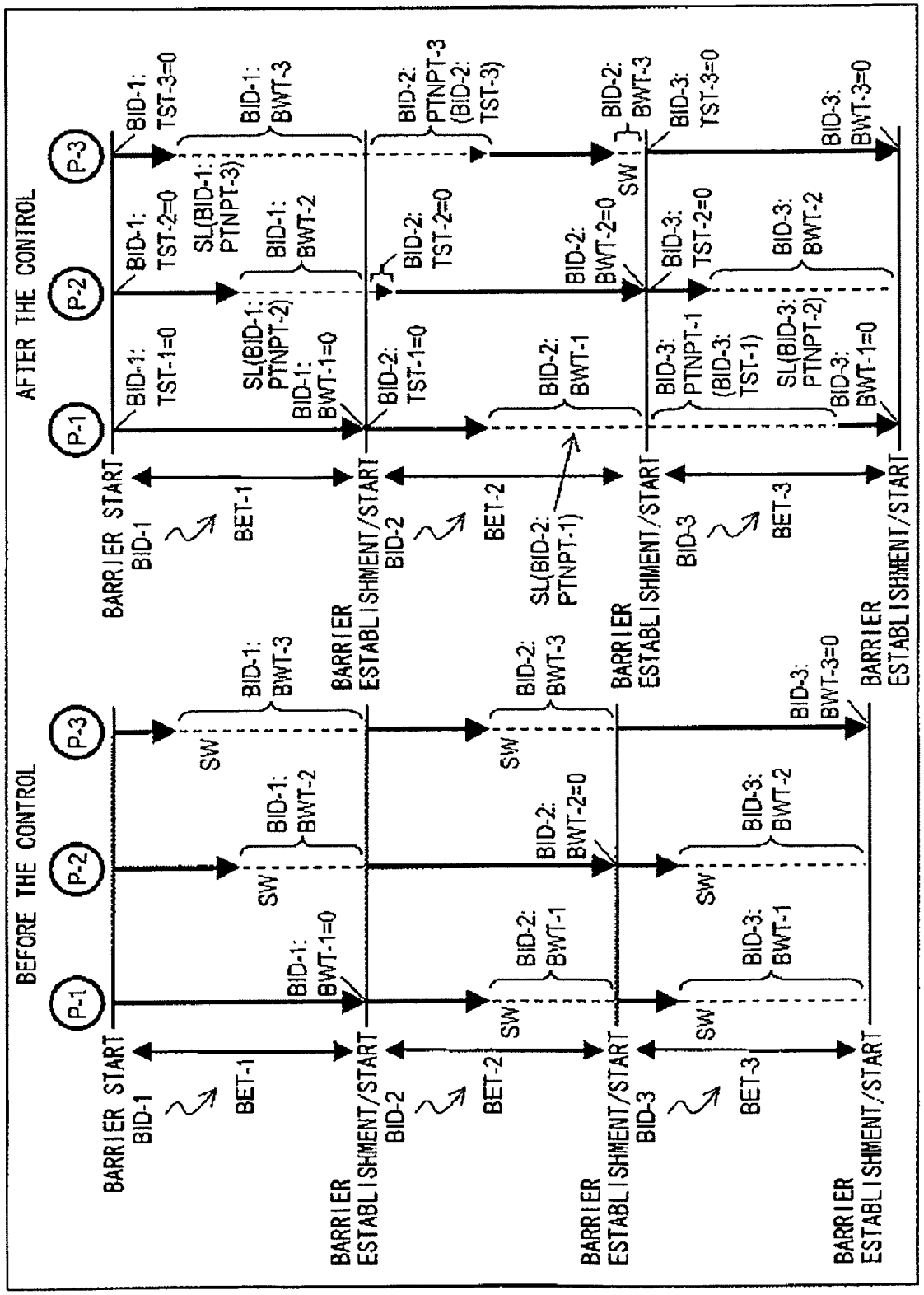
FIG. 11 shows an execution state of each thread before and after the control when different parallel program blocks are consecutively executed.

FIG. 11 shows an execution state of each thread before and after the control when different parallel program blocks are executed consecutively. In FIG. 11, a parallel program block specified by the barrier identification information BID-1, a parallel program block specified by the barrier identification information BID-2, and a parallel program block specified by the barrier identification information BID-3 are consecutively executed. Each parallel program block is divided into three threads, and the three divided threads are assigned to the processors P-1 through P-3 respectively. At the time of the barrier start of the parallel program block specified by the barrier identification information BID-1, the power mode of all the processors P-1 through P-3 is the normal operation mode.

Referring to FIG. 11, the execution state before the control will be described. The processor P-1 starts executing the thread almost simultaneously with the first barrier start. The barrier arrival time of the thread of the processor P-1 is longer than that of the processors P-2 and P-3. Therefore, simultaneously with the barrier arrival of the thread of the processor P-1, the first barrier establishment is realized. "BID-1:BWT-1", which is the barrier waiting time of the processor P-1 at this time is "0".

The processor P-2 starts executing the thread almost simultaneously with the first barrier start. The thread of the processor P-2 realizes the barrier arrival before the first barrier establishment. Then, the processor P-2 is in the barrier wait in a spin waiting (SW) state from the barrier arrival until the first barrier establishment. The barrier waiting time at this time is "BID-1:BWT-2".

The processor P-3 starts executing the thread almost simultaneously with the first barrier start. The thread of the processor P-3 realizes the barrier arrival before the first barrier establishment. Then, the processor P-3 is in the barrier wait in a spin waiting (SW) state from the barrier arrival until the first barrier establishment. The barrier waiting time at this time is "BID-1:BWT-3".

The processor P-1 starts executing the thread almost simultaneously with the second barrier start. The thread of the processor P-1 realizes the barrier arrival before the second barrier establishment. Then, the processor P-1 is in the barrier wait in a spin waiting (SW) state from the barrier arrival until the second barrier establishment. The barrier waiting time at this time is "BID-2:BWT-1".

The processor P-2 starts executing the thread almost simultaneously with the second barrier start. The barrier arrival time of the thread of the processor P-2 is longer than that of the processors P-1 and P-3. Therefore, simultaneously with the barrier arrival of the thread of the processor P-2, the second barrier establishment is realized. "BID-2:BWT-2", which is the barrier waiting time of the processor P-2 at this time is "0".

The processor P-3 starts executing the thread almost simultaneously with the second barrier start. The thread of the processor P-3 realizes the barrier arrival before the second barrier establishment. Then, the processor P-3 is in the barrier wait in a spin waiting (SW) state from the barrier arrival until the second barrier establishment. The barrier waiting time at this time is "BID-2:BWT-3".

The processor P-1 starts executing the thread almost simultaneously with the third barrier start. The thread of the processor P-1 realizes the barrier arrival before the third barrier establishment. Then, the processor P-1 is in the barrier wait in a spin waiting (SW) state from the barrier arrival until the third barrier establishment. The barrier waiting time at this time is "BID-3:BWT-1".

The processor P-2 starts executing the thread almost simultaneously with the third barrier start. The thread of the processor P-2 realizes the barrier arrival before the third barrier establishment. Then, the processor P-2 is in the barrier wait in a spin waiting (SW) state from the barrier arrival until the third barrier establishment. The barrier waiting time at this time is "BID-3:BWT-2".

The processor P-3 starts executing the thread almost simultaneously with the third barrier start. The barrier arrival time of the thread of the processor P-3 is longer than that of the processors P-1 and P-2. Therefore, simultaneously with the barrier arrival of the thread of the processor P-3, the third barrier establishment is realized. "BID-3:BWT-3", which is the barrier waiting time of the processor P-3 at this time is "0".

Referring to FIG. 11, the execution state after the control will be described. In the history information storage section 112, the thread non processing times (BID-1:TNPT-1) (=0), (BID-1:TNPT-2) (=BID-1:BWT-2), (BID-1:TNPT-3) (=BID-1:BWT-3) are stored regarding the barrier identification information BID-1. Also in the history information storage section 112, the thread non processing times (BID-2:TNPT-1) (=BID-2:BWT-1), (BID-2:TNPT-2) (=0), (BID-2:TNPT-3) (=BID-2:BWT-3) are stored regarding the barrier identification information BID-2. In the history information storage section 112, the thread non processing times (BID-3:TNPT-1) (=BID-3:BWT-1), (BID-3:TNPT-2) (=BID-3:BWT-2), (BID-3:TNPT-3) (=0) are stored regarding the barrier identification information BID-3.

The processor P-1 starts executing the thread (step S142) almost simultaneously with the first barrier start (step S11). The reason is that it is determined No in step S141 because the power mode of the processor P-1 is the normal operation mode at the time of the first barrier start. When the thread of the processor P-1 realizes the barrier arrival (Yes in step S143), the processor P-1 encounters the first barrier establishment while being kept in the normal operation mode. The reason is that the predictive thread non processing time (BID-1:PTNPT-1) output in step S13 in the first loop is "0" and the processor P-1 is not transferred to a sleep mode by the processing in step S144. The barrier arrival time of the processor P-1 is longer than that of the processors P-2 and P-3. Therefore, simultaneously with the barrier arrival of the thread of the processor P-1, the first barrier establishment is realized.

The processor P-2 starts executing the thread (step S142) almost simultaneously with the first barrier start (step S11). When the thread of the processor P-2 realizes the barrier arrival (Yes in step S143), the processor P-2 is transferred to the sleep mode SL (BID-1:PTNPT-2) in accordance with the predictive thread non processing time (BID-1: PTNPT-2) output in step S13 in the first loop (step S144). Then, the processor P-2 encounters the first barrier establishment while being kept in the sleep mode SL (BID-1:PTNPT-2).

The processor P-3 starts executing the thread (step S142) almost simultaneously with the first barrier start (step S11). When the thread of the processor P-3 realizes the barrier arrival (Yes in step S143), the processor P-3 is transferred to the sleep mode SL (BID-1:PTNPT-3) in accordance with the predictive thread non processing time (BID-1: PTNPT-3) output in step S13 in the first loop (step S144). Then, the processor P-3 encounters the first barrier establishment while being kept in the sleep mode SL (BID-1:PTNPT-3).

After the first barrier establishment, the history information in the history information storage section 112 is updated such that the thread non processing time (BID-1:TNPT-1) is the sum (=0) of (BID-1:TST-1) and (BID-1:BWT-1), such that the thread non processing time (BID-1:TNPT-2) is the sum of (BID-1:TST-2) and (BID-1:BWT-2), and such that the thread non processing time (BID-1:TNPT-3) is the sum of (BID-1:TST-3) and (BID-1:BWT-3) (step S18).

The processor P-1 starts executing the thread (step S142) almost simultaneously with the second barrier start (step S11). The reason is that it is determined No in step S141 because the power mode of the processor P-1 is the normal operation mode at the time of the first barrier establishment. When the thread of the processor P-1 realizes the barrier arrival (Yes in step S143), the processor P-1 is transferred to the sleep mode SL (BID-2:PTNPT-1) in accordance with the predictive thread non processing time (BID-2:PTNPT-1) output in step S13 in the second loop (step S144). Then, the processor P-1 encounters the second barrier establishment while being kept in the sleep mode SL (BID-2:PTNPT-1).

The processor P-2 is kept in the sleep mode SL (BID-1:PTNPT-2) from the second barrier start (step S11) until the predictive thread non processing time (BID-2:PTNPT-2) output in step S13 in the second loop passes. The predictive thread non processing time (BID-2:PTNPT-2) is "0". Therefore, the processor P-2 is immediately recovered to the normal operation mode (step S145) and starts executing the thread (step S146). The barrier arrival time of the thread of the processor P-2 is longer than that of the processors P-1 and P-3. The predictive thread non processing time (BID-2:PTNPT-2) is "0" and the processor P-2 is not transferred to a sleep mode by the processing in step S144. Therefore, simultaneously with the barrier arrival of the thread of the processor P-2, the second barrier establishment is realized.

The processor P-3 is kept in the sleep mode SL (BID-1:PTNPT-3) from the second barrier start (step S11) until the predictive thread non processing time (BID-2:PTNPT-3) output in step S13 in the second loop passes. When the predictive thread non processing time (BID-2:PTNPT-3) has passed, the processor P-3 is recovered to the normal operation mode (step S145) and starts executing the thread (step S146). Then, the processor P-3 is in the barrier wait in a spin waiting state from the barrier arrival until the second barrier establishment.

After the second barrier establishment, the history information in the history information storage section 112 is updated such that the thread non processing time (BID-2:TNPT-1) is the sum of (BID-2:TST-1) and (BID-2:BWT-1), such that the thread non processing time (BID-2:TNPT-2) is the sum of (BID-2:TST-2) and (BID-2:BWT-2), and such that the thread non processing time (BID-2:TNPT-3) is the sum of (BID-2:TST-3) and (BID-2:BWT-3) (step S18).

The processor P-1 is kept in the sleep mode SL (BID-2:PTNPT-1) from the third barrier start (step S11) until the predictive thread non processing time (BID-3:PTNPT-1) output in step S13 in the third loop passes. When the predictive thread non processing time (BID-3:PTNPT-1) has passed, the processor P-1 is recovered to the normal operation mode and start executing the thread (step S146). Simultaneously with the barrier arrival of the thread of the processor P-1 (Yes in step S147), the processor P-1 encounters the third barrier establishment. The reason is that the thread of the processor P-1 starts being executed after the barrier start with a delay time equal to the barrier waiting time (BID-3:BWT-1) and the time duration in which the processor P-1 is in a spin waiting state is almost "0" because of the relationship with the thread of the processor P-3 described later. The thread starting time (BID-3:TST-1) matches the predictive thread non processing time (BID-3:PTNPT-1).

The processor P-2 starts executing the thread (step S142) almost simultaneously with the third barrier start (step S11).

The reason is that it is determined No in step S141 because the power mode of the processor P-2 is the normal operation mode at the time of the second barrier establishment. When the thread of the processor P-2 realizes the barrier arrival (Yes in step S143), the processor P-2 is transferred to the sleep mode SL (BID-3:PTNPT-2) in accordance with the predictive thread non processing time (BID-3:PTNPT-2) output in step S13 in the third loop (step S144). Then, the processor P-2 encounters the third barrier establishment while being kept in the sleep mode SL (BID-3:PTNPT-2).

The processor P-3 starts executing the thread (step S142) almost simultaneously with the third barrier start (step S11). The reason is that it is determined No in step S141 because the power mode of the processor P-3 is the normal operation mode at the time of the second barrier establishment. When the thread of the processor P-3 realizes the barrier arrival (Yes in step S143), the processor P-3 encounters the third barrier establishment while being kept in the normal operation mode without being transferred to a sleep mode. The reason is that the predictive thread non processing time (BID-3:PTNPT-3) output in step S13 in the third loop is "0" and the processor P-3 is not transferred to a sleep mode by the processing in step S144. The barrier arrival time of the processor P-3 is longer than that of the processors P-1 and P-2. Therefore, simultaneously with the barrier arrival of the thread of the processor P-3, the third barrier establishment is realized.

After the third barrier establishment, the history information in the history information storage section 112 is updated such that the thread non processing time (BID-3:TNPT-1) is the sum of (BID-3:TST-1) and (BID-3:BWT-1), such that the thread non processing time (BID-3:TNPT-2) is the sum of (BID-3:TST-2) and (BID-3:BWT-2), and such that the thread non processing time (BID-3:TNPT-3) is the sum (=0) of (BID-3:TST-3) and (BID-3:BWT-3) (step S18).

As described above, according to this embodiment, the timing to start the thread execution of each processor is controlled such that the execution state of the threads is the same before and after the barrier start (steps S142 and S146). Immediately after the barrier start (step S11), the power mode of each processor is determined (S141). When the power mode of the processor has already been transferred to a sleep mode, the sleep mode is kept. When the power mode of the processor is still the normal operation mode, the normal operation mode is kept. Thus, sleep control over two program blocks can be realized. As a result, as compared with the conventional art, the number of times of transfer to a sleep mode and the number of times of recovery to the normal operation mode can be reduced and further power saving can be realized.

In step S13 in FIG. 8, the predictive information generation section 113 reads the thread non processing times TNPT-1 through TNPT-N associated with the barrier identification information BID-m from the history information storage section 112, but the present invention is not limited to this. As shown in FIG. 10, in the case where the same parallel program block is executed in a loop, the parallel program block (m+1) to be executed next can be found in advance. Therefore, in this case, the predictive information generation section 113 may additionally read the thread non processing times TNPT-1 through TNPT-N associated with the barrier identification information BID-m+1. The power mode control section 131 sets the power mode of the processor P-n in accordance with the sum of the input predictive thread non processing time PTNPT-n of the barrier identification information BID-m and the input predictive thread non processing time PTNPT-n of the barrier identification information BID-m+1. Thus, transfer to a sleep mode in accordance with the sum of two predictive thread non processing times can be realized in the parallel program block currently executed. As a result, a deeper sleep mode can be set and further power saving can be realized.

In the case where a sequential program block is to be executed, the number of threads simultaneously executed is smaller than the number of the processors. In this case, there is a processor(s) to which no thread is assigned. Regarding a processor having no thread assigned thereto, the following is performed. When the power mode is determined to as a sleep mode (Yes in step S141), no processing is executed in the sleep recovery control (step S145), and the processor is immediately caused to realize the barrier arrival (Yes in step S147) and is kept in the sleep mode. By contrast, when the power mode is not determined to as a sleep mode (No in step S141), the processor is immediately caused to realize the barrier arrival (Yes in step S143) and sleep transfer control is performed (step S144). Thus, a processor having no thread assigned thereto realizes the barrier arrival immediately after the barrier start regardless of the result of the power mode determination. Therefore, the barrier arrival time is almost "0", and the thread non processing time is of a large value equivalent to the barrier establish time based on the relationships represented by expressions (1) and (2). As a result, the next time this sequential program block is executed and after that, the predictive thread non processing time is large. Therefore, the processor is expected to be transferred to a deeper sleep mode in the sleep transfer control (step S144).

<First Modification of the First Embodiment>

As shown in FIG. 5, in the first embodiment, the history information storage section 112 stores the thread non processing times TNPT-1 through TNPT-N for each barrier identification information BID. Therefore, the memory capacity of the data section needs to be increased in proportion to the number of processors mounted on the multiprocessor system. As a result, the circuit scale of the multiprocessor control unit 1 may be enlarged. A first modification has an object of decreasing the data amount stored in the history information storage section 112 and suppressing the enlargement of the circuit scale of the multiprocessor control unit 1.

<Structure>

Figure 12:
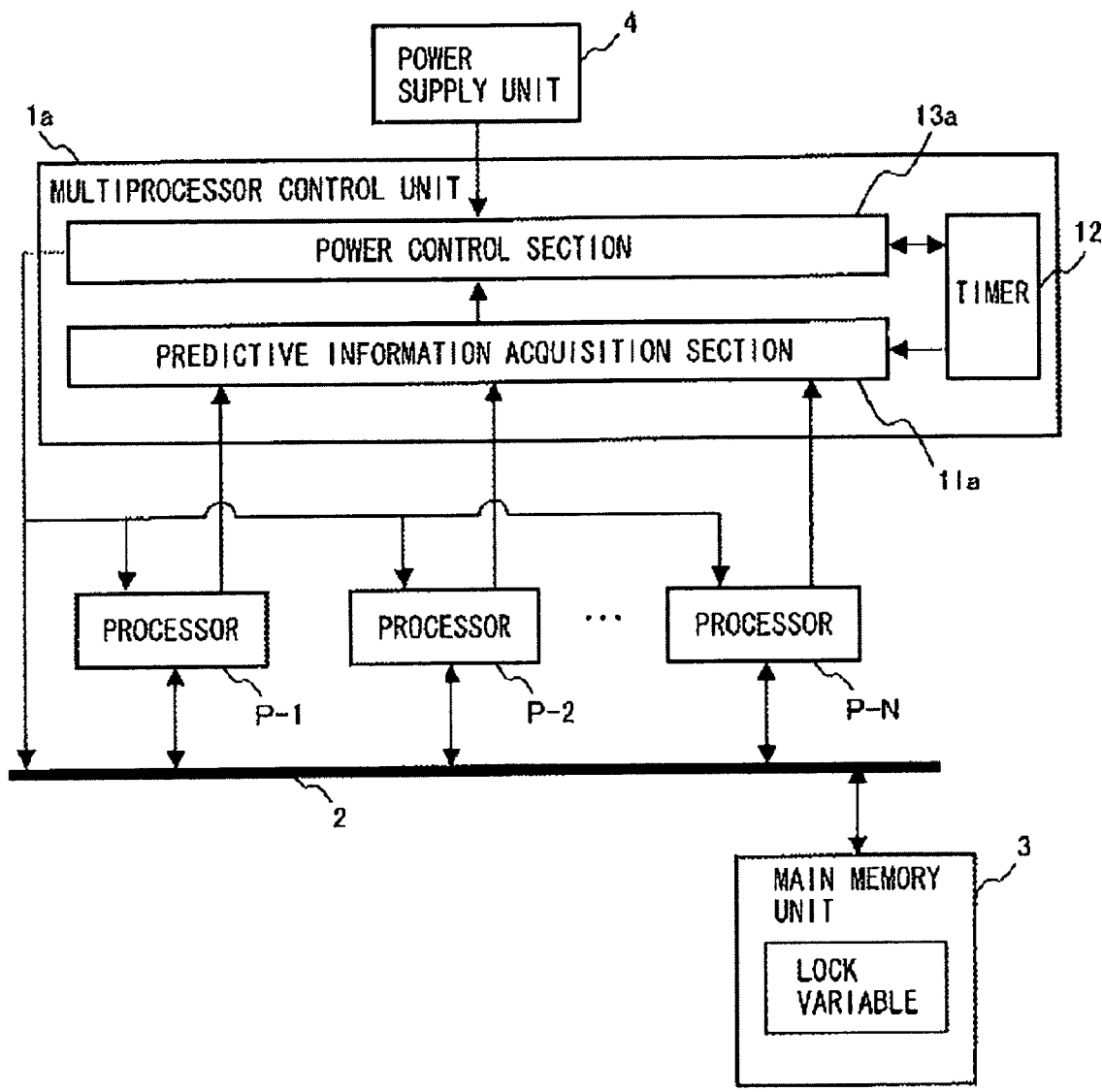
FIG. 12 shows an example of a structure of a shared memory type multiprocessor system using a multiprocessor control unit according to a first modification of the first embodiment.

FIG. 12 shows an example of a structure of a shared memory type multiprocessor system using a multiprocessor control unit according to the first modification. The multiprocessor system according to the first modification is different from the structure shown in FIG. 3 only in that the multiprocessor control unit 1 is replaced with a multiprocessor control unit 1a and that the multiprocessor control unit 1a includes a predictive information acquisition section 11a, a timer 12, and a power control section 13a. Hereinafter, the differences will be mainly described.

Figure 13:
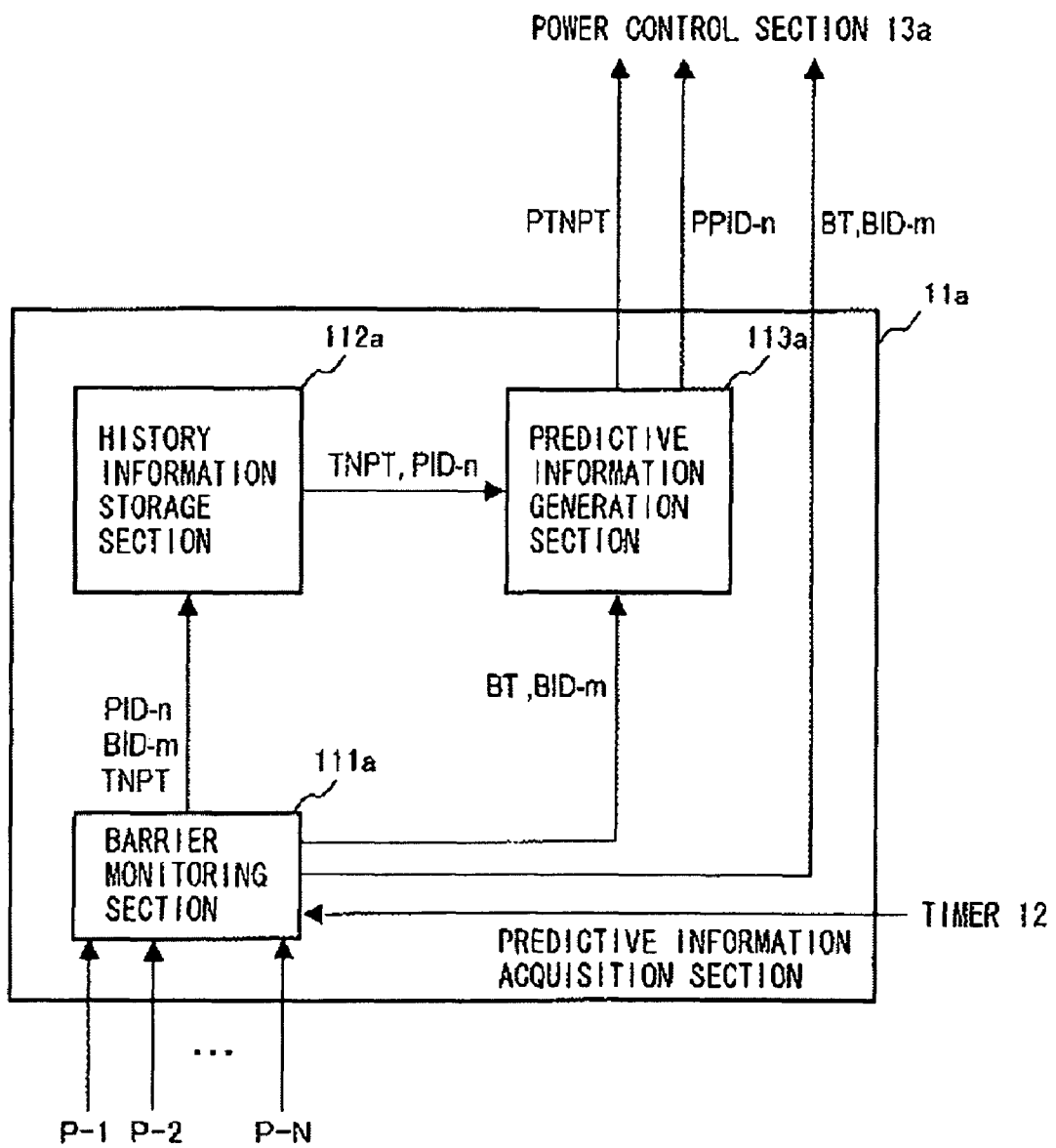

The predictive information acquisition section 11a acquires one piece of predictive information on each program block, and outputs the acquired predictive information to the power control section 13a. Hereinafter, with reference to FIG. 13, a specific structure of the predictive information acquisition section 11a will be described. FIG. 13 shows a specific example of the structure of the predictive information acquisition section 11a. The predictive information acquisition section 11a includes a barrier monitoring section 111a, a history information storage section 112a, and a predictive information generation section 113a.

Unlike the barrier monitoring section 111 described above, the barrier monitoring section 111a further calculates thread non processing time TNPT, which is a statistic value (for example, an average value) of the calculated thread non processing times TNPT-1 through TNPT-N and outputs the thread non processing time TNPT to the history information storage section 112a. Also unlike the barrier monitoring section 111 described above, the barrier monitoring section 111a specifies the processor, the thread of which is the last thread to realize the barrier arrival, for each program block based on the barrier arrival signals, and outputs processor identification information PID for specifying the processor to the history information storage section 112a. In this example, the barrier monitoring section 111a outputs processor identification information PID-n. n is the number specifying the processor. Other than the above, the barrier monitoring section 111a is substantially the same as the barrier monitoring section 111.

The history information storage section 112a stores the input thread non processing time TNPT in a history table shown in FIG. 14. FIG. 14 shows the history table in the history information storage section 112a. The history information storage section 112a stores the barrier identification information BID-m input from the barrier monitoring section 111a in an arbitrary entry of the tag section. The history information storage section 112a stores the processor identification information PID-n input from the barrier monitoring section 111a in an entry of the tag section corresponding to the entry in which the barrier identification information BID-m is stored. The history information storage section 112a stores the thread non processing time TNPT input from the barrier monitoring section 111a in an entry of the data section corresponding to the entry in which the barrier identification information BID-m is stored. In this manner, the history table stores the barrier identification information BID-m, the processor identification information PID-n and the thread non processing time TNPT of the program block specified by the barrier identification information BID-m in association with one another. Other than the above, the history information storage section 112a is substantially the same as the history information storage section 112.

The predictive information generation section 113a refers to the barrier timing signal BT to read the processor identification information PID-n and the thread non processing time TNPT associated with the barrier identification information BID-m from the history information storage section 112a at the time of the barrier start or barrier arrival, and outputs the read data to the power control section 13a as predictive processor identification information PFID-n and predictive thread non processing time PTNPT.

Figure 15:
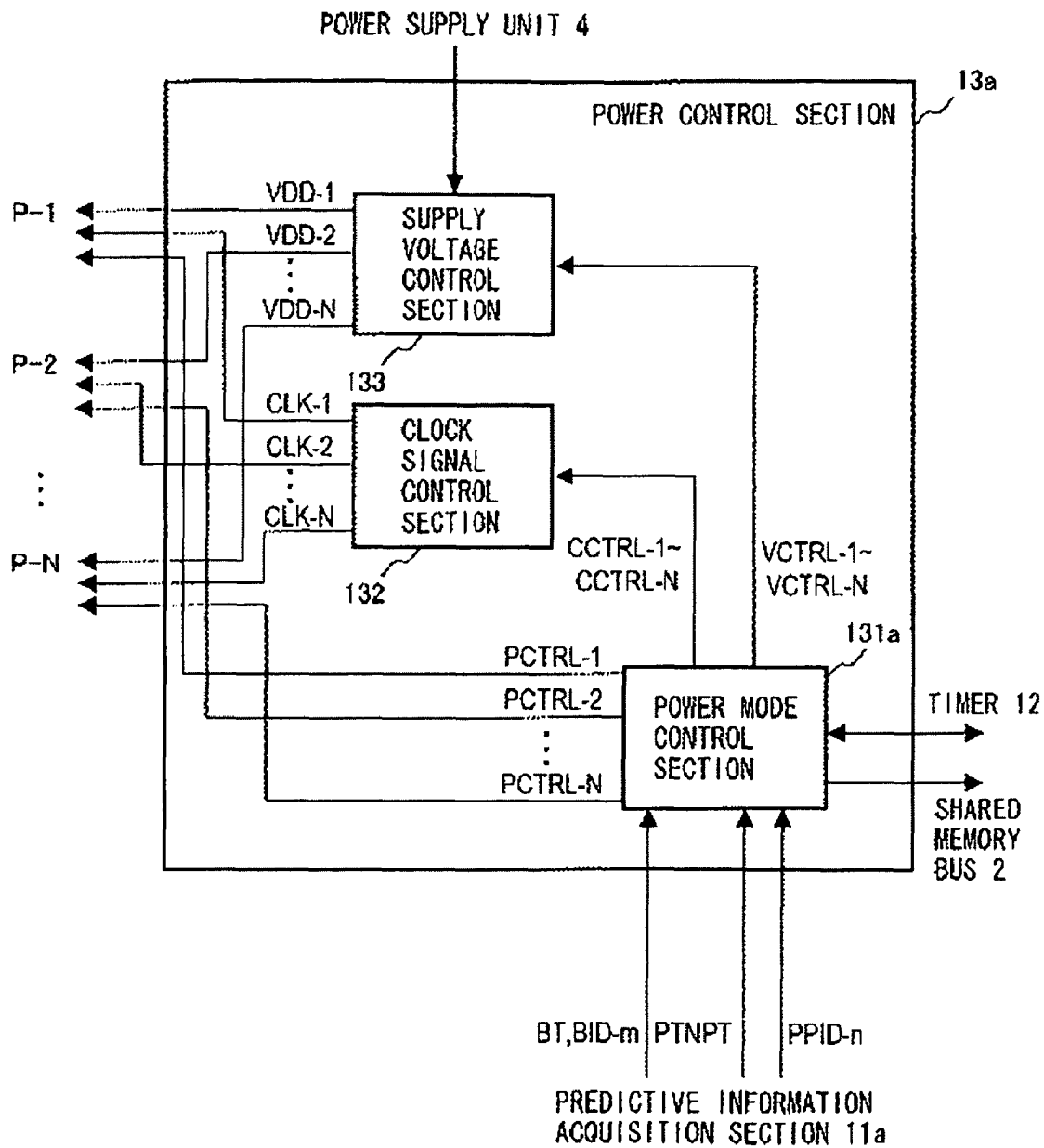

The power control section 13a controls the supply voltage and/or the clock signal to be supplied to each of the processors P-1 through P-N based on the predictive information input from the predictive information acquisition section 11a to control the power supply to each of the processors P-1 through P-N. Hereinafter, with reference to FIG. 15, a specific structure of the power control section 13a will be described. FIG. 15 shows a specific example of the structure of the power control section 13a. The power control section 13a includes a power mode control section 131a, a clock signal control section 132, and a supply voltage control section 133. The power control section 13a is different from the power control section 13 in that the power mode control section 131 is replaced with the power mode control section 131a. Hereinafter, the differences will be mainly described.

The power mode control section 131a sets a common power mode for each of the processors P-1 through P-N in accordance with the input predictive thread non processing time PTNPT. The power mode control section 131a sets the power mode based on the sleep transfer determination threshold value shown in FIG. 7. Regarding the processor P-n specified by the predictive processor identification information PPID-n, the power mode control section 131a skips the sleep transfer control. Other than the above, the power mode control section 131a is substantially the same as the power mode control section 131.

<Operation>

Figure 16:
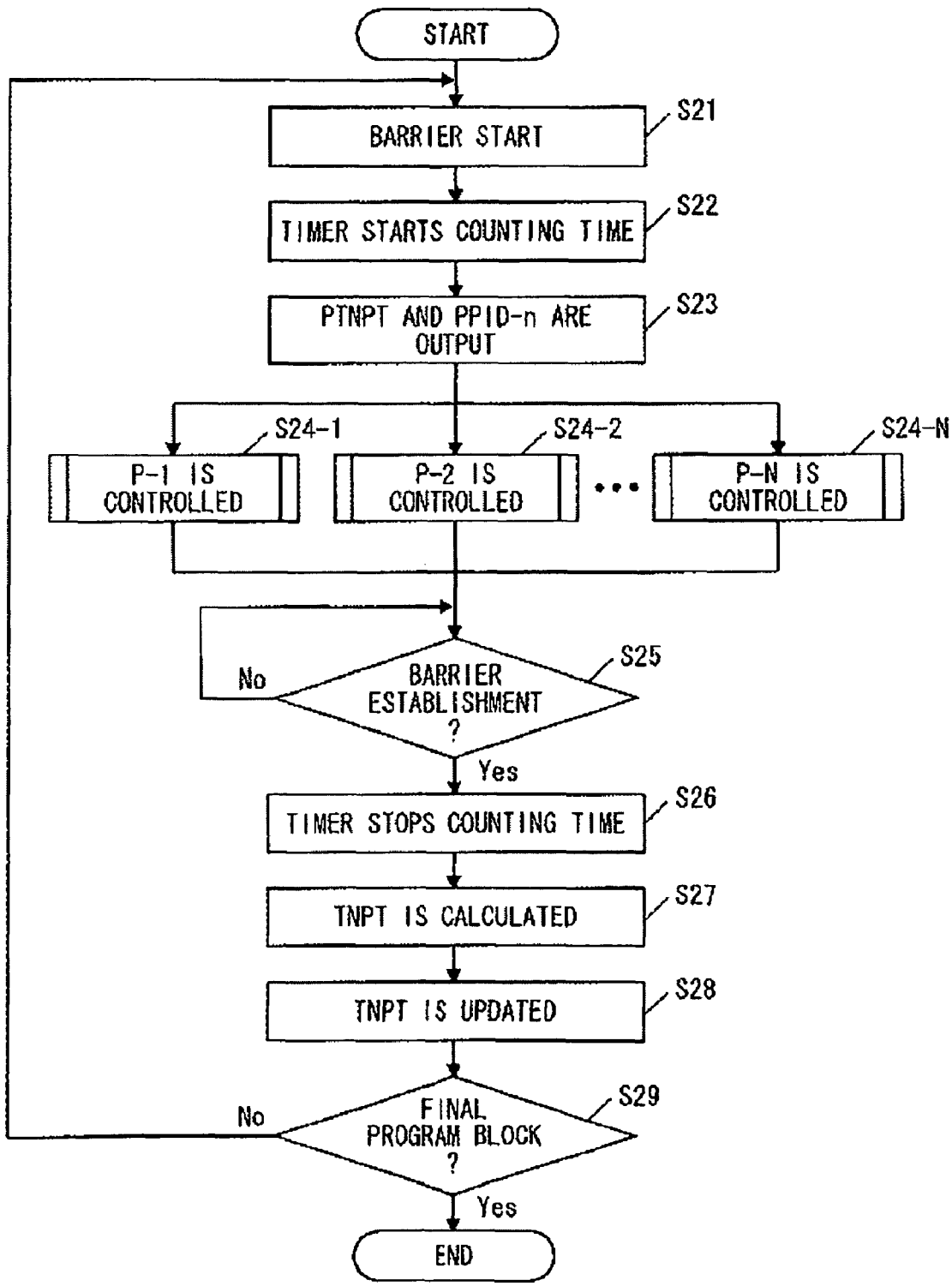

Now, with reference to FIG. 16, an operation of the multiprocessor control unit 1a according to the first modification will be described. FIG. 16 is a flowchart showing an overall operation flow of the multiprocessor control unit 1a. In FIG. 16, the processing in steps S21, S22, S25, S26 and S29 is substantially the same as the processing in steps S11, S12, S15, S16 and S19 shown in FIG. 8. The other steps will be mainly described.

In step S23 after step S22, when a barrier starting signal is input from the barrier monitoring section 111a, the predictive information generation section 113a reads the processor identification information PID-n and the thread non processing time TNPT associated with the barrier identification information BID-m from the history information storage section 112a, and outputs the read data to the power control section 13a as the predictive processor identification information PPID-n and the predictive thread non processing time PTNPT (step S23). After step S23, the processors P-1 through P-N are individually controlled (steps S24-1 through S24-N). Such individual control will be described later.

In step S27 after step S26, the barrier monitoring section 111a calculates the thread non processing time TNPT based on the barrier timing signal and the time count of the timer 12. In step S27, the barrier monitoring section 111a outputs the thread non processing time TNPT, the processor identification information PID-n and the barrier identification information BID-m to the history information storage section 112a.

After step S27, the history information storage section 112a updates the thread non processing time TNPT stored above in the data section corresponding to the input barrier identification 25, information BID-m with the thread non processing time TNPT output in step S27 (step S28). In step S28, the history information storage section 112a updates the processor identification information PID-n stored above in the tag section corresponding to the input barrier identification information BID-m with the processor identification information PID-n output in step S27.

Figure 17:
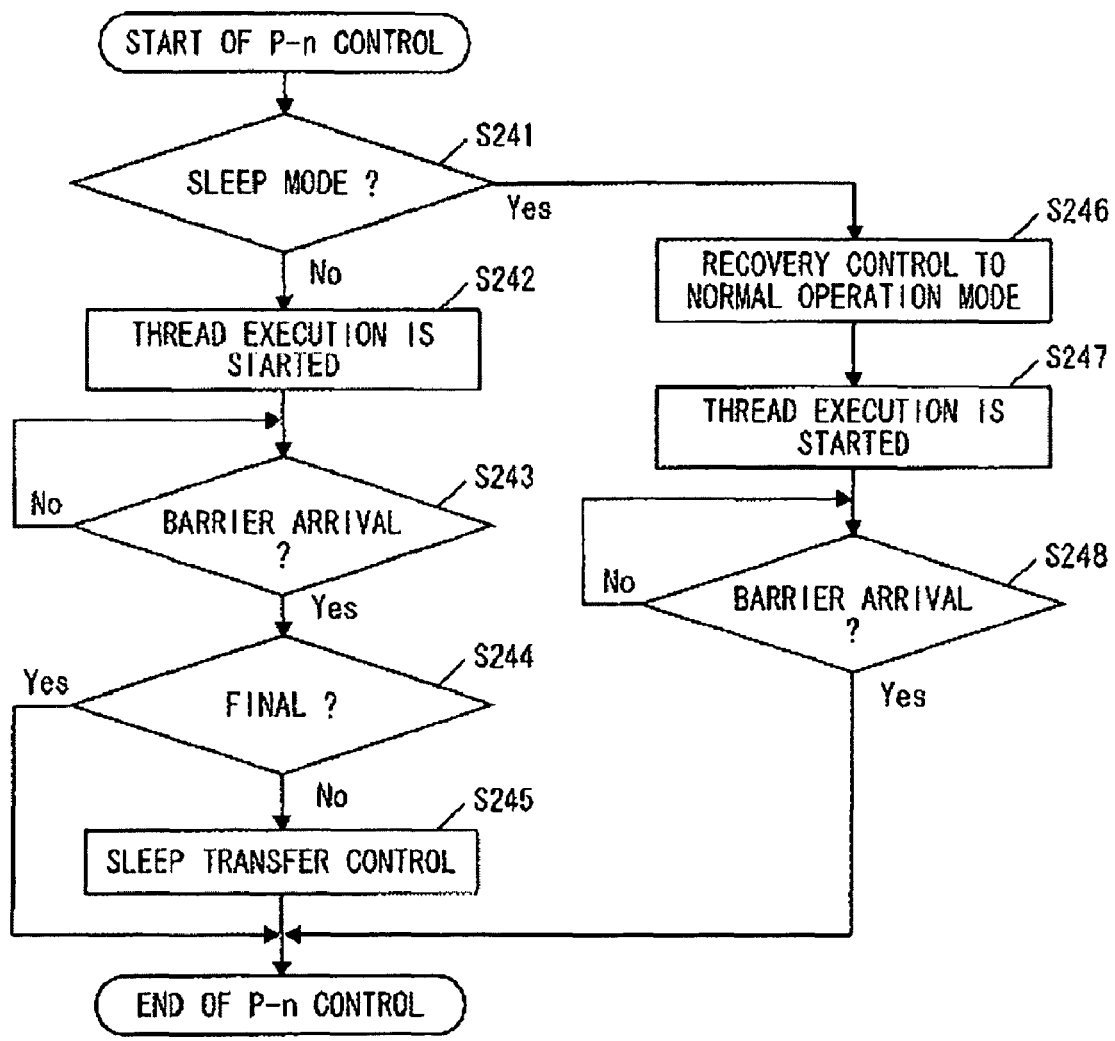
FIG. 17 is a flowchart showing a flow of individual control on each of processors P-1 through P-N according to the first modification of the first embodiment.

With reference to FIG. 17, the individual control on each of the processors P-1 through P-N (steps S24-1 through S24-N) will be described specifically. Since the control flow is the same among steps S24-1 through S24-N, FIG. 17 shows the control flow on the processor P-n. In FIG. 17, the processing in steps S241 through S243 is substantially the same as the processing in steps S141 through S143 shown in FIG. 9, and the processing in steps S245 through S248 is substantially the same as the processing in steps S144 through S147 shown in FIG. 9. The other steps will be mainly described.

In step S244 after step S243, the power mode control section 131a determines whether or not the processor as the control target is the processor P-n specified by the predictive processor identification information PPID-n output in step S23. Namely, the power mode control section 131a determines whether or not the processor as the control target is the final processor to realize the barrier arrival. When the processor as the control target is not the final processor to realize the barrier arrival (No in step S244), the power mode control section 131a sets the power mode of each of the processors P-1 through P-N in accordance with the predictive thread non processing time PTNPT output in step S23 (step S245). By contrast, when the processor as the control target is the final processor to realize the barrier arrival (Yes in step S244), the sleep transfer control (step S245) is skipped. In this example, the processor as the control target is the processor P-n, and the processor specified by the predictive processor identification information PPID-n is also the processor P-n. Therefore, in step S244, a positive determination is made.

Figure 18:
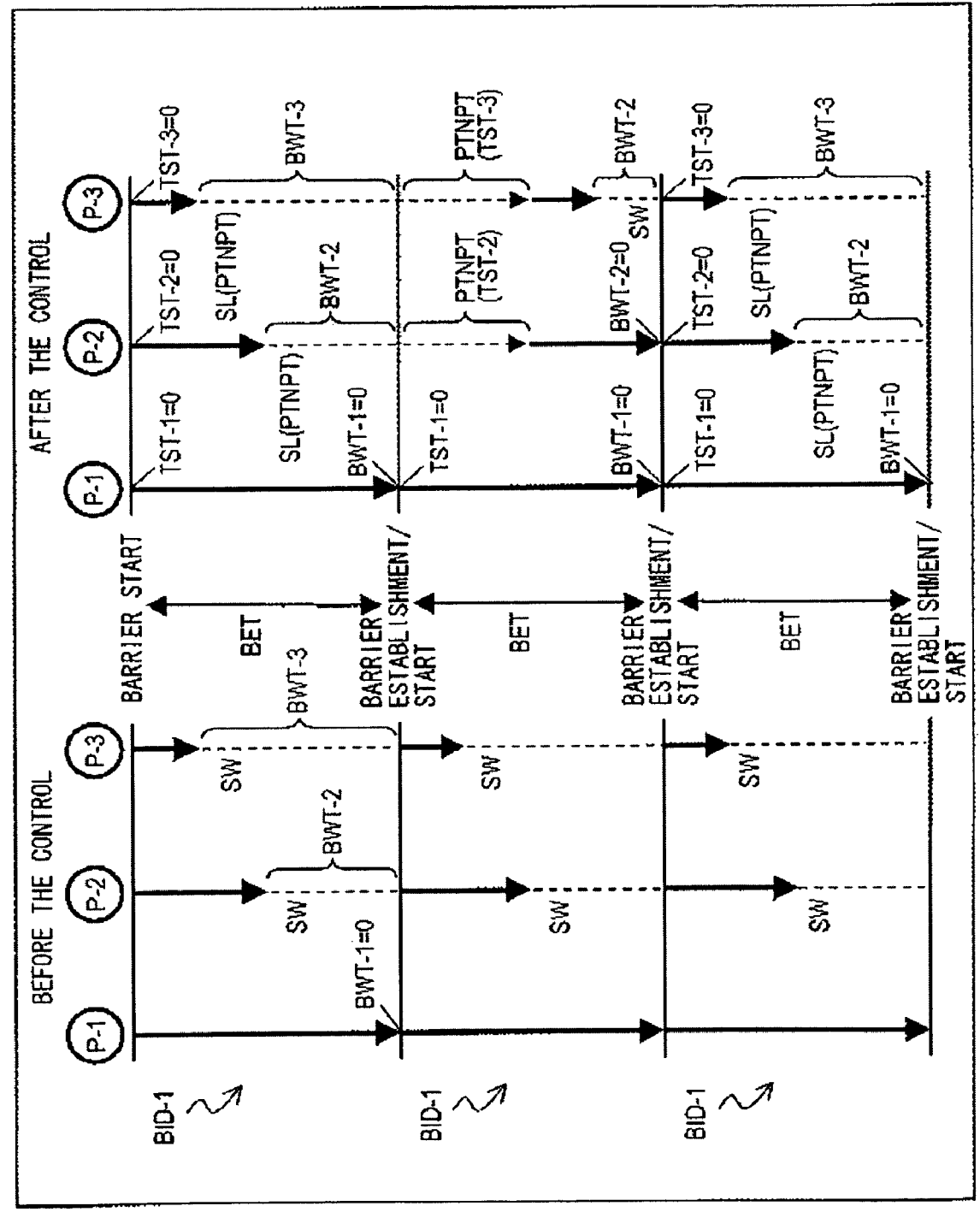
FIG. 18 shows an execution state of each thread before and after the control when the same parallel program block is executed in a loop.

Now, with reference to specific examples shown in FIG. 18, how the program is executed by the above-described control of the multiprocessor control unit 1a will be described. FIG. 18 shows an execution state of each thread before and after the control when the same parallel program block is executed in a loop. In FIG. 18, at the time of the first barrier start, the power mode of all the processors P-1 through P-3 is the normal operation mode. The execution state before the control is substantially the same as that in FIG. 10, and the description will be omitted.

Referring to FIG. 18, the execution state after the control will be described. In the history information storage section 112a, the thread non processing time TNPT (an average value of BWT-1 through BWT-3) and the processor identification information PID-1 (information specifying the processor P-1) are stored regarding the barrier identification information BID-1.

The processor P-1 starts executing the thread (step S242) almost simultaneously with the first barrier start (step S21). The reason is that it is determined No in step S241 because the power mode of the processor P-1 is the normal operation mode at the time of the first barrier start. When the thread of the processor P-1 realizes the barrier arrival (Yes in step S243), the processor P-1 encounters the first barrier establishment while being kept in the normal operation mode without being transferred to a sleep mode. The reason is that the predictive processor identification information PPID-1 output in step S23 in the first loop specifies the processor P-1, and the determination result in step S244 is Yes and so the sleep transfer control in step S245 is skipped.

The processor P-2 starts executing the thread (step S242) almost simultaneously with the first barrier start (step S21). When the thread of the processor P-2 realizes the barrier arrival (Yes in step S243), the processor P-2 is transferred to the sleep mode SL (PTNPT) in accordance with the predictive thread non processing time PTNPT output in step S23 in the first loop (step S245). The processor P-2 is not the processor P-1 specified by the predictive processor identification information PPID-1. Therefore, regarding the processor P-2, the determination result in step S244 is No and the sleep transfer control in step S245 is performed. Then, the processor P-2 encounters the first barrier establishment while being kept in the sleep mode SL (PTNPT).

The processor P-3 starts executing the thread (step S242) almost simultaneously with the first barrier start (step S21). When the thread of the processor P-3 realizes the barrier arrival (Yes in step S243), the processor P-3 is transferred to the sleep mode SL (PTNPT) in accordance with the predictive thread non processing time PTNPT output in step S23 in the first loop (step S245). The processor P-3 is not the processor P-1 specified by the predictive processor identification information PPID-1. Therefore, regarding the processor P-3, the determination result in step S244 is No and the sleep transfer control in step S245 is performed. Then, the processor P-3 encounters the first barrier establishment while being kept in the sleep mode SL (PTNPT).

After the first barrier establishment, the history information in the history information storage section 112a is updated such that the thread non processing time TNPT is the average value of TST-1 through TST-N and BWT-1 through BWT-N (step S28). Since the processor P-1 is the final processor to realize the barrier arrival, the processor identification information in the history information storage section 112a remains PID-1.

The processor P-1 starts executing the thread (step S242) almost simultaneously with the second barrier start (step S21). The reason is that it is determined No in step S241 because the power mode of the processor P-1 is the normal operation mode at the time of the first barrier establishment. When the thread of the processor P-1 realizes the barrier arrival (Yes in step S243), the processor P-1 encounters the second barrier establishment while being kept in the normal operation mode without being transferred to a sleep mode. The reason is that the predictive processor identification information PPID-1 output in step S23 in the second loop specifies the processor P-1, and the determination result in step S244 is Yes and so the sleep transfer control in step S245 is skipped.

The processor P-2 is kept in the sleep mode SL (PTNPT) from the second barrier start (step S21) until the predictive thread non processing time PTNPT output in step S23 in the second loop passes. When the predictive thread non processing time PTNPT has passed, the processor P-2 is recovered to the normal operation mode (step S246) and starts executing the thread (step S247). In the example of FIG. 18, simultaneously with the barrier arrival of the thread of the processor P-2 (Yes in step S248), the processor P-2 encounters the second barrier establishment.

The processor P-3 is kept in the sleep mode SL (PTNPT) from the second barrier start (step S21) until the predictive thread non processing time PTNPT output in step S23 in the second loop passes. When the predictive thread non processing time PTNPT has passed, the processor P-3 is recovered to the normal operation mode (step S246) and starts executing the thread (step S247). In the example of FIG. 18, simultaneously with the barrier arrival of the thread of the processor P-3 (Yes in step S248), the processor P-3 is put into the barrier wait in a spin waiting (SW) state until the second barrier establishment.

After the second barrier establishment, the history information in the history information storage section 112a is updated such that the thread non processing time TNPT is the average value of TST-1 through TST-N and BWT-1 through BWT-N (step S28). Since the processor P-1 is the final processor to realize the barrier arrival, the processor identification information in the history information storage section 112a remains PID-1.

The processor P-1 starts executing the thread (step S242) almost simultaneously with the third barrier start (step S21). The reason is that it is determined No in step S241 because the power mode of the processor P-1 is the normal operation mode at the time of the second barrier establishment. When the thread of the processor P-1 realizes the barrier arrival (Yes in step S243), the processor P-1 encounters the third barrier establishment while being kept in the normal operation mode without being transferred to a sleep mode. The reason is that the predictive processor identification information PPID-1 output in step S23 in the third loop specifies the processor P-1, and the determination result in step S244 is Yes and so the sleep transfer control in step S245 is skipped.

The processor P-2 starts executing the thread (step S242) almost simultaneously with the third barrier start (step S21). When the thread of the processor P-2 realizes the barrier arrival (Yes in step S243), the processor P-2 is transferred to the sleep mode SL (PTNPT) in accordance with the predictive thread non processing time PTNPT output in step S23 in the third loop (step S245). The processor P-2 is not the processor P-1 specified by the predictive processor identification information PPID-1. Therefore, regarding the processor P-2, the determination result in step S244 is No and the sleep transfer control in step S245 is performed. Then, the processor P-2 encounters the third barrier establishment while being kept in the sleep mode SL (PTNPT).

The processor P-3 starts executing the thread (step S242) almost simultaneously with the third barrier start (step S21). When the thread of the processor P-3 realizes the barrier arrival (Yes in step S243), the processor P-3 is transferred to the sleep mode SL (PTNPT) in accordance with the predictive thread non processing time PTNPT output in step S23 in the third loop (step S245). The processor P-3 is not the processor P-1 specified by the predictive processor identification information PPID-1. Therefore, regarding the processor P-3, the determination result in step S244 is No and the sleep transfer control in step S245 is performed. Then, the processor P-3 encounters the third barrier establishment while being kept in the sleep mode SL (PTNPT).

After the third barrier establishment, the history information in the history information storage section 112a is updated such that the thread non processing time TNPT is the average value of TST-1 through TST-N and BWT-1 through BWT-N (step S28). Since the processor P-1 is the final processor to realize the barrier arrival, the processor identification information in the history information storage section 112a remains PID-1.

As described above, according to the first modification, in the history information storage section 112a, only one thread non processing time TNPT is stored. Therefore, the memory capacity of the history information storage section 112a can be decreased, and the enlargement of the circuit scale of the multiprocessor control unit 1a can be suppressed.

In the above, the barrier monitoring section 111a calculates the average value of the thread non processing times TNPT-1 through TNPT-N, but the present invention is not limited to this. The barrier monitoring section 111a may calculate an average value of the thread non processing times TNPT-1 through TNPT-N excluding the thread non processing time having a value of "0". Alternatively, the barrier monitoring section 111a may calculate the minimum thread non processing time, or the maximum thread non processing time, among the thread non processing times TNPT-1 through TNPT-N.

In the above, the barrier monitoring section 111a specifies the processor, the thread of which is the last thread to realize the barrier arrival, for each program block based on the barrier arrival signals, and outputs processor identification information PID for specifying the processor to the history information storage section 112a. The present invention is not limited to this. The barrier monitoring section 111a may specify the processor, the thread processing time of which is maximum, namely, the processor, the thread non processing time of which is minimum, for each program block, and output information specifying the processor as the processor identification information PID.

<Second Modification of the First Embodiment>

In the first embodiment, the individual control on each processor is performed in the flow shown in FIG. 9. However, in the case where different parallel program blocks are consecutively executed as shown in FIG. 11, the thread non processing time acquired when the sleep mode is kept may be longer than the thread non processing time acquired immediately previously. A second modification has an object of realizing further power saving by resetting the processor to a deeper sleep mode in the case where the thread non processing time acquired when the sleep mode is kept is longer than the thread non processing time acquired immediately previously.

A multiprocessor control unit according to the second modification is different from the above-described multiprocessor control units only in the flow shown in FIG. 9 regarding the individual control on each processor, among FIG. 3 through FIG. 6, FIG. 8 and FIG. 9. Hereinafter, the differences will be mainly described.

<Operation>

Figure 19:
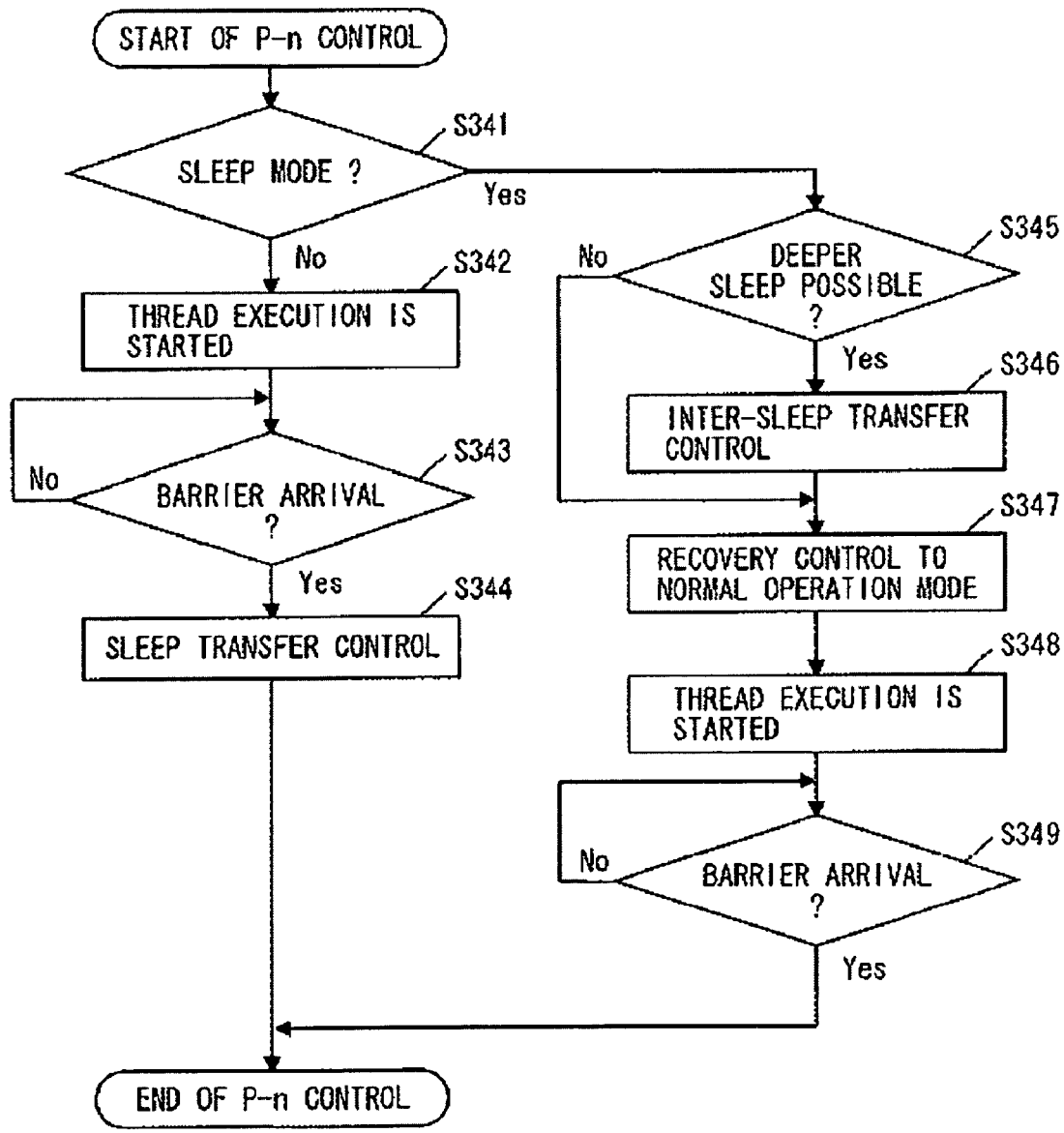
FIG. 19 is a flowchart showing a flow of individual control on each of processors P-1 through P-N according to a second modification of the first embodiment.

With reference to FIG. 19, the individual control on each of the processors P-1 through P-N (steps S14-1 through S14-N) according to the second modification will be described specifically Since the control flow is the same among steps S14-1 through S14-N, FIG. 19 shows the control flow on the processor P-n. In FIG. 19, the processing in steps S341 through S344 is substantially the same as the processing in steps S141 through S144 shown in FIG. 9, and the processing in steps S347 through S349 is substantially the same as the processing in steps S145 through S147 shown in FIG. 9. The other steps will be mainly described.

When in step S341 it is determined that the processor P-n is in a sleep mode, the power mode control section 131 determines whether or not transfer from the current sleep mode to a deeper sleep mode is possible based on the predictive thread non processing time PTNPT-n output in step S13 shown in FIG. 8 (step S345). When it is determined that transfer a deeper sleep mode is possible (Yes in step S345), the power mode control section 131 transfers the power mode of the processor P-n to a deeper sleep mode in accordance with the predictive thread non processing time PTNPT-n (step S346). By contrast, when it is determined that transfer to a deeper sleep mode is not possible (No in step S345), the power mode control section 131 skips inter-sleep transfer control (step S346).

For example, in the case where the current sleep mode is the Standby mode shown in FIG. 7 and the predictive thread non processing time acquired currently is larger than the threshold value Tsd in FIG. 7, it is determined in step S345 that transfer to the Shutdown mode is possible. In step S346, the inter-sleep transfer control from the Standby mode to the Shutdown mode is performed. By contrast, in the case where the current sleep mode is the Shutdown mode shown in FIG. 7 and the predictive thread non processing time PTNPT-n acquired currently is about the same as the threshold value Tsb in FIG. 7, it is determined in step S345 that transfer to a deeper sleep mode is not possible. The processing in step S346 is skipped.

After the control shown in FIG. 11, at the time of the third barrier start, the processor P-1 is kept in the sleep mode SL (BID-2:PTNPT-1). However, the predictive thread non processing time (BID-3:PTNPT-1) acquired at the time of the third barrier start is longer than the predictive thread non processing time (BID-2:PTNPT-1) acquired at the time of the second barrier start. Applying the second modification, the power mode control section 131 can transfer the power mode of the processor P-1 to the deeper sleep mode SL (BID-3: PTNPT-1) at the time of the third barrier start.

As described above, according to the second modification, in the case where the thread non processing time acquired when the sleep mode is kept is longer than the thread non processing time acquired immediately previously, the sleep mode is reset to a deeper sleep mode. As a result, further power saving can be realized.

<Second Embodiment>

In the first embodiment, power saving is realized by putting a processor in the barrier wait into a non-operative sleep mode. Namely, in the first embodiment, power saving of a processor in operation is not considered. In a second embodiment, it is conceived additionally applying a DVFS (Dynamic Voltage and Frequency Scaling) control technology, by which the clock frequency or the supply voltage supplied to a processor in operation is dynamically scaled in accordance with predictive information. The DVFS control technology is already put into practice in technologies such as SpeedStep (registered trademark) of Intel Corporation of U.S.A., PowerNow! (registered trademark) of AMD (Advanced Micro Devices, Inc.) of the U.S.A., and the like. In the second embodiment, control is performed in substantially the same manner as by the DVFS technology practically used.

Unlike the first embodiment, the second embodiment uses, as predictive information, predictive thread non processing time PTNPT and also predictive barrier establish time, which is predictive time of the barrier establish time BET. Also in the second embodiment, in the case where the sleep mode is not kept at the time of the barrier start, DVFS control is performed such that the operation of a processor is made a low rate operation in accordance with the ratio between the predictive thread non processing time PTNPT and the predictive barrier establish time PBET, or the processor is transferred to a sleep mode in accordance with the predictive thread non processing time PTNPT as in the first embodiment. Whichever provides a larger power saving effect (i.e., whichever causes the processor to consume less power) is selectively applied. Thus, further power saving is realized.

<Structure>

FIG. 20 shows an example of a structure of a shared memory type multiprocessor system using a multiprocessor control unit according to the second embodiment. The multiprocessor system according to the second embodiment is different from the structure shown in FIG. 3 only in that the multiprocessor control unit 1 is replaced with a multiprocessor control unit 6 and that the multiprocessor control unit 6 includes a predictive information acquisition section 61, a timer 12, and a power control section 63. Hereinafter, the differences will be mainly described.

The predictive information acquisition section 61 acquires predictive information on each program block for each of the processors P-1 through P-N, and outputs the acquired predictive information to the power control section 63. In this embodiment, predictive thread non processing time PTNPT and the predictive barrier establish time PBET are used as the predictive information. Hereinafter, with reference to FIG. 21, a specific structure of the predictive information acquisition section 61 will be described. FIG. 21 shows a specific example of the structure of the predictive information acquisition section 61. The predictive information acquisition section 61 includes a barrier monitoring section 611, a history information storage section 612, and a predictive information generation section 613.

Unlike the barrier monitoring section 111 in the first embodiment, the barrier monitoring section 611 outputs only the calculated barrier arrival times BAT-1 through BAT-N and the calculated thread starting times TST-1 through TST-N to the history information storage section 612. Other than the above, the barrier monitoring section 611 is substantially the same as the barrier monitoring section 111.

Figure 22:
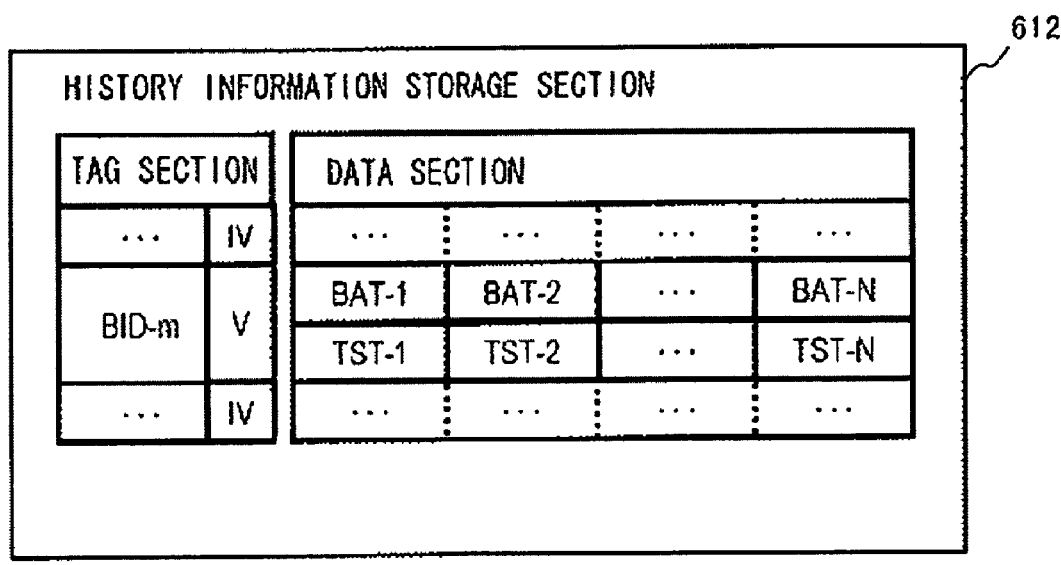
FIG. 22 shows a history table in a history information storage section 612.

The history information storage section 612 stores the input barrier arrival times BAT-1 through BAT-N and the input thread starting times TST-1 through TST-N in a history table shown in FIG. 22. FIG. 22 shows the history table in the history information storage section 612. The history information storage section 612 stores the barrier identification information BID-m input from the barrier monitoring section 611 in an arbitrary entry of the tag section. The history information storage section 612 stores the barrier arrival times BAT-1 through BAT-N input from the barrier monitoring section 611 in respective entries of the data section corresponding to the entry in which the barrier identification information BID-m is stored. The history information storage section 612 stores the thread starting times TST-1 through TST-N input from the barrier monitoring section 611 in respective entries of the data section corresponding to the entry in which the barrier identification information BID-m is stored. In this manner, the history table stores the barrier identification information BID-m, and the barrier arrival times BAT-1 through BAT-N and the thread starting times TST-1 through TST-N of the program block specified by the barrier identification information BID-m in association with one another. The history information storage section 612 is substantially the same as the history information storage section 112 in the first embodiment on the other points including the flag.

The predictive information generation section 613 refers to the barrier timing signal BT to read the barrier arrival times BAT-1 through BAT-N and the thread starting times TST-1 through TST-N associated with the barrier identification information BID-m from the history information storage section 612 at the time of the barrier start or barrier arrival. The predictive information generation section 613 calculates the maximum barrier arrival time among the read barrier arrival times BAT-1 through BAT-N as the predictive barrier establish time PBET. The predictive information generation section 613 also substitutes the read barrier arrival times BAT-1 through BAT-N and the read thread starting times TST-1 through TST-N into expressions (1) and (2) to calculate the thread non processing times TNPT-1 through TNPT-N as predictive thread non processing times PTNPT-1 through PTNPT-N. The predictive information generation section 613 refers to the barrier timing signal BT to output the predictive barrier establish time PBET and the predictive thread non processing times PTNPT-1 through PTNPT-N to the power control section 63 at the time of the barrier start or barrier arrival.

Figure 23:
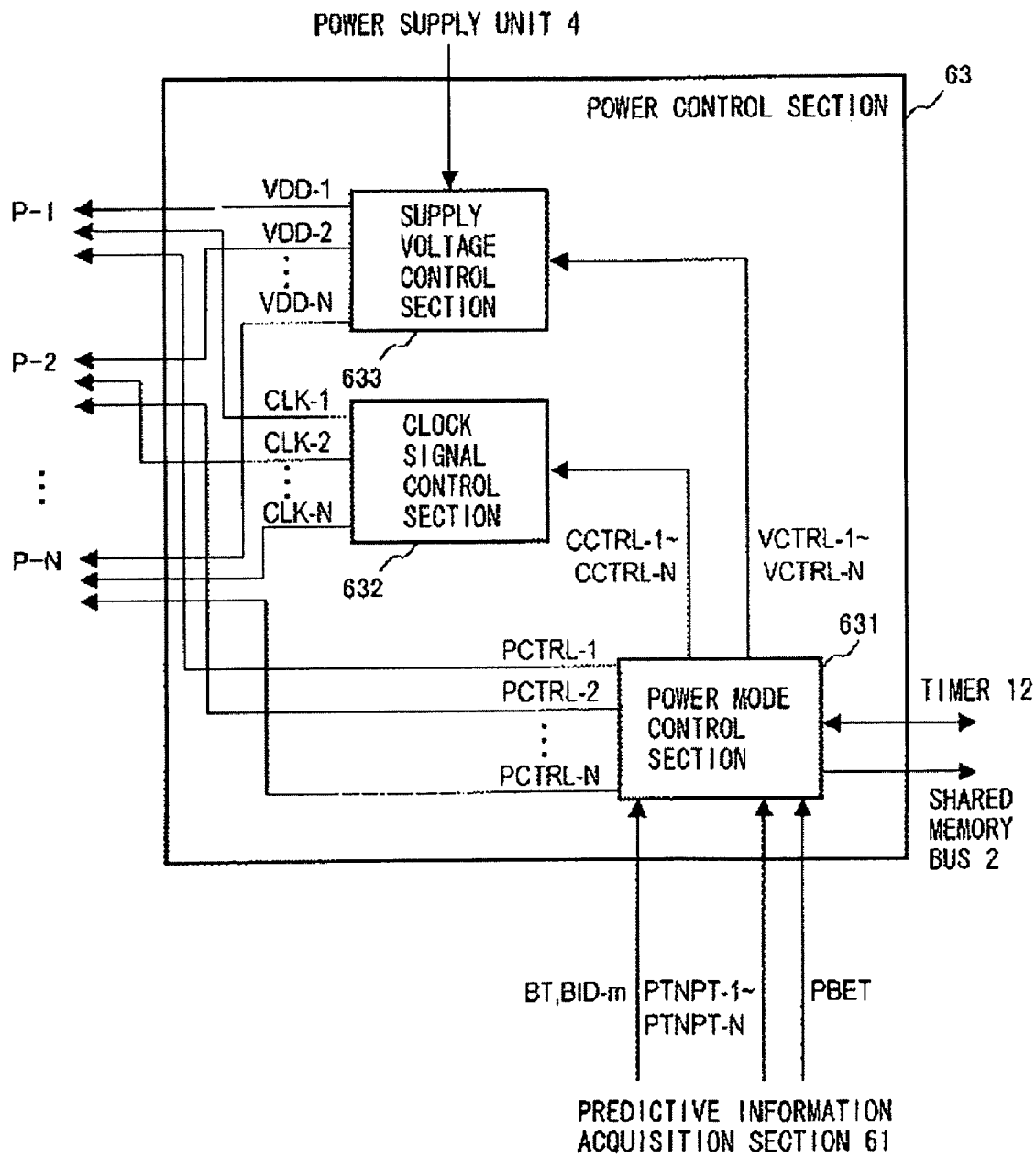
FIG. 23 shows a specific example of a structure of a power control section 63.

The power control section 63 controls the supply voltage and/or the clock signal to be supplied to each of the processors P-1 through P-N based on the predictive information input from the predictive information acquisition section 61 to control the power supply to each of the processors P-1 through P-N. Hereinafter, with reference to FIG. 23, a specific structure of the power control section 63 will be described. FIG. 23 shows a specific example of the structure of the power control section 63. The power control section 63 includes a power mode control section 631, a clock signal control section 632, and a supply voltage control section 633.

Unlike the power mode control section 131 in the first embodiment, the power mode control section 631 performs control on transfer to a low rate operation mode by application of DVFS control as shown in FIG. 24 in addition to the sleep transfer control. FIG. 24 shows the power modes set by the power mode control section 631. Hereinafter, the differences will be mainly described.

Based on the input predictive barrier establish time PBET and the input predictive thread non processing times PTNPT-1 through PTNPT-N, the power mode control section 631 determines which of the DVFS control and the sleep transfer control provides a larger power saving effect. The power mode control section 631 selects the control determined to provide a larger power saving effect. When the DVFS control is selected, the power mode control section 631 substitutes the predictive barrier establish time PBET and the predictive thread non processing times PTNPT-1 through PTNPT-N into expression (3) to calculate the clock frequency of the clock signal to be supplied to the processor such that the thread non processing time is "0". In expression (3), the clock frequency for causing the processor to operate at a low rate is the low rate clock frequency Fslow-n, and the clock frequency of the processor P-n in the normal operation is the reference clock frequency Fbase.

$$\begin{aligned}\text{(Low rate clock frequency Fslow-n)} &= \text{(reference clock} \\ \text{frequency Fbase)} \times \text{(low rate operation ratio)} &= \\ \text{(reference clock frequency Fbase)} \times (1 - \text{(predictive} \\ \text{thread non processing time PTNPT-n)}/\text{(predictive} \\ \text{barrier establish time PBET))} \end{aligned} \quad (3)$$

When the low rate operation mode is selected by the power mode control section 631, the clock signal control section 632 changes the clock frequency of the clock signal CLK-n to be supplied to the processor P-n to the low rate clock frequency Fslow-n in accordance with the control signal CCTRL-n. The supply voltage control section 633 supplies the supply voltage VDD-n, which is decreased in the range where low rate operation can be kept, to the processor P-n.

<Operation>

Figure 25:
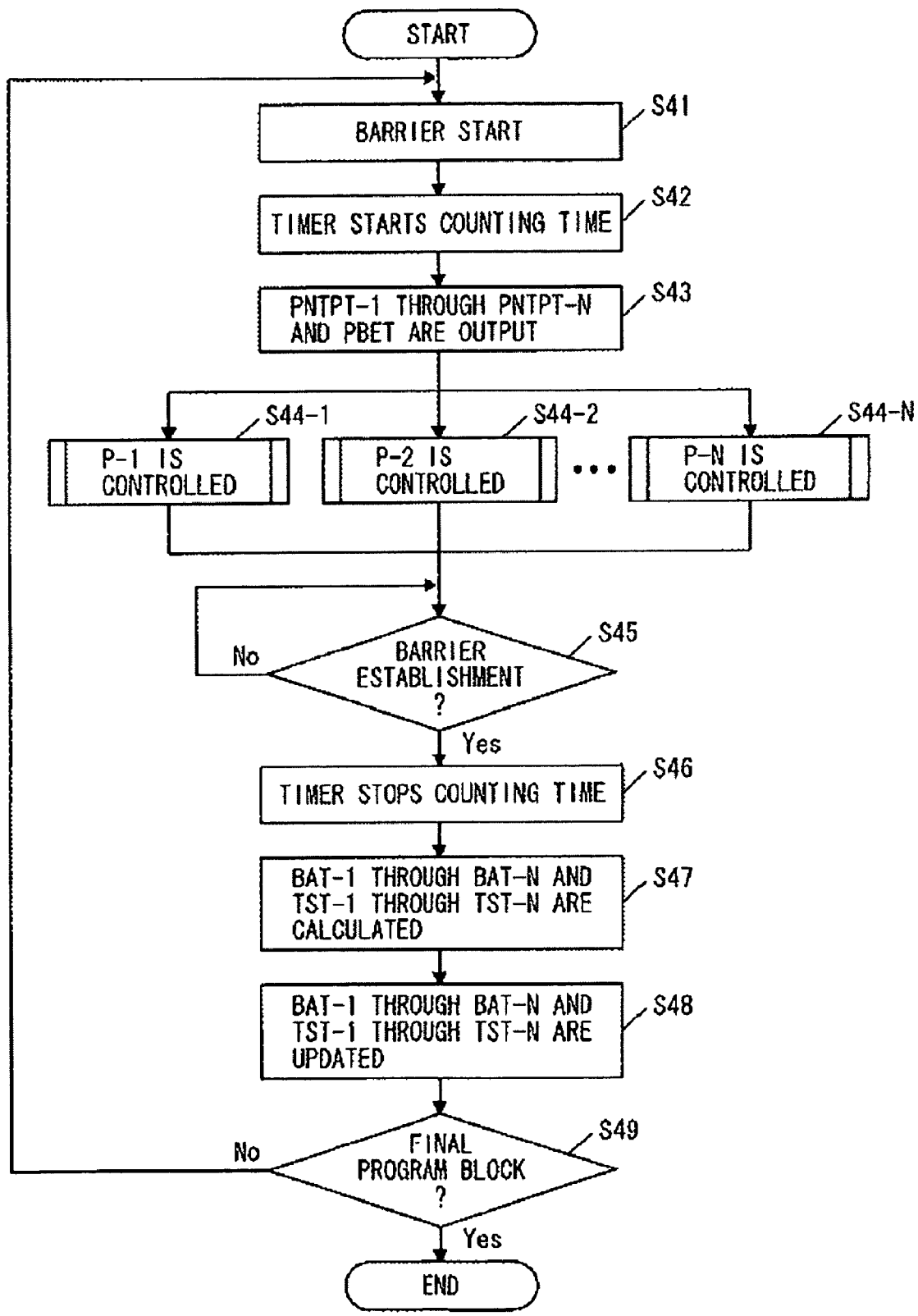
FIG. 25 is a flowchart showing an overall operation flow of the multiprocessor control unit 6.

Now, with reference to FIG. 25, an operation of the multiprocessor control unit 6 according to the second embodiment will be described. FIG. 25 is a flowchart showing an overall operation flow of the multiprocessor control unit 6.

As shown in FIG. 25, the barrier monitoring section 611 generates a barrier starting signal at the time of the barrier start, and outputs the generate barrier starting signal to the predictive information generation section 613 and the power control section 63 (step S41). In step S41, the barrier monitoring section 611 outputs barrier identification information BID-m to the predictive information generation section 613 and the power control section 63. After step S41, when the barrier starting signal is input from the barrier monitoring section 611, the power mode control section 631 sets the lock variable in the main memory unit 3 to the number of processors or the number of threads as an initial value via the shared memory bus 2, and causes the timer 12 to start counting time (step S42). After step S42, when the barrier starting signal is input from the barrier monitoring section 611, the predictive information generation section 613 reads the barrier arrival times BAT-1 through BAT-N and thread starting times TST-1 through TST-N associated with the barrier identification information BID-m from the history information storage section 612, calculates the predictive barrier establish time PBET and the predictive thread non processing times PTNPT-1 through PTNPT-N, and outputs the calculated data to the power control section 63 (step S43). After step S43, the processors P-1 through P-N are individually controlled (steps S44-1 through S44-N). Such individual control will be described later.

In step S45, based on the barrier establishment signal from the barrier monitoring section 611, the power mode control section 631 determines whether or not the barrier synchronization has been realized regarding the program block specified by the barrier identification information BID-m. The power mode control section 631 may determine whether or not the barrier synchronization has been realized by referring to the lock variable in the main memory unit 3 via the shared memory bus 2. When the power mode control section 631 determines that the barrier synchronization has been realized by a barrier establishment signal being input from the barrier monitoring section 611, the power mode control section 631 causes the timer 12 to stop counting and reset time (step S46).

After step S46, based on the barrier timing signal and the time counted by the timer 12, the barrier monitoring section 611 calculates the barrier arrival times BAT-1 through BAT-N and the thread starting times TST-1 through TST-N (step S47). Also in step S47, the barrier monitoring section 611 outputs the calculated barrier arrival times BAT-1 through BAT-N and the calculated thread starting times TST-1 through TST-N to the history information storage section 612 together with the barrier identification information BID-m.

After stop S47, the history information storage section 612 updates the barrier arrival times BAT-1 through BAT-N and the thread starting times TST-1 through TST-N stored above in the data section corresponding to the input barrier identification information BID-m with the barrier arrival times BAT-1 through BAT-N and the thread starting times TST-1 through TST-N output in step S47 (step S48).

After step S48, the barrier monitoring section 611 determines whether or not another barrier starting signal can be generated to determine whether or not the program block currently executed is the final program block (step S49). When the program block currently executed is the final program block (Yes in step S49), the processing is finished. When the program block currently executed is not the final program block (No in step S49), the processing returns to step S41 and the operation is performed for the next program block.

Figure 26:
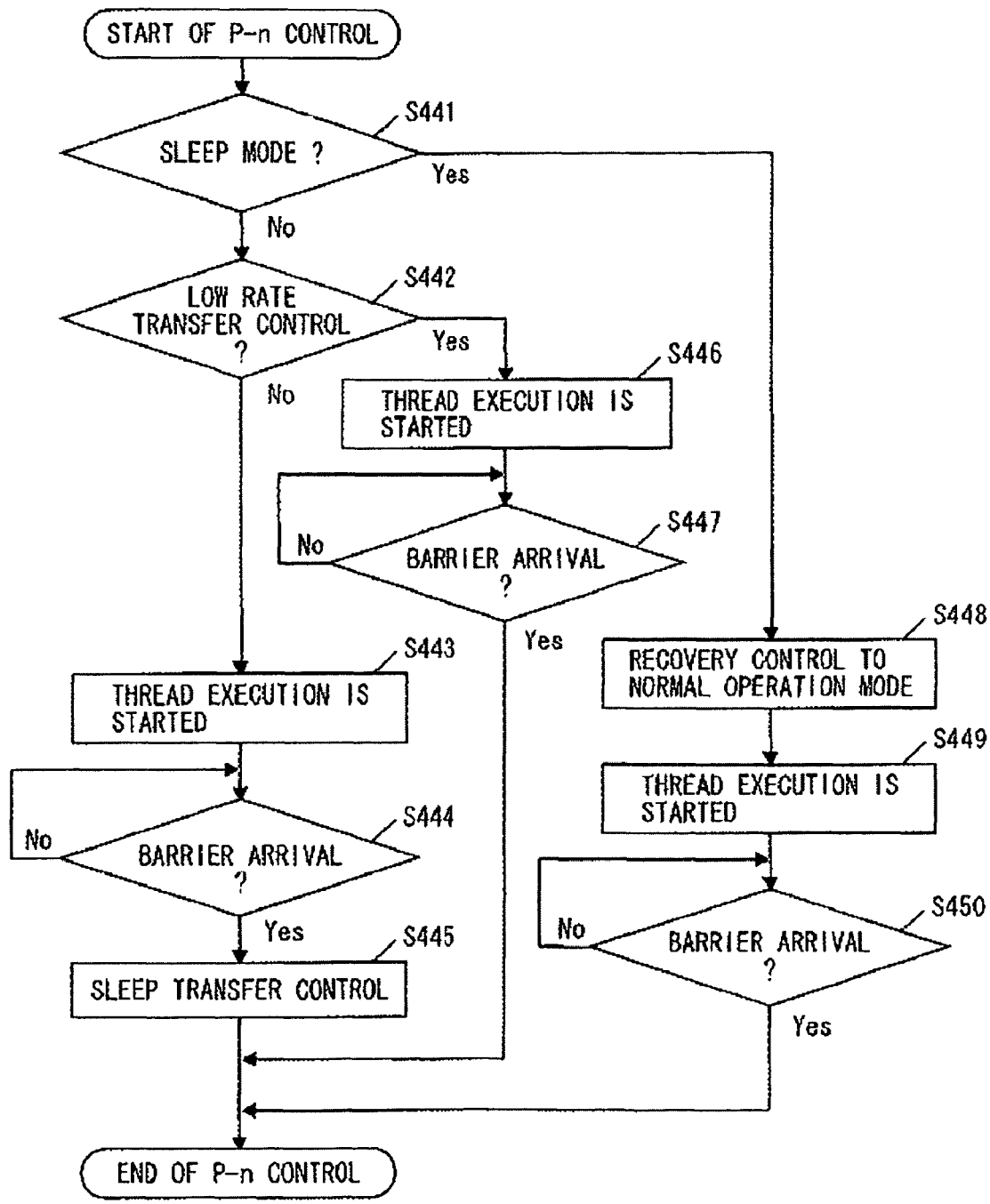
FIG. 26 is a flowchart showing a flow of individual control on each of processors P-1 through P-N according to the second embodiment.

With reference to FIG. 26, the individual control on each of the processors P-1 through P-N (steps S44-1 through S44-N) will be described specifically. Since the control flow is the same among steps S44-1 through S44-N, FIG. 26 shows the control flow on the processor P-n.

As shown in shown in FIG. 26, the power mode control section 631 refers to the control signal PCTRL-n output by itself to determine whether or not the current power mode of the processor P-n is in a sleep mode (step S441).

When determining that the processor P-n is not in a sleep mode (No in step S441), the power mode control section 631 selects the power mode of the processor P-n, i.e., transfers the processor P-n to one of the two modes which is expected to consume less power: the low rate operation mode in which the processor P-n operates at the low rate frequency Fslow-n calculated using expression (3), and the sleep mode in accordance with the predictive thread non processing time PTNPT-n as in the first embodiment (step S442).

In the case where the processor P-n is to be transferred to the low rate operation mode (Yes in step S442), the power mode control section 631 uses control signal PCTRL-n to cause the processor P-n to start executing the thread (step S446) in the low rate operation mode. Specifically, the power mode control section 631 outputs control signals PCTRL-n, CCTRL-n and VCTRL-n indicating the set low rate operation mode to the processor P-n, the clock signal control section 632 and the supply voltage control section 633 respectively. Thus, the processor P-n starts executing the thread in the low rate operation mode. Based on the barrier arrival signal from the barrier monitoring section 611, the power mode control section 631 determines whether or not the thread of the processor P-n has realized the barrier arrival (step S447). When determining that the thread has realized the barrier arrival (Yes in step S447), the processing advances to step S45 shown in FIG. 25. The processor P-n performs the low rate operation such that the thread non processing time is "0". Therefore, by the advancement of the operation from step S447 to S45, the processor P-n is put into the barrier wait in a state like spin waiting.

In the case of the low rate operation, the barrier arrival time BAT-n indicates a value in the case of the low rate operation. Therefore, it is necessary to return the value to a value in the case of the normal operation before storing the value in the history information storage section 612. Therefore, in step S47 in FIG. 25, the barrier monitoring section 611 calculates a value obtained by dividing the barrier arrival time BAT-n in the low rate operation by the low rate operation ratio in expression (3).

In the case where all the processors are transferred to the low rate operation mode, or in the case where only the processor (s) in the low rate operation mode is executing the thread while the other processor(s) has realized the barrier arrival, the processor(s) in execution may be controlled to be recovered from the low rate operation mode to the normal operation mode. Thus, the barrier establish time can be shortened.

In the case where the processor P-n is not to be transferred to the low rate operation mode (No in step S442), the power mode control section 631 uses the control signal PCTRL-n to cause the processor P-n to start executing the thread immediately (step S443). Based on the barrier arrival signal from the barrier monitoring section 611, the power mode control section 631 determines whether or not the thread of the processor P-n has realized the barrier arrival (step S444). When determining that the thread has realized the barrier arrival (Yes in step S444), the power mode control section 631 performs the sleep transfer control. Specifically, the power mode control section 631 sets the sleep mode to which the processor P-1 is to be transferred, in accordance with the predictive thread non processing time PTNPT-n output in step S43. The power mode control section 631 outputs control signals PCTRL-n, CCTRL-n and VCTRL-n indicating the set sleep mode to the processor P-n, the clock signal control section 632 and the supply voltage control section 633 respectively. Thus, the processor P-n is put into the barrier wait in the sleep mode in accordance with the predictive thread non processing time PTNPT-n.

When determining that the processor P-n is in a sleep mode (Yes in step S441), the power mode control section 631 monitors the timer 12 and waits until the predictive thread non processing time PTNPT-n output in step S43 passes. Then, the power mode control section 631 performs recovery control to the normal operation mode (step S448). Specifically, when the time count of the timer 12 has passed the predictive thread non processing time PTNPT-n output in step S43, the power mode control section 631 outputs control signals PCTRL-n, CCTRL-n and VCTRL-n indicating the normal operation mode to the processor P-n, the clock signal control section 632 and the supply voltage control section 633 respectively. Thus, the processor P-n is recovered from the sleep mode to the normal operation mode. As described above, when the processor P-n had transferred to a sleep mode at the time of the immediately previous barrier establishment, the sleep mode continues for the predictive thread non processing time PTNPT-n from the barrier start by the operations in steps S441 and 5448 in the current barrier synchronization.

After step S448, the power mode control section 631 uses the control signal PCTRL-n to cause the processor P-n to start executing the thread immediately (step S449). Based on the barrier arrival signal from the barrier monitoring section 611, the power mode control section 631 determines whether or not the thread of the processor P-n has realized the barrier arrival (step S450). When it is determined that the thread has realized the barrier arrival (Yes in step S450), the processing advances to step S45 shown in FIG. 25. Since the processor P-n already had a sleep time of the predictive thread non processing time PTNPT-n before executing the thread, the processor P-n is expected not to be able to sleep more. Therefore, by the advancement of the operation from step S450 to step S45, the processor P-n is put into the barrier wait in a state like spin waiting.

Now, with reference to specific examples shown in FIG. 27 and FIG. 28, how the program is executed by the above-described control of the multiprocessor control unit 6 will be described.

Figure 27:
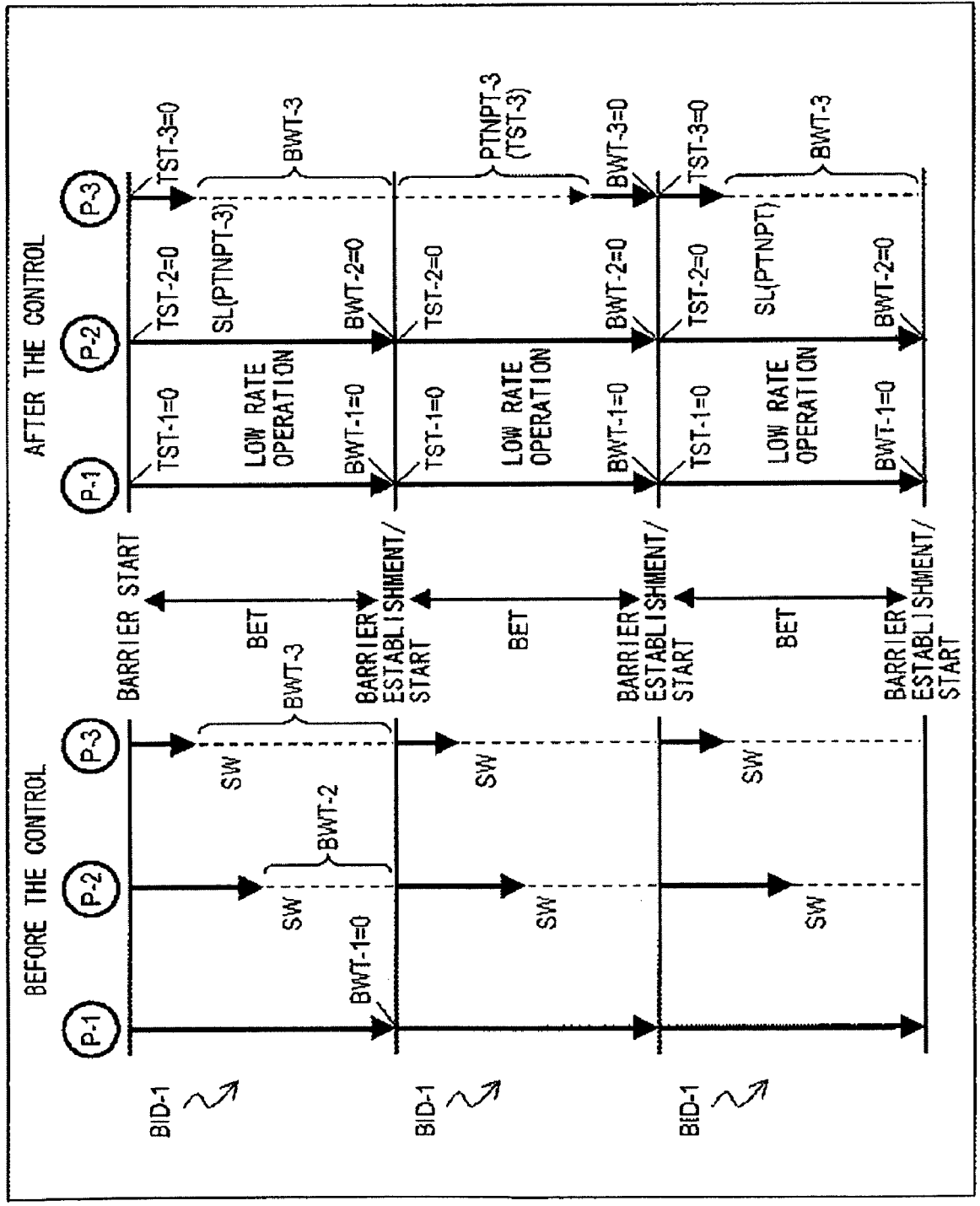
FIG. 27 shows an execution state of each thread before and after the control when the same parallel program block is executed in a loop.

FIG. 27 shows an execution state of each thread before and after the control when the same parallel program block is executed in a loop. In FIG. 27, a parallel program block specified by the barrier identification information BID-1 is executed in a loop. The parallel program block is divided into three threads, and the three divided threads are assigned to the processors P-1 through P-3 respectively. At the time of the first barrier start, the power mode of all the processors P-1 through P-3 is the normal operation mode. The power mode of the processor P-2 is set to the low rate operation mode. The execution state in FIG. 27 before the control is substantially the same as that in FIG. 10, and the description will be omitted. The execution state in FIG. 27 after the control is different from the execution state in FIG. 10 only in that the low rate operation mode is applied to the processor P-2. Hereinafter, the differences will be mainly described.

The processor P-2 is in the normal operation mode at the time of the first barrier start (step S41), and so is determined No in step S441. Then, the processor P-2 is determined Yes in step S442, and starts executing the thread in the low rate operation mode which is set based on the predictive thread non processing time PTNPT-2 (=BWT-2) and the predictive barrier establish time PBET (=BET) (step S446). Then, when the thread of the processor P-2 realizes the barrier arrival (Yes in step S447), the processor P-2 encounters the first barrier establishment while being kept in the normal operation mode. The processor P-2 performs the low rate operation such that the thread non processing time is "0". Therefore, simultaneously with the barrier arrival of the threat of the processor P-2, the first barrier establishment is realized.

After the first barrier establishment, the barrier arrival time BAT-2 is divided by the low rate operation ratio in expression (3), and the history information storage section 612 performs update based on the result of the division (step S48).

The execution state of the processor P-2 after the second barrier start is the same as the execution state after the first barrier start, and the description will be omitted.

Figure 28:
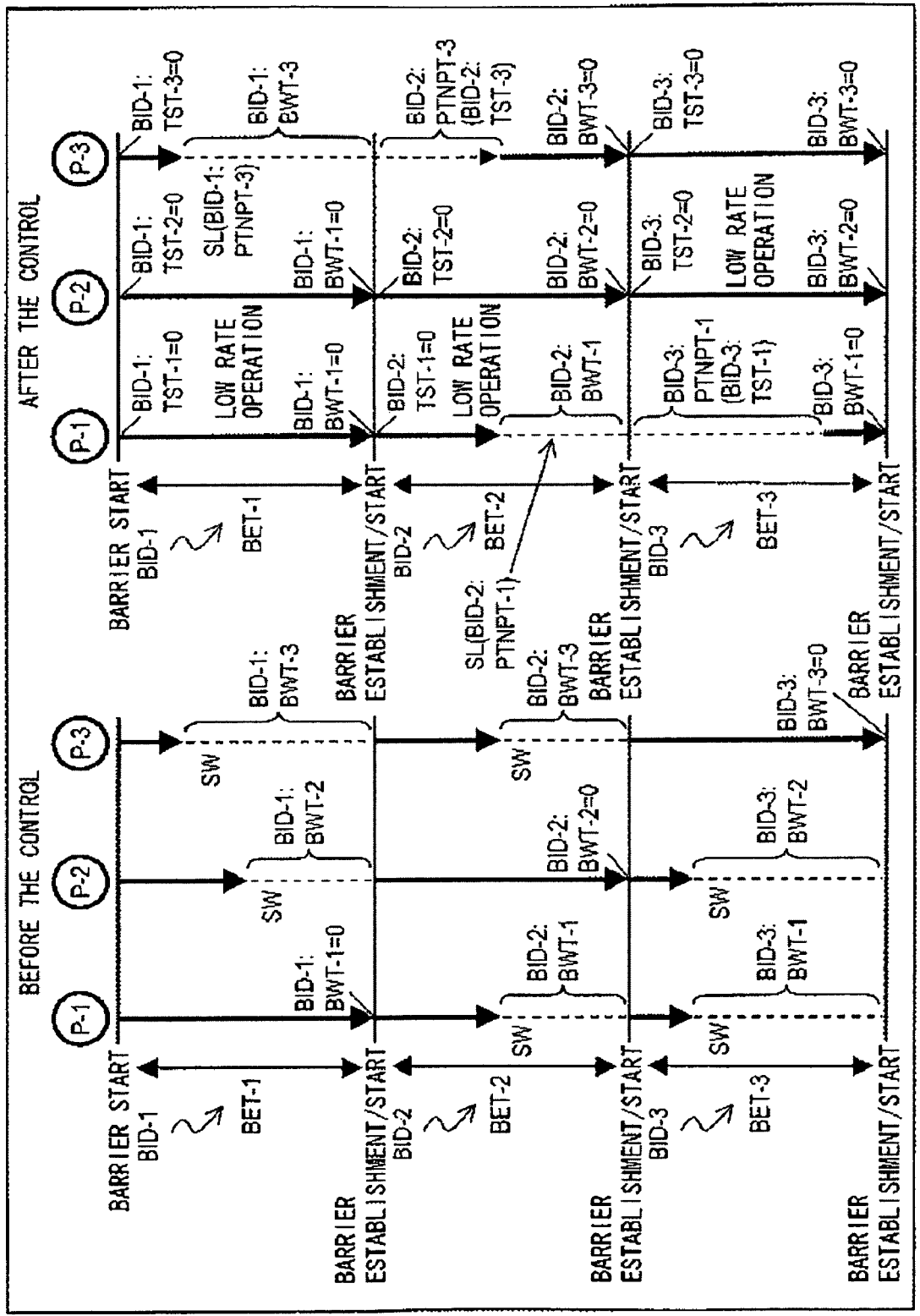
FIG. 28 shows an execution state of each thread before and after the control when different parallel program blocks are consecutively executed.

FIG. 28 shows an execution state of each thread before and after the control when different parallel program blocks are executed consecutively. In FIG. 28, a parallel program block specified by the barrier identification information BID-1, a parallel program block specified by the barrier identification information BID-2, and a parallel program block specified by the barrier identification information BID-3 are consecutively executed. Each parallel program block is divided into three threads, and the three divided threads are assigned to the processors P-1 through P-3 respectively. At the time of the barrier start of the parallel program block specified by the barrier identification information BID-1, the power mode of all the processors 2-1 through P-3 is the normal operation mode. The power mode of the processor P-2 is set to the low rate operation mode. The execution state in FIG. 28 before the control is substantially the same as the execution state in FIG. 11, and the description will be omitted. The execution state in FIG. 28 after the control is different from the execution state in FIG. 11 only in that the low rate operation mode is applied to the processor P-2. Hereinafter, the differences will be mainly described.

The processor P-2 is in the normal operation mode at the time of the first barrier start (step S41), and so is determined No in step S441. Then, the processor P-2 is determined Yes in step S442, and starts executing the thread in the low rate operation mode which is set based on the predictive thread non processing time (BID-1:PTNPT-2) (=BID-1:BWT-2) and the predictive barrier establish time PBET (=BET-1) (step S446). Then, when the thread of the processor P-2 realizes the barrier arrival (Yes in step S447), the processor P-2 encounters the first barrier establishment while being kept in the normal operation mode. The processor P-2 performs the low rate operation such that the thread non processing time is "0". Therefore, simultaneously with the barrier arrival of the threat of the processor P-2, the first barrier establishment is realized.

After the first barrier establishment, the barrier arrival time (BID-1:BAT-2) is divided by the low rate operation ratio in expression (3), and the history information storage section 612 performs update based on the result of the division (step S48).

The execution state of the processor P-2 after the second barrier start is the same as the execution state after the first barrier start, and the description will be omitted.

As described above, according to the second embodiment, DVFS control is added to the control in the first embodiment. Thus, further power saving is realized.

<First Modification of the Second Embodiment>

As shown in FIG. 22, in the second embodiment, the history information storage section 612 stores the barrier arrival times BAT-1 through BAT-N and the thread starting times TST-1 through TST-N for each barrier identification information BID. Therefore, as in the first embodiment, the memory capacity of the data section needs to be increased in proportion to the number of processors mounted on the multiprocessor system. As a result, the circuit scale of the multiprocessor control unit 6 may be enlarged. A first modification has an object of decreasing the data amount stored in the history information storage section 612 and suppressing the enlargement of the circuit scale of the multiprocessor control unit 6.

<Structure>

Figure 29:
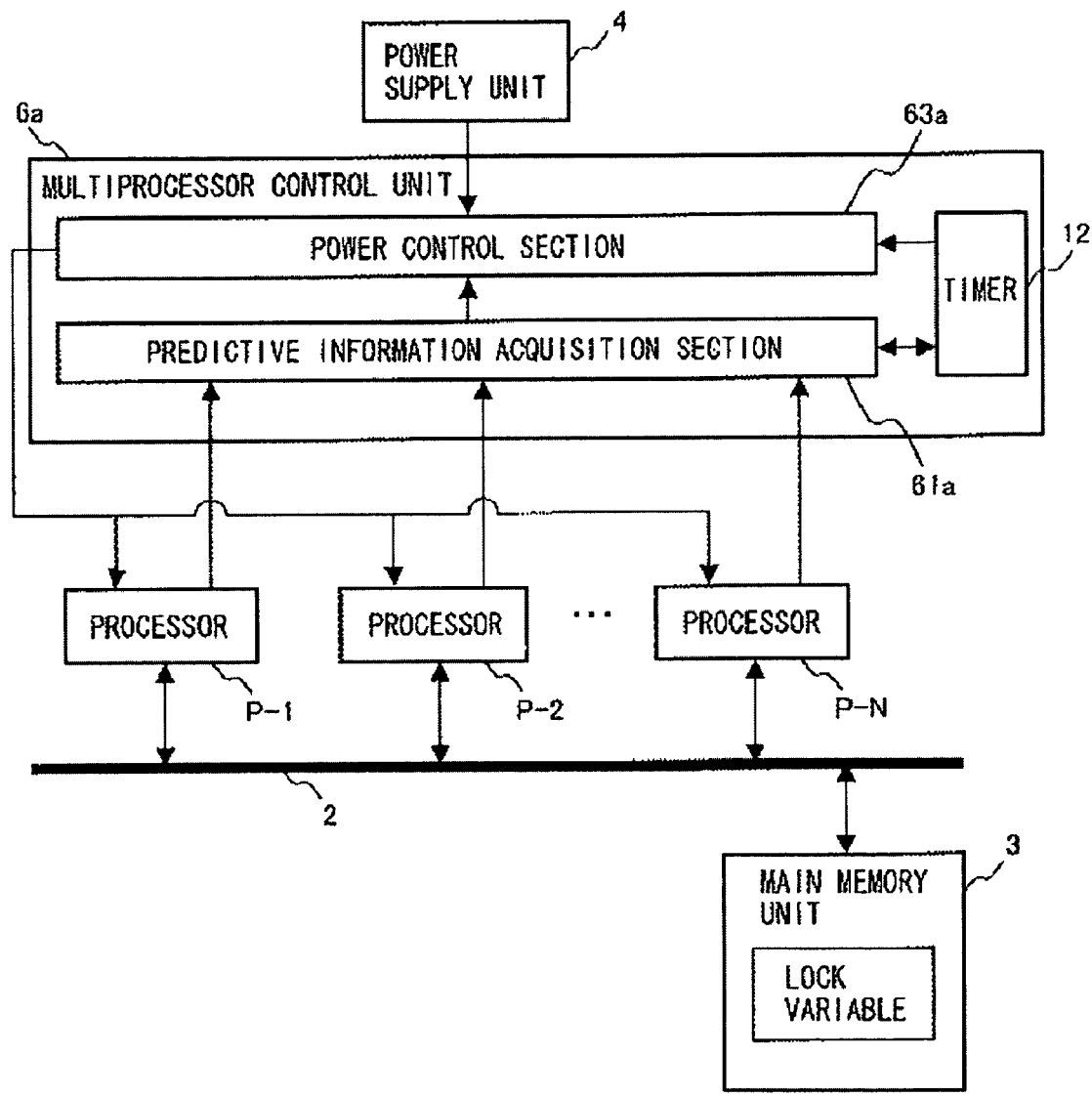
FIG. 29 shows an example of a structure of a shared memory type multiprocessor system using a multiprocessor control unit according to a first modification of the second embodiment.

FIG. 29 shows an example of a structure of a shared memory type multiprocessor system using a multiprocessor control unit according to the first modification. The multiprocessor system according to the first modification is different from the structure shown in FIG. 20 only in that the multiprocessor control unit 6 is replaced with a multiprocessor control unit 6a and that the multiprocessor control unit 6a includes a predictive information acquisition section 61a, a timer 12, and a power control section 63a. Hereinafter, the differences will be mainly described.

Figure 30:
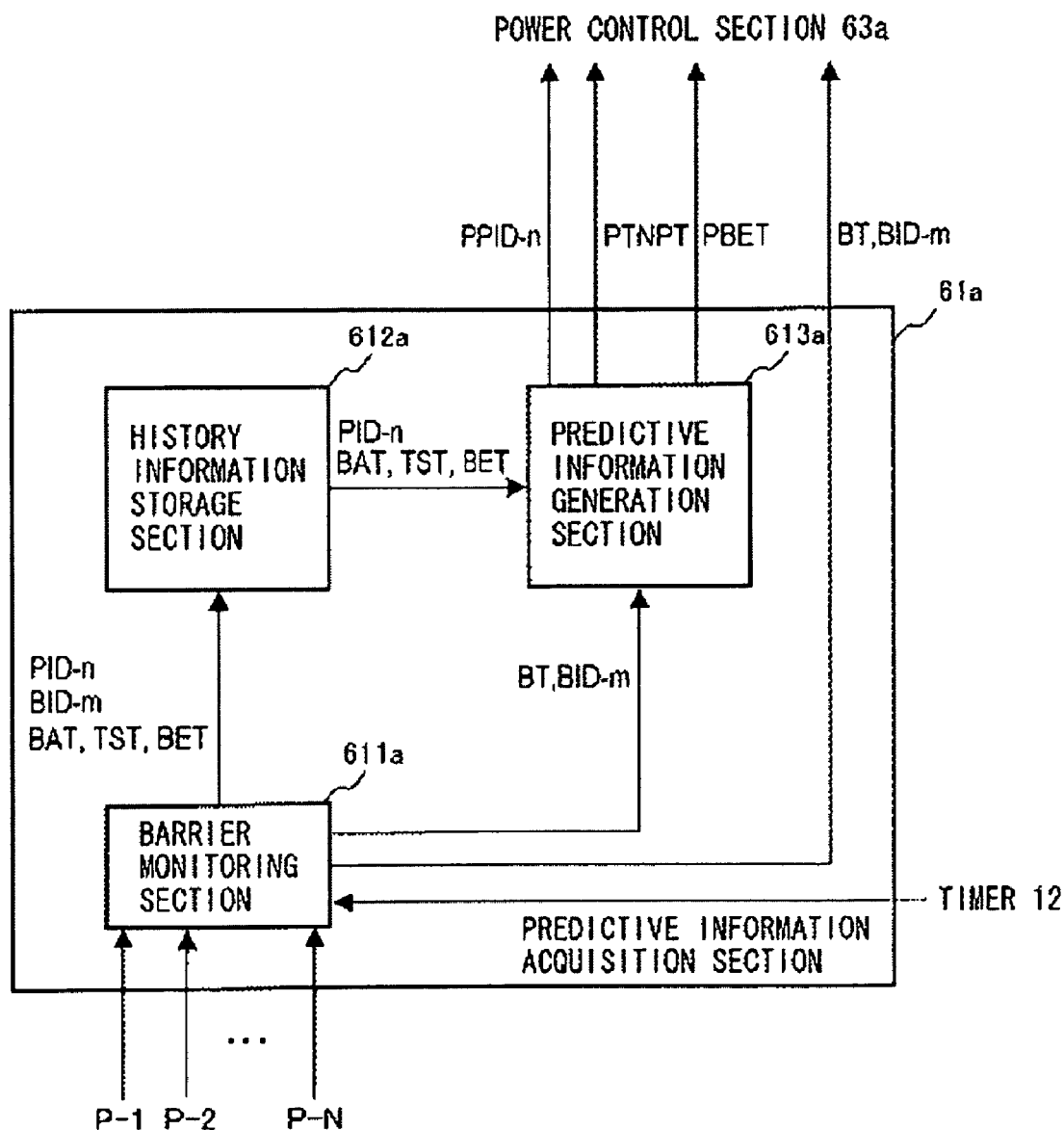

The predictive information acquisition section 61a acquires two pieces of predictive information on each program block, and outputs the acquired predictive information to the power control section 63a. Hereinafter, with reference to FIG. 30, a specific structure of the predictive information acquisition section 61a will be described. FIG. 30 shows a specific example of the structure of the predictive information acquisition section 61a. The predictive information acquisition section 61a includes a barrier monitoring section 611a, a history information storage section 612a, and a predictive information generation section 613a.

The barrier monitoring section 611a further calculates the barrier arrival time BAT, which is a statistic value (for example, an average value) of the calculated barrier arrival times BAT-1 through BAT-N and outputs the barrier arrival time BAT to the history information storage section 612a. The barrier monitoring section 611a calculates the maximum barrier arrival time among the calculated barrier arrival times BAT-1 through BAT-N as the barrier establish time BET, and outputs the barrier establish time BET to the history information storage section 612a. The barrier monitoring section 611a further calculates the thread starting time TST, which is a statistic value (for example, an average value) of the calculated thread starting times TST-1 through TST-N, and outputs the thread starting time TST to the history information storage section 612a. The barrier monitoring section 611a also specifics the processor, the thread of which is the last thread to realize the barrier arrival, for each program block based on the barrier arrival signals, and outputs processor identification information PID for specifying the processor to the history information storage section 612a. Other than the above, the barrier monitoring section 611a is substantially the same as the barrier monitoring section 611.

Figure 31:
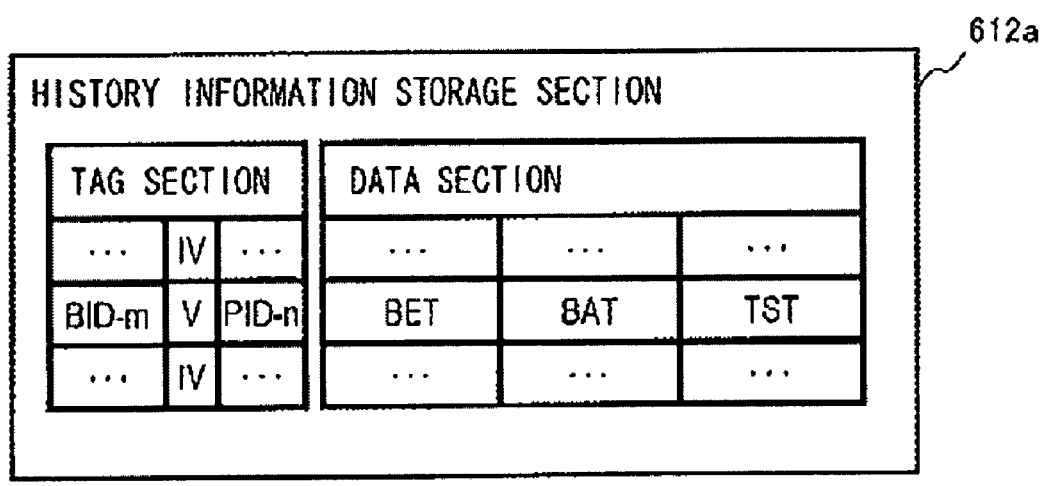

The history information storage section 612a stores the input barrier establish time BET, the input processor identification information PID-n, the input barrier arrival time BAT and the input thread starting time TST in a history table shown in FIG. 31. FIG. 31 shows the history table in the history information storage section 612a. The history information storage section 612a stores the barrier identification information BID-m input from the barrier monitoring section 611a in an arbitrary entry of the tag section. The history information storage section 612a stores the processor identification information PID-n input from the barrier monitoring section 611a in an entry of the tag section corresponding to the entry in which the barrier identification information BID-m is stored. The history information storage section 612a stores the barrier establish time BET, the barrier arrival time BAT and thread starting time TST input from the barrier monitoring section 611a in respective entries of the data section corresponding to the entry in which the barrier identification information BID-m is stored. In this manner, the history table stores the barrier identification information BID-m, the processor identification information PID-n, and the barrier establish time BET, the barrier arrival time BAT and thread starting time TST of the program block specified by the barrier identification information BID-m in association with one another. Other than the above, the history information storage section 612a is substantially the same as the history information storage section 612.

The predictive information generation section 613a refers to the barrier timing signal BT to read the processor identification information PID-n, the barrier establish time BET, the barrier arrival time BAT and the thread starting time TST associated with the barrier identification information BID-m from the history information storage section 612a at the time of the barrier start or barrier arrival. The predictive information generation section 613a outputs the read barrier establish time BET to the power control section 63a as the predictive barrier establish time PBET. The predictive information generation section 613a outputs the read processor identification information PID-n to the power control section 63a as the predictive processor identification information PPID-n. The predictive information generation section 613a further substitutes the read barrier establish time BET, the read barrier arrival time BAT and the read thread starting time TST into expressions (1) and (2) to calculate the predictive thread non processing time PTNPT. The predictive information generation section 613a refers to the barrier timing signal BT to output the predictive thread non processing time PTNPT to the power control section 63a at the time of the barrier start or barrier arrival.

Figure 32:
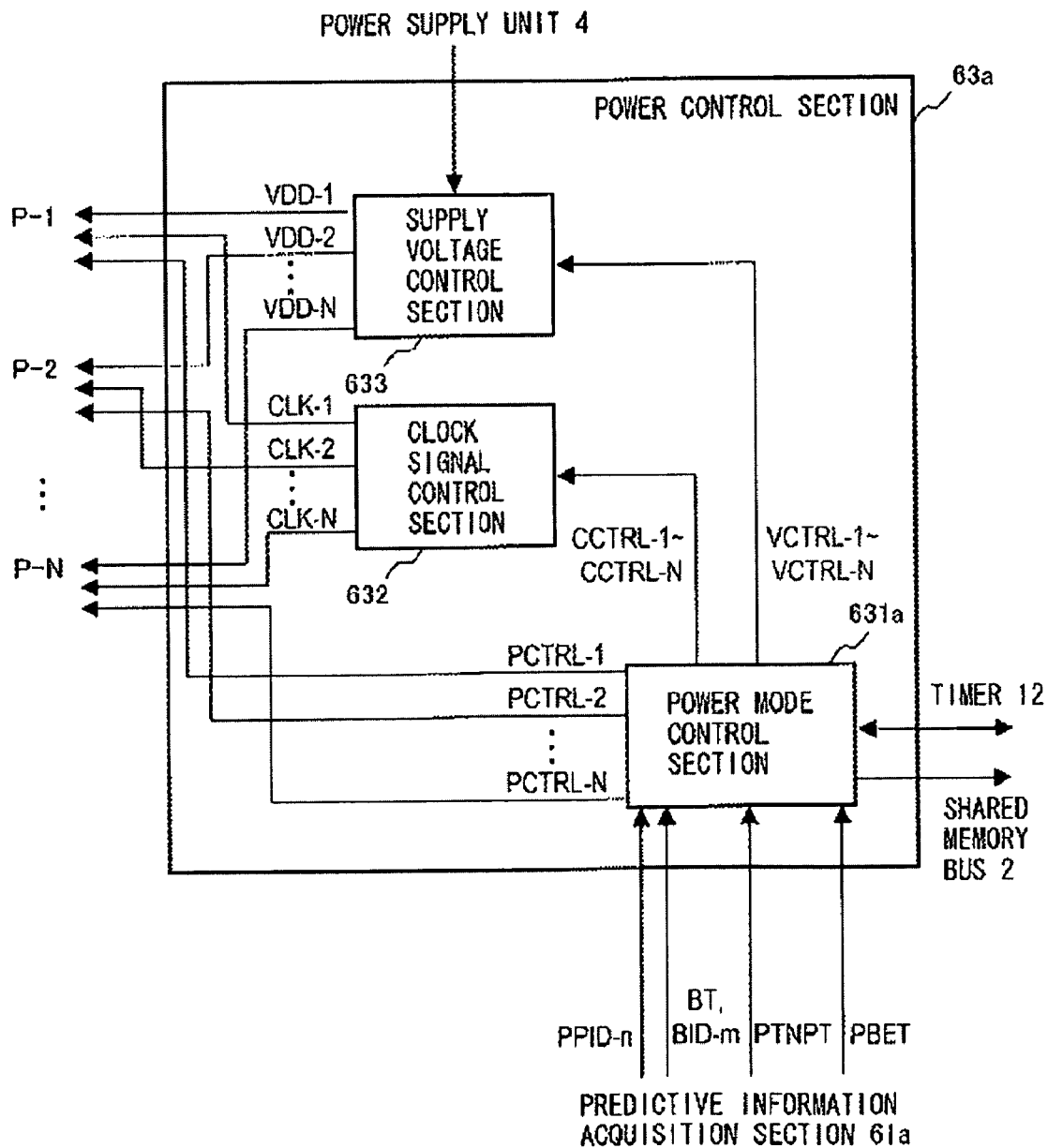

The power control section 63a controls the supply voltage and/or the clock signal to be supplied to each of the processors P-1 through P-N based on the predictive information input from the predictive information acquisition section 61a to control the power supply to each of the processors P-1 through P-N. Hereinafter, with reference to FIG. 32, a specific structure of the power control section 63a will be described. FIG. 32 shows a specific example of the structure of the power control section 63a. The power control section 63a includes a power mode control section 631a, a clock signal control section 632, and a supply voltage control section 633. The power control section 63a is different from the power control section 63 in that the power mode control section 631 is replaced with the power mode control section 631a. Hereinafter, the differences will be mainly described.

The power mode control section 631a determines which of the DVFS control and the sleep transfer control provides a larger power saving effect based on the input predictive barrier establish time PBET and the input predictive thread non processing time PTNPT. The power mode control section 631a selects the control determined to provide a larger power saving effect. When the DVFS control is selected, the power mode control section 631a substitutes the predictive barrier establish time PBET and the predictive thread non processing time PTNPT into expression (3) to calculate the clock frequency of the clock signal to be supplied to the processor such that the thread non processing time is "0". Based on the sleep transfer determination threshold values shown in FIG. 24, the power mode control section 631a also sets the power mode. Regarding the processor P-n specified by the predictive processor information PPID-n, the power mode control section 631a skips the sleep transfer control. Other than the above, the power mode control section 631a is substantially the same as the power mode control section 631.

<Operation>

Figure 33:
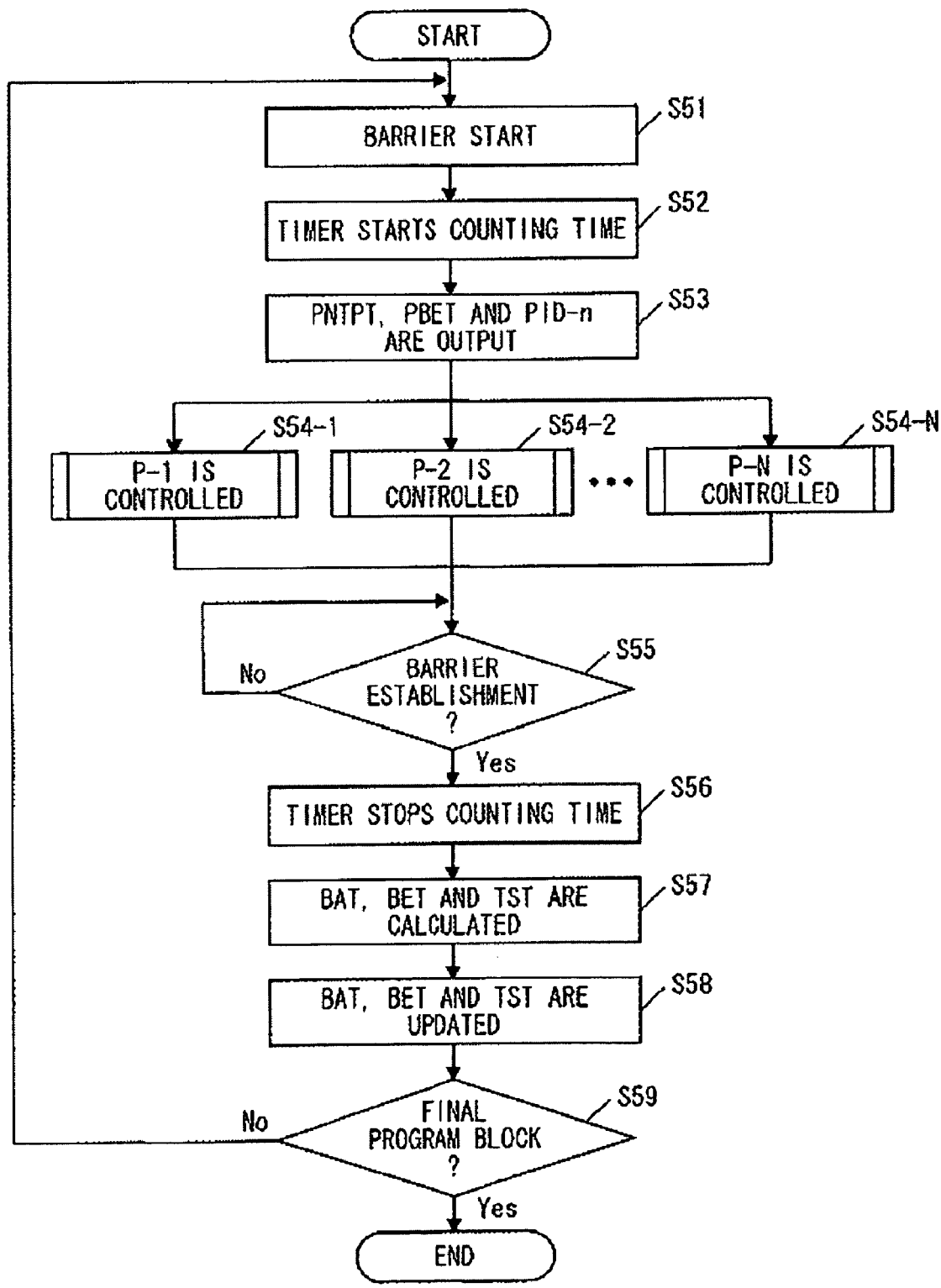

Now, with reference to FIG. 33, an operation of the multiprocessor control unit 6a according to the first modification will be described. FIG. 33 is a flowchart showing an overall operation flow of the multiprocessor control unit 6a. In FIG. 33, the processing in steps S51, S52, S55, S56 and S59 is substantially the same as the processing in steps S41, S92, S45, S46 and S49 shown in FIG. 25. The other steps will be mainly described.

In step S53 after step S52, when a barrier starting signal is input from the barrier monitoring section 611a, the predictive information generation section 613a reads the processor identification information PID-n, the barrier establish time BET, the barrier arrival time BAT, and the thread starting time TST associated with the barrier identification information BID-m from the history information storage section 612a. The predictive information generation section 613a outputs the processor identification information PID-n, the predictive barrier establish time PBET, and the predictive thread non processing time PTNPT to the power control section 63a (step S53). After step S53, the processors P-1 through P-N are individually controlled (steps S54-1 through S54-N). Such individual control will be described later.

In step S57 after step S56, the barrier monitoring section 611a calculates the barrier arrival time BAT and the thread starting time TST, which are statistic values, and the barrier establish time BET based on the barrier timing signal and the time count of the timer 12. In step S57, the barrier monitoring section 611a outputs the calculated barrier establish time BET, the calculated barrier arrival time BAT, and the calculated thread starting time TST to the history information storage section 612a.

After step S57, the history information storage section 612a updates the barrier establish time BET, the barrier arrival time BAT, and the thread starting time TST stored above in the data section corresponding to the input barrier identification information BID-m with the barrier establish time BET, the barrier arrival time BAT, and the thread starting time TST output in step S57 (step S58). In step S58, the history information storage section 612a updates the processor identification information PID-n stored above in the tag section corresponding to the input barrier identification information BID-m with the processor identification information PID-n output in step S57.

Figure 34:
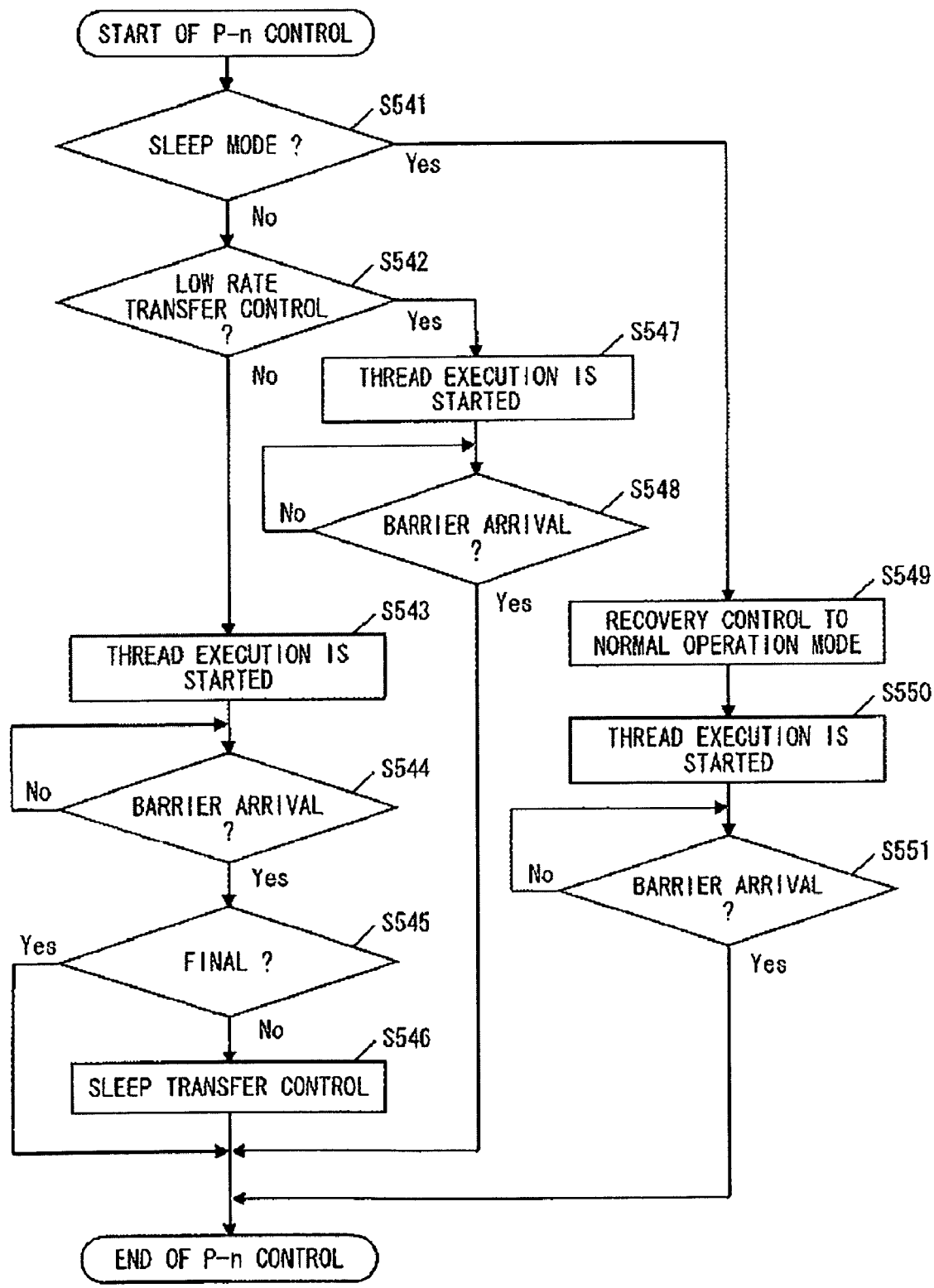
FIG. 34 is a flowchart showing a flow of individual control on each of processors P-1 through P-N according to the first modification of the second embodiment.

With reference to FIG. 34, the individual control on each of the processors P-1 through P-N (steps S54-1 through S54-N) will be described specifically. Since the control flow is the same among steps S54-1 through S54-N, FIG. 34 shows the control flow on the processor P-n. In FIG. 39, the processing in steps S541 through S544 is substantially the same as the processing in steps S441 through S444 shown in FIG. 26, and the processing in steps S546 through S551 is substantially the same as the processing in steps S445 through S450 shown in FIG. 26. The other steps will be mainly described.

In step S545 after step S544, the power mode control section 631a determines whether or not the processor as the control target is the processor P-n specified by the predictive processor identification information PPID-n output in step S53 (step S545). Namely, the power mode control section 631a determines whether or not the processor as the control target is the final processor to realize the barrier arrival. When the processor as the control target is not the final processor to realize the barrier arrival (No in step S545), the power mode control section 631a sets the power mode of each of the processors P-1 through P-N in accordance with the predictive thread non processing time PTNPT output in step S53 (step S546). By contrast, when the processor as the control target is the final processor to realize the barrier arrival (Yes in step S545), the sleep transfer control (step S546) is skipped. In this example, the processor as the control target is the processor P-n, and the processor specified by the predictive processor identification information PPID-n is also the processor P-n. Therefore, in step S545, a positive determination is made.

As described above, according to the first modification, one barrier establish time BET, one barrier arrival time BAT and one thread starting time TST are stored in the history information storage section 612a. Therefore, the memory capacity of the history information storage section 612a can be decreased, and the enlargement of the circuit scale of the multiprocessor control unit 6a can be suppressed.

In the above, the barrier monitoring section 611a calculates the average value of the barrier arrival times BAT-1 through BAT-N and the average value of the thread starting times TST-1 through TST-N, but the present invention is not limited to this. The barrier monitoring section 611a may calculate an average value of the barrier arrival times BAT-1 through BAT-N excluding the maximum barrier arrival time. Alternatively, the barrier monitoring section 611a may calculate an average value of the thread starting times TST-1 through TST-N excluding the minimum thread starting time.

In the above, the barrier monitoring section 611a specifies the processor, the thread of which is the last thread to realize the barrier arrival, for each program block based on the barrier arrival signals, and outputs processor identification information PID for specifying the processor to the history information storage section 612a. The present invention is not limited to this. The barrier monitoring section 611a may specify the processor, the thread processing time of which is maximum, namely, the processor, the thread non processing time of which is minimum, for each program block, and output information specifying the processor as the processor identification information PID.

<Second Modification of the Second Embodiment>

In the second embodiment, the individual control on each processor is performed in the flow shown in FIG. 26. However, in the case where different parallel program blocks are consecutively executed as shown in FIG. 28, the thread non processing time acquired when the sleep mode is kept may be longer than the thread non processing time acquired immediately previously. A second modification has an object of realizing further power saving by resetting the processor to a deeper sleep mode in the case where the thread non processing time acquired when the sleep mode is kept is longer than the thread non processing time acquired immediately previously.

A multiprocessor control unit according to the second modification is different from the above-described multiprocessor control units only in the flow shown in FIG. 26 regarding the individual control on each processor, among FIG. 20 through FIG. 23, FIG. 25 and FIG. 26. Hereinafter, the differences will be mainly described.

<Operation>

Figure 35:
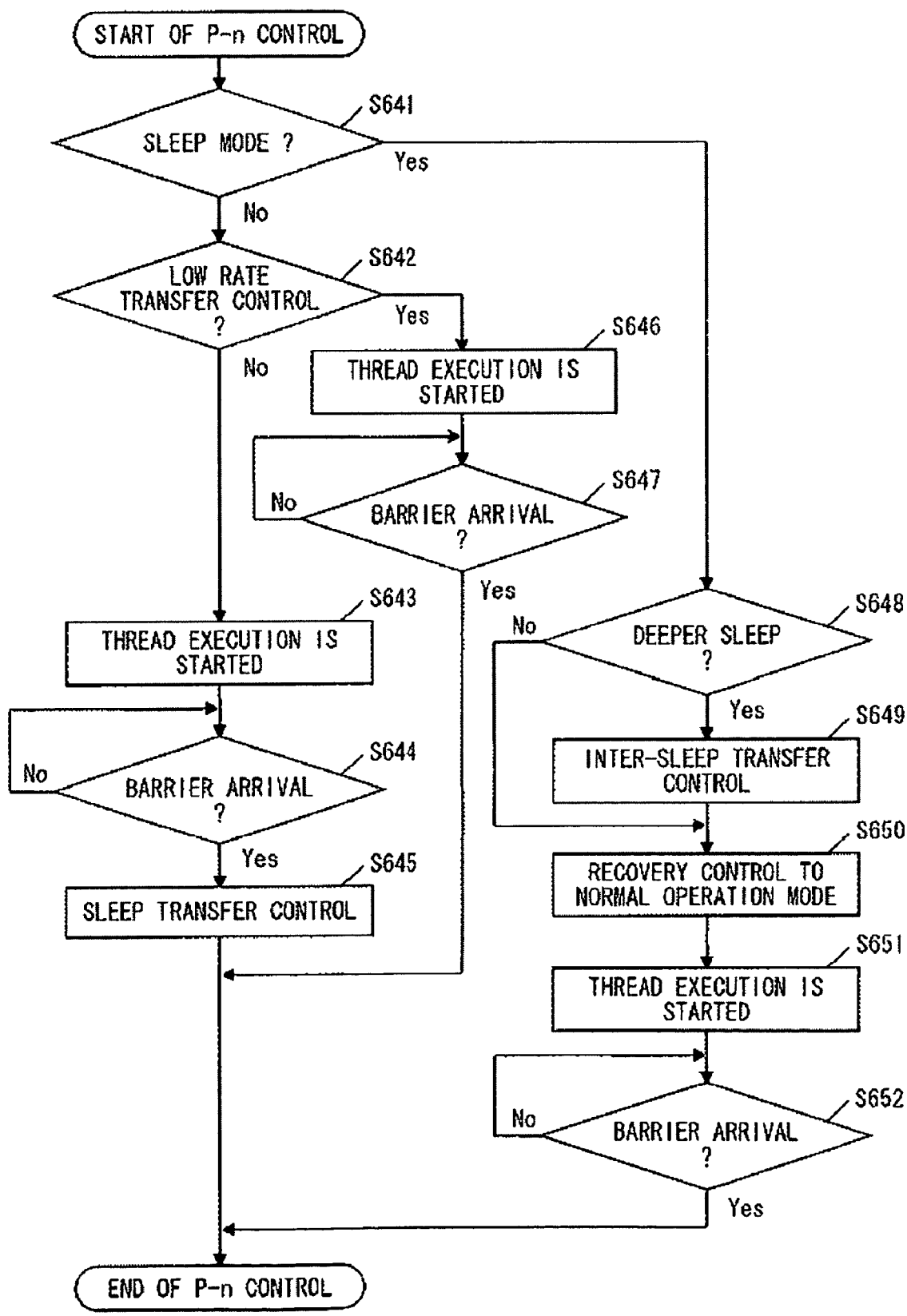
FIG. 35 is a flowchart showing a flow of individual control on each of processors P-1 through P-N according to a second modification of the second embodiment.

With reference to FIG. 35, the individual control on each of the processors P-1 through P-N (steps S44-1 through S44-N) according to the second modification will be described specifically. Since the control flow is the same among steps S44-1 through S44-N, FIG. 35 shows the control flow on the processor P-n. In FIG. 35, the processing in steps S641 through S647 is substantially the same as the processing in steps S441 through S447 shown in FIG. 26, and the processing in steps S650 through S652 is substantially the same as the processing in steps S448 through S450 shown in FIG. 26. The other steps will be mainly described.

When in step S641 it is determined that the processor P-n is in a sleep mode, the power mode control section 631 determines whether or not transfer from the current sleep mode to a deeper sleep mode is possible based on the predictive thread non processing time PTNPT-n output in step S43 shown in FIG. 25 (step S648). When it is determined that transfer to a deeper sleep mode is possible (Yes in step S648), the power mode control section 631 transfers the power mode of the processor P-n to a deeper sleep mode in accordance with the predictive thread non processing time PTNPT-n (step S649). By contrast, when it is determined that transfer to a deeper sleep mode is not possible (No in step S648), the power mode control section 631 skips inter-sleep transfer control (step S649).

For example, after the control in FIG. 28, the processor P-1 is kept in the sleep mode SL (BID-2:PTNPT-1) at the time of the third barrier start. However, the predictive thread non processing time (BID-3:PTNPT-1) acquired at the time of the third barrier start is longer than the predictive thread non processing time (BID-2:PTNPT-1) acquired at the time of the second barrier start. Applying the second modification, the power mode control section 631 can transfer the power mode of the processor P-1 to a deeper sleep mode SL (BID-3: PTNPT-1) at the time of the third barrier start.

As described above, according to the second modification, in the case where the thread non processing time acquired when the sleep mode is kept is longer than the thread non processing time acquired immediately previously, the sleep mode is reset to a deeper sleep mode. As a result, further power saving can be realized.

In the first and second embodiments, the shared memory type multiprocessor system is described. A non-shared memory type multiprocessor system is also available. In a non-shared memory type multiprocessor system, each processor includes a dedicated memory which is not directly accessible from another processor. Processors each having a dedicated memory are connected to each other via a high speed mutual connection network. Such processors may be classified as a multicomputer including a great number of computers connected to each other, instead of a multiprocessor. Such a non-shared memory type multiprocessor system cannot directly use lock variable unlike a shared memory type multiprocessor, and so realizes barrier synchronization by message exchange using inter-processor communication means. Nonetheless, the essential difference is in the communication means, and a thread which has realized barrier arrival early needs to wait until the last thread realizes barrier arrival to realize barrier establishment like in the shared memory type multiprocessor system. Therefore, the sleep control according to the present invention is applicable also to a non-shared memory type multiprocessor system. The processor in the sense of the present invention is not limited to a stored program type processor having a program counter. An operation processing unit operating in accordance with a dedicated limited state machine specialized to an applied field may be used instead of a processor as long as the operation processing unit has the normal operation mode and at least one sleep mode.

Figure 36:
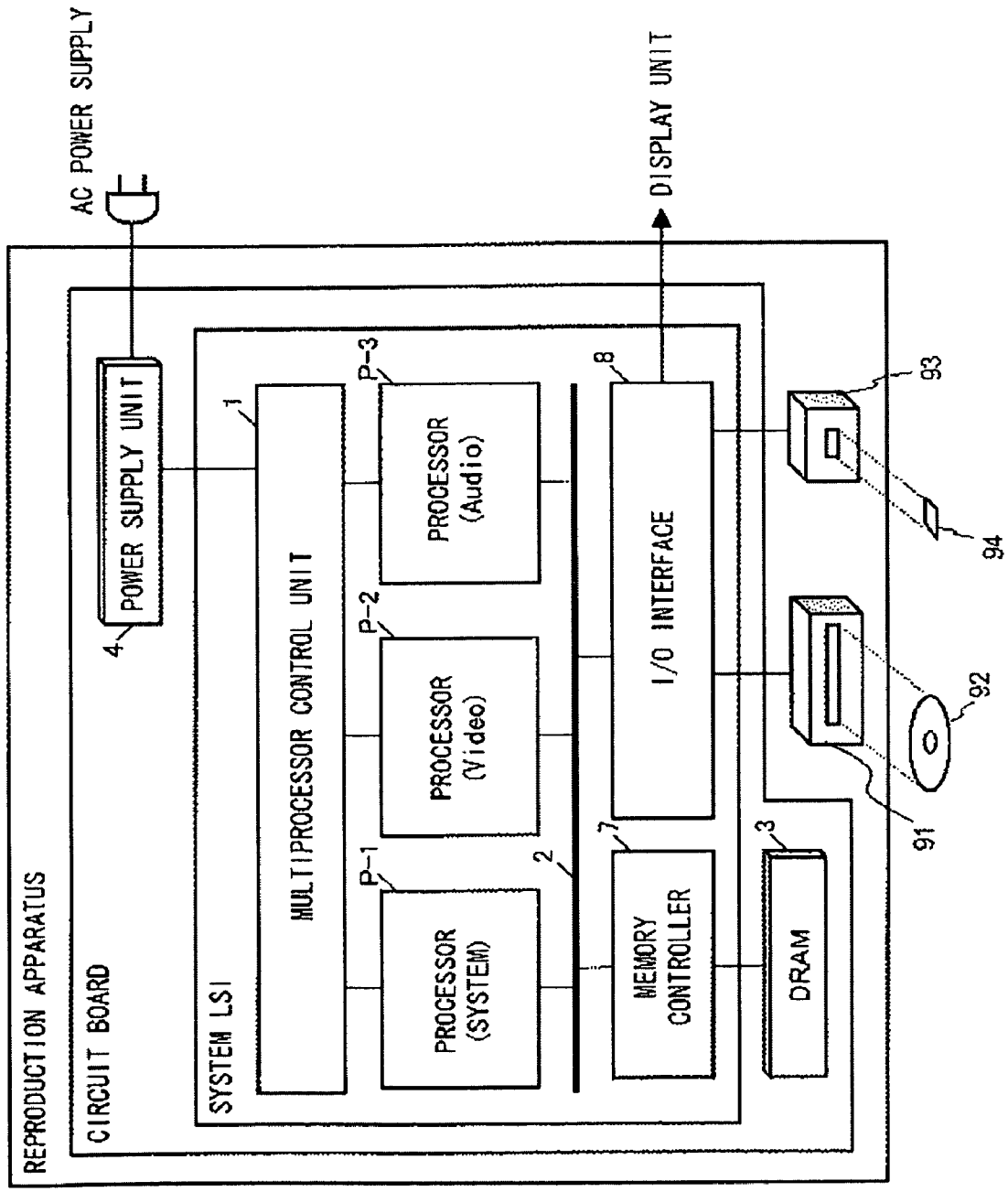
FIG. 36 shows an example of a structure of a reproduction apparatus to which the multiprocessor system according to the first embodiment is applied.

The multiprocessor system in the first and second embodiments is typically applicable to a reproduction apparatus for image data, audio data, or the like. FIG. 36 shows an example of a structure of a reproduction apparatus to which the multiprocessor system according to the first embodiment is applied. It is assumed that, for example, image and audio information encoded in conformity to an MPEG format is stored on an optical disc 92 or a memory card 94 as encoded stream data. In this case, a system LSI in the reproduction apparatus de-compresses encoded stream data, which is read from a drive 91 or 93 via a shared memory bus 2, a memory controller 7 and an I/O interface 8, on a main memory unit 3 including a DRAM. The processor P-1 acquires the encoded stream data from the main memory unit 3 via the shared memory bus 2 and the memory controller 7 and separates the encoded stream data into an image encoded stream and an audio encoded stream. The processor P-1 notifies the processor P-2 of the image encoded stream and notifies the processor P-3 of the audio encoded stream via the shared memory bus 2. The processor P-2 decodes the image encoded stream, and the processor P-3 decodes the audio encoded stream. The processor P-1 outputs the decoded image and audio information to a display unit such as a TV or the like while performing barrier synchronization with the processors P-2 and P-3 in accordance with the display time. At this time, a load of the system processing, a load of image decoding processing and a load of the audio decoding processing assigned to the processors P-1 through P-3 are not generally equal. By controlling the processors P-1 through P-3 by the multiprocessor control unit 1 according to the present invention, power consumption can be decreased.

In the above, the system LSI is mentioned, but such a circuit may be called an IC, a super LSI or an ultra LSI depending on the integration degree. The circuit integration may be realized as a dedicated circuit or a general purpose processor, instead of a system LSI. An FPGA (Field Programmable Gate Array) which is programmable after the production of a system LSI or a reconfigurable processor which is capable of changing the circuit cell connection or setting in the system LSI may be used. Moreover, when another circuit integration technology replacing the system LSI appears by the development of the semiconductor technologies or as a different technology stemming from the semiconductor technologies, such a technology may be used to integrate the functional blocks.

A multiprocessor control unit according to the present invention is capable of providing a larger power saving effect than the conventional art, and is usable for a parallel calculator system or the like for which power consumption is a problem.

The invention claimed is:

1. A multiprocessor control unit for controlling a power supply to a plurality of processors, which perform parallel execution of a plurality of first blocks obtained by dividing a first program block included in a program while performing barrier synchronization of the plurality of first blocks, and then perform parallel execution of a plurality of second blocks obtained by dividing a second program block continued from the first program block while performing barrier synchronization of the plurality of second blocks, the multiprocessor control unit comprising:

an acquisition means for acquiring first non processing time information on a first non processing time represented for each processor, wherein the first non processing time represents a time in which a first block is not executed in a first barrier establishment time from barrier synchronization start until barrier synchronization establishment of the first program block, and acquiring second non processing time information on a second non processing time represented for each processor, wherein the second non processing time represents a time in which a second block is not processed in a second barrier establishment time from barrier synchronization start until barrier synchronization establishment of the second program block; and a power control means for controlling the power supply to the plurality of processors while the first and second program blocks are consecutively executed in parallel, using the first and second non processing time information acquired by the acquisition means, the power control means being operatively coupled to the acquisition means for receiving the first and second non processing time information, wherein the power control means controls execution start timing of the first and second blocks for each processor such that execution states of the first and second blocks are the same before and after the barrier synchronization start of the second program block, using the first and second non processing time information acquired by the acquisition means, and controls the power supply to the plurality of processors such that a processor not executing the first block or the second block is in a sleep state and a processor executing the first block or the second block is in an operation state before and after the barrier synchronization start of the second program block, and the power control means comprises:

a power mode control means, in which a normal operation mode representing power for placing a processor into a normal operation state and a sleep mode representing power for placing the processor into a sleep state are preset, for setting a power mode of each processor to the normal operation mode or the sleep mode; and a transfer means for controlling supply of a clock signal or a supply voltage to each processor to transfer the power mode of each processor to the power mode set by the power mode control means, and regarding a processor which has completed the execution of the first block before the barrier synchronization establishment of the first program block, the power mode control means delays the execution start timing of the second block by the time represented by the second non processing time information from the barrier synchronization start of the second program block, and sets the power mode from the execution completion of the first block until the execution start of the second block to the sleep mode.

2. A multiprocessor control unit according to claim 1, wherein the second non processing time information is the second non processing time of the processor which has completed the execution of the first block before the barrier synchronization establishment of the first program block.

3. A multiprocessor control unit according to claim 1, wherein the power mode control means sets the power mode of the processor which has completed the execution of the first block before the barrier synchronization establishment of the first program block to a sleep mode in accordance with the time represented by the first non processing time information from the execution completion of the first block until the execution start of the second block.

4. A multiprocessor control unit according to claim 1, wherein in the case where the time represented by the second non processing time information is longer than the time represented by the first non processing time information, regarding the processor which has completed the execution of the first block before the barrier synchronization establishment of the first program block, the power mode control means sets the power mode to a sleep mode in accordance with the time represented by the first non processing time information from the execution completion of the first block until the barrier synchronization establishment of the first program block, and sets the power mode to a sleep mode in accordance with the time represented by the second non processing time information from the barrier synchronization start of the second program block until the execution start of the second block.

5. A multiprocessor control unit according to claim 1, wherein:

the first and second program blocks are the same program block; and the power mode control means sets the power mode of the processor which has completed the execution of the first block before the barrier synchronization establishment of the first program block to a sleep mode in accordance with a sum of the time represented by the first non processing time information and the time represented by the second non processing time information.

6. A multiprocessor control unit according claim 3, wherein:

the first non processing time information is the first non processing time of the processor which has completed the execution of the first block before the barrier synchronization establishment of the first program block; and the second non processing time information is the second non processing time of the processor which has completed the execution of the first block before the barrier synchronization establishment of the first program block.

7. A multiprocessor control unit according to claim 1, wherein:

the acquisition means stores the first and second non processing time information;

the first non processing time information is a statistic time of the first non processing times represented respectively for the plurality of processor; and the second non processing time information is a statistic time of the second non processing times represented respectively for the plurality of processor.

8. A multiprocessor control unit according to claim 7, wherein:

the first non processing time information is an average time of the first non processing times represented respectively for the plurality of processors; and the second non processing time information is an average time of the second non processing times represented respectively for the plurality of processors.

9. A multiprocessor control unit according to claim 7, wherein:

the first non processing time information is an average time of the first non processing times represented respectively for the plurality of processors excluding a minimum first non processing time; and the second non processing time information is an average time of the second non processing times represented respectively for the plurality of processors excluding a minimum second non processing time.

10. A multiprocessor control unit according to claim 1, wherein:
the acquisition means stores the first and second non processing time information;
the first non processing time information is a minimum first non processing time among the first non processing times respectively represented for the plurality of processors; and
the second non processing time information is a minimum second non processing time among the second non processing times respectively represented for the plurality of processors.

11. A multiprocessor control unit according to claim 1, wherein:
in the power mode control means, a low rate operation mode representing power for placing a processor to a low rate operation state is preset;
regarding a processor which starts executing the first block at the time of the barrier synchronization start of the first program block, the power mode control means compares power consumed by the processor when the power mode from the execution completion of the first block until the barrier synchronization establishment of the first program block is set to a sleep mode in accordance with the time represented by the first non processing time information and power consumed by the processor when the power mode from the execution completion of the first block until the barrier synchronization establishment of the first program block is set to the low rate operation mode, and sets the power mode in which the processor consumes less power; and
regarding a processor which starts executing the second block at the time of the barrier synchronization start of the second program block, the power mode control means compares power consumed by the processor when the power mode from the execution completion of the second block until the barrier synchronization establishment of the second program block is set to a sleep mode in accordance with the time represented by the second non processing time information and power consumed by the processor when the power mode from the execution completion of the second block until the barrier synchronization establishment of the second program block is set to the a low rate operation mode, and sets the power mode in which the processor consumes less power.

12. A multiprocessor control unit according to claim 11, wherein:
the acquisition means further acquires the first and second barrier establishment times;
in the case where the power mode of the processor which starts executing the first block at the time of the barrier synchronization start of the first program block is set to the low rate operation mode, the power mode control means calculates a first frequency, which is in accordance with the ratio between the time represented by the first non processing time information and the first barrier establishment time and is lower than the frequency of the clock signal to be supplied to a processor in the normal operation state, and sets the calculated first frequency for the low rate operation mode; and in the case where the power mode of the processor which starts executing the second block at the time of the barrier synchronization start of the second program block is set to the low rate operation mode, the power mode control means calculates a second frequency, which is in accordance with the ratio between the time represented by the second non processing time information and the second barrier establishment time and is lower than the frequency of the clock signal to be supplied to the processor in the normal operation state, and sets the calculated second frequency for the low rate operation mode; and
in the case where the power mode of the processor which starts executing the first block at the time of the barrier synchronization start of the first program block is set to the low rate operation mode, the transfer means sets the frequency of the clock signal to the processor to the first frequency; and in the case where the power mode of the processor which starts executing the second block at the time of the barrier synchronization start of the second program block is set to the low rate operation mode, the transfer means sets the frequency of the clock signal to the processor to the second frequency.

13. A multiprocessor control unit according to claim 11, wherein when the power mode of all the processors is set to the low rate operation mode, the power mode control means resets the power mode of all the processors to the normal operation mode.

14. A multiprocessor control unit according to claim 11, wherein in the case where the power mode of the processor which starts executing the first block at the time of the barrier synchronization start of the first program block is set to the low rate operation mode, the acquisition means converts the time from the processor starts executing the first block in the low rate operation state until the processor completes the execution into the time from the processor starts executing the first block in the normal operation state until the processor completes the execution, and acquires the first non processing time by subtracting the converted time from the first barrier establishment time; and in the case where the power mode of the processor which starts executing the second block at the time of the barrier synchronization start of the second program block is set to the low rate operation mode, the acquisition means converts the time from the processor starts executing the second block in the low rate operation state until the processor completes the execution into the time from the processor starts executing the second block in the normal operation state until the processor completes the execution, and acquires the second non processing time by subtracting the converted time from the second barrier establishment time.

15. A multiprocessor control unit according to claim 11, wherein:
the acquisition means stores the first and second non processing time information;
the first non processing time information is a statistic time of the first non processing times respectively represented for the plurality of processor; and
the second non processing time information is a statistic time of the second non processing times respectively represented for the plurality of processor.

16. A multiprocessor control unit according to claim 15, wherein:
the first non processing time information is an average time of the first non processing times respectively represented for the plurality of processors; and the second non processing time information is an average time of the second non processing times respectively represented for the plurality of processors.

17. A control method performed by a multiprocessor control unit for controlling a power supply to a plurality of processors, which perform parallel execution of a plurality of first blocks obtained by dividing a first program block included in a program while performing barrier synchronization of the plurality of first blocks, and then perform parallel execution of a plurality of second blocks obtained by dividing a second program block continued from the first program block while performing barrier synchronization of the plurality of second blocks, the control method comprising:

an acquisition step of acquiring first non processing time information on a first non processing time represented for each processor, wherein the first non processing time represents a time in which a first block is not executed in a first barrier establishment time from barrier synchronization start until barrier synchronization establishment of the first program block, and acquiring second non processing time information on a second non processing time represented for each processor, wherein the second non processing time represents a time in which a second block is not processed in a second barrier establishment time from barrier synchronization start until barrier synchronization establishment of the second program block; and a power control step of controlling the power supply to the plurality of processors while the first and second program blocks are consecutively executed in parallel, using the first and second non processing time information acquired by the acquisition step, wherein the power control step controls execution start timing of the first and second blocks for each processor such that execution states of the first and second blocks are the same before and after the barrier synchronization start of the second program block, using the first and second non processing time information acquired in the acquisition step, and controls the power supply to the plurality of processors such that a processor not executing the first block or the second block is in a sleep state and a processor executing the first block or the second block is in an operation state before and after the barrier synchronization start of the second program block, the power control step comprises:

a power mode control step, in which a normal operation mode representing power for placing a processor into a normal operation state and a sleep mode representing power for placing the processor into a sleep state are preset, of setting a power mode of each processor to the normal operation mode or the sleep mode; and a transfer step of controlling supply of a clock signal or a supply voltage to each processor to transfer the power mode of each processor to the power mode set by the power mode control step, and regarding a processor which has completed the execution of the first block before the barrier synchronization establishment of the first program block, the power mode control step delays the execution start timing of the second block by the time represented by the second non processing time information from the barrier synchronization start of the second program block, and sets the power mode from the execution completion of the first block until the execution start of the second block to the sleep mode.

18. An integrated circuit for controlling a power supply to a plurality of processors, which perform parallel execution of a plurality of first blocks obtained by dividing a first program block included in a program while performing barrier synchronization of the plurality of first blocks, and then perform parallel execution of a plurality of second blocks obtained by dividing a second program block continued from the first program block while performing barrier synchronization of the plurality of second blocks, the integrated circuit comprising:

an acquisition means for acquiring first non processing time information on a first non processing time represented for each processor, wherein the first non processing time represents a time in which a first block is not executed in a first barrier establishment time from barrier synchronization start until barrier synchronization establishment of the first program block, and acquiring second non processing time information on a second non processing time represented for each processor, wherein the second non processing time represents a time in which a second block is not processed in a second barrier establishment time from barrier synchronization start until barrier synchronization establishment of the second program block; and a power control means for controlling the power supply to the plurality of processors while the first and second program blocks are consecutively executed in parallel, using the first and second non processing time information acquired by the acquisition means, the power control means being operatively coupled to the acquisition means for receiving the first and second non processing time information, wherein the power control means controls execution start timing of the first and second blocks for each processor such that execution states of the first and second blocks are the same before and after the barrier synchronization start of the second program block, using the first and second non processing time information acquired by the acquisition means, and controls the power supply to the plurality of processors such that a processor not executing the first block or the second block is in a sleep state and a processor executing the first block or the second block is in an operation state before and after the barrier synchronization start of the second program block, and the power control means comprises:

a power mode control means, in which a normal operation mode representing power for placing a processor into a normal operation state and a sleep mode representing power for placing the processor into a sleep state are preset, for setting a power mode of each processor to the normal operation mode or the sleep mode; and a transfer means for controlling supply of a clock signal or a supply voltage to each processor to transfer the power mode of each processor to the power mode set by the power mode control means, and regarding a processor which has completed the execution of the first block before the barrier synchronization establishment of the first program block, the power mode control means delays the execution start timing of the second block by the time represented by the second non processing time information from the barrier synchronization start of the second program block, and sets the power mode from the execution completion of the first block until the execution start of the second block to the sleep mode.

* * * * *